United States Patent
Semba et al.

(10) Patent No.: US 6,297,826 B1
(45) Date of Patent: Oct. 2, 2001

(54) METHOD OF CONVERTING COLOR DATA

(75) Inventors: Satoshi Semba; Masayoshi Shimizu; Shoji Suzuki; Kimitaka Murashita, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/233,479

(22) Filed: Jan. 20, 1999

(30) Foreign Application Priority Data

| Jan. 20, 1998 | (JP) | 10-008865 |
|---|---|---|
| Feb. 24, 1998 | (JP) | 10-042580 |
| Feb. 24, 1998 | (JP) | 10-042581 |
| Sep. 3, 1998 | (JP) | 10-250168 |

(51) Int. Cl.$^7$ .................................................. G06T 11/40
(52) U.S. Cl. ..................... 345/431; 345/150; 345/153; 345/154
(58) Field of Search ...................... 345/431, 430, 345/326, 150, 186, 88, 522, 440, 154, 153, 151, 155; 358/518

(56) References Cited

U.S. PATENT DOCUMENTS

| 4,985,853 | * | 1/1991 | Taylor et al. ...................... 345/431 |
| 5,416,890 | * | 5/1995 | Beretta ............................... 345/431 |
| 5,903,275 | * | 5/1999 | Guay .................................. 345/430 |
| 5,949,427 | * | 9/1999 | Nishikawa et al. ................ 345/431 |
| 5,963,201 | * | 10/1999 | McGreggor et al. ............. 345/326 |
| 6,125,022 | * | 10/2000 | Dillinger ........................... 345/431 |
| 6,130,675 | * | 10/2000 | Murai et al. ....................... 345/431 |

FOREIGN PATENT DOCUMENTS

| 0473432A2 | 3/1992 | (EP) . |
| 0488655A2 | 6/1992 | (EP) . |
| 7-95431 | 4/1995 | (JP) . |
| 7-307872 | 11/1995 | (JP) . |

OTHER PUBLICATIONS

Jan Morovic, "To Develop a Universal Gamut Mapping Algorithm", Design Research Centre, University of Derby, May 1997; pp. 2–33.

* cited by examiner

Primary Examiner—Jeffery Brier
Assistant Examiner—Thu-Thao Havan
(74) Attorney, Agent, or Firm—Staas & Halsey LLP

(57) ABSTRACT

If all colors of a picture obtained by a first color picture device cannot be outputted from a second color picture device, a plurality of color data which are outside the gamut of the second color picture device and are inside the gamut of the first color picture device are converted so as to preserve correspondence regarding both the lightness value and the saturation value. Furthermore, if, since an equi-hue line has distortion, the tone of a color represented by color data is changed by conversion, the hue angle of the color data is rotated and converted. In picture data, color data for the color of paper or the color of a picture digitally generated have extreme values, and errors occur when the data are converted. In this case, data around the color data in a color conversion table are modified to obtain a desirable conversion result.

31 Claims, 43 Drawing Sheets

```
┌─────────────────────────────────┐
│  SETS THE L*a*b* VALUES OF A    │
│         GRID POINT              │
└────────────────┬────────────────┘
                 │
┌────────────────┴────────────────────┐
│   DETERMINES CMY VALUES TO BE       │
│  REGISTERED IN A GRID BASED ON THE  │
│  RELATION OF MEASUREMENT DATA AT THE│
│  GRID POINT (MINIMIZES THE SQUARE SUM│
│           OF AN ERROR)              │
└─────────────────────────────────────┘
```

FIG. 7 PRIOR ART

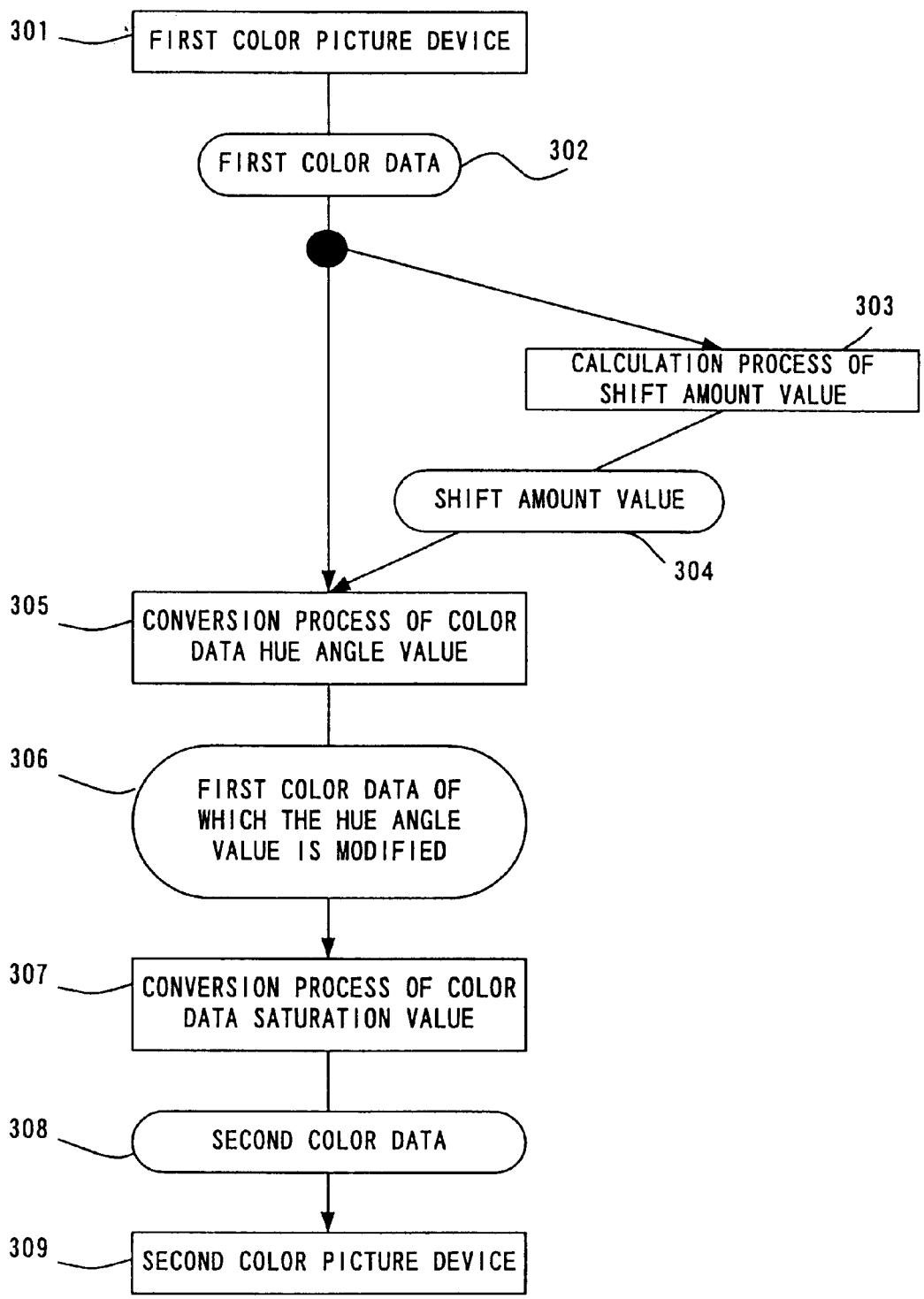
F I G. 15

ANGLE 320 DEGREES

| LIGHTNESS/SATURATION | 0 | 30 | 60 | 90 | 120 |
|---|---|---|---|---|---|
| 100 | 0 | 0 | XX | XX | XX |
| 75 | 0 | 0 | 0 | XX | XX |
| 50 | 0 | 0 | 0 | 0 | 0 |
| 25 | 0 | 0 | 0 | XX | XX |
| 0 | 0 | 0 | XX | XX | XX |

ANGLE 300 DEGREES

| LIGHTNESS/SATURATION | 0 | 30 | 60 | 90 | 120 |
|---|---|---|---|---|---|
| 100 | 0 | -11.75 | XX | XX | XX |
| 75 | 0 | -9.625 | 18.75 | XX | XX |
| 50 | 0 | -7.5 | -15 | -22.5 | -30 |
| 25 | 0 | -9.625 | 18.75 | XX | XX |
| 0 | 0 | -11.75 | XX | XX | XX |

ANGLE 280 DEGREES

| LIGHTNESS/SATURATION | 0 | 30 | 60 | 90 | 120 |
|---|---|---|---|---|---|
| 100 | 0 | XX | XX | XX | XX |
| 75 | 0 | -9.375 | XX | XX | XX |
| 50 | 0 | -7.5 | -15 | XX | XX |
| 25 | 0 | -9.375 | 18.75 | XX | XX |
| 0 | 0 | -11.25 | XX | XX | XX |

ANGLE 260 DEGREES

| LIGHTNESS/SATURATION | 0 | 30 | 60 | 90 | 120 |
|---|---|---|---|---|---|
| 100 | 0 | XX | XX | XX | XX |
| 75 | 0 | -6.25 | XX | XX | XX |
| 50 | 0 | -5 | -10 | XX | XX |
| 25 | 0 | -6.25 | XX | XX | XX |
| 0 | 0 | XX | XX | XX | XX |

ANGLE 240 DEGREES

| LIGHTNESS/SATURATION | 0 | 30 | 60 | 90 | 120 |
|---|---|---|---|---|---|
| 100 | 0 | XX | XX | XX | XX |
| 75 | 0 | -2.5 | XX | XX | XX |
| 50 | 0 | -2.5 | XX | XX | XX |
| 25 | 0 | -2.5 | XX | XX | XX |
| 0 | 0 | XX | XX | XX | XX |

ANGLE 220 DEGREES

| LIGHTNESS/SATURATION | 0 | 30 | 60 | 90 | 120 |
|---|---|---|---|---|---|
| 100 | 0 | XX | XX | XX | XX |
| 75 | 0 | 0 | XX | XX | XX |
| 50 | 0 | 0 | XX | XX | XX |
| 25 | 0 | 0 | XX | XX | XX |
| 0 | 0 | XX | XX | XX | XX |

F I G. 1 6

ANGLE 20 DEGREES

| LIGHTNESS/SATURATION | 0 | 30 | 60 | 90 | 120 |
|---|---|---|---|---|---|
| 100 | 0 | XX | XX | XX | XX |
| 75 | 0 | 0 | 0 | XX | XX |
| 50 | 0 | 0 | 0 | 0 | XX |
| 25 | 0 | 0 | 0 | XX | XX |
| 0 | 0 | XX | XX | XX | XX |

ANGLE 360 DEGREES

| LIGHTNESS/SATURATION | 0 | 30 | 60 | 90 | 120 |
|---|---|---|---|---|---|
| 100 | 0 | XX | XX | XX | XX |
| 75 | 0 | 0 | 2.5 | XX | XX |
| 50 | 0 | 0 | 5 | 10 | XX |
| 25 | 0 | 0 | 2.5 | XX | XX |
| 0 | 0 | XX | XX | XX | XX |

ANGLE 340 DEGREES

| LIGHTNESS/SATURATION | 0 | 30 | 60 | 90 | 120 |
|---|---|---|---|---|---|
| 100 | 0 | XX | XX | XX | XX |
| 75 | 0 | 0 | 5 | XX | XX |
| 50 | 0 | 0 | 10 | 20 | XX |
| 25 | 0 | 0 | 5 | XX | XX |
| 0 | 0 | XX | XX | XX | XX |

ANGLE 320 DEGREES

| LIGHTNESS/SATURATION | 0 | 30 | 60 | 90 | 120 |
|---|---|---|---|---|---|
| 100 | 0 | XX | XX | XX | XX |
| 75 | 0 | 0 | 0 | XX | XX |
| 50 | 0 | 0 | 0 | 0 | 0 |
| 25 | 0 | 0 | 0 | XX | XX |
| 0 | 0 | XX | XX | XX | XX |

F I G. 1 7

| | LIGHTNESS/SATURATION | 0 | 30 | 60 | 90 | 120 |
|---|---|---|---|---|---|---|
| ANGLE 60 DEGREES | 100 | 0 | XX | XX | XX | XX |
| | 75 | 0 | 0 | 0 | 0 | XX |
| | 50 | 0 | 0 | 0 | XX | XX |
| | 25 | 0 | 0 | XX | XX | XX |
| | 0 | 0 | XX | XX | XX | XX |

| | LIGHTNESS/SATURATION | 0 | 30 | 60 | 90 | 120 |
|---|---|---|---|---|---|---|
| ANGLE 40 DEGREES | 100 | 0 | XX | XX | XX | XX |
| | 75 | 0 | 0 | -2.5 | XX | XX |
| | 50 | 0 | 0 | -5 | -10 | XX |
| | 25 | 0 | 0 | XX | XX | XX |
| | 0 | 0 | XX | XX | XX | XX |

| | LIGHTNESS/SATURATION | 0 | 30 | 60 | 90 | 120 |
|---|---|---|---|---|---|---|
| ANGLE 20 DEGREES | 100 | 0 | XX | XX | XX | XX |
| | 75 | 0 | 0 | 0 | XX | XX |
| | 50 | 0 | 0 | 0 | 0 | XX |
| | 25 | 0 | 0 | 0 | XX | XX |
| | 0 | 0 | XX | XX | XX | XX |

F I G. 1 8

| | LIGHTNESS/SATURATION | 0 | 30 | 60 | 90 | 120 |
|---|---|---|---|---|---|---|
| ANGLE 120 DEGREES | 100 | 0 | 0 | 0 | 0 | XX |
| | 75 | 0 | 0 | 0 | XX | XX |
| | 50 | 0 | 0 | 0 | XX | XX |
| | 25 | 0 | 0 | XX | XX | XX |
| | 0 | 0 | XX | XX | XX | XX |

| | LIGHTNESS/SATURATION | 0 | 30 | 60 | 90 | 120 |
|---|---|---|---|---|---|---|
| ANGLE 100 DEGREES | 100 | 0 | 0 | -5 | -10 | XX |
| | 75 | 0 | 0 | -2.5 | XX | XX |
| | 50 | 0 | 0 | 0 | XX | XX |
| | 25 | 0 | 0 | XX | XX | XX |
| | 0 | 0 | XX | XX | XX | XX |

| | LIGHTNESS/SATURATION | 0 | 30 | 60 | 90 | 120 |
|---|---|---|---|---|---|---|
| ANGLE 80 DEGREES | 100 | 0 | 0 | XX | XX | XX |
| | 75 | 0 | 0 | 0 | XX | XX |
| | 50 | 0 | 0 | 0 | XX | XX |
| | 25 | 0 | 0 | XX | XX | XX |
| | 0 | 0 | XX | XX | XX | XX |

FIG. 19

ANGLE 180 DEGREES

| LIGHTNESS/SATURATION | 0 | 30 | 60 | 90 | 120 |
|---|---|---|---|---|---|
| 100 | 0 | 0 | 0 | XX | XX |
| 75 | 0 | 0 | 0 | XX | XX |
| 50 | 0 | 0 | XX | XX | XX |
| 25 | 0 | 0 | XX | XX | XX |
| 0 | 0 | XX | XX | XX | XX |

ANGLE 160 DEGREES

| LIGHTNESS/SATURATION | 0 | 30 | 60 | 90 | 120 |
|---|---|---|---|---|---|
| 100 | 0 | 0 | 2.5 | XX | XX |
| 75 | 0 | 0 | 5 | XX | XX |
| 50 | 0 | 0 | XX | XX | XX |
| 25 | 0 | 0 | XX | XX | XX |
| 0 | 0 | XX | XX | XX | XX |

ANGLE 140 DEGREES

| LIGHTNESS/SATURATION | 0 | 30 | 60 | 90 | 120 |
|---|---|---|---|---|---|
| 100 | 0 | 0 | 5 | 10 | XX |
| 75 | 0 | 0 | 10 | 20 | XX |
| 50 | 0 | 0 | 5 | XX | XX |
| 25 | 0 | 0 | XX | XX | XX |
| 0 | 0 | XX | XX | XX | XX |

ANGLE 120 DEGREES

| LIGHTNESS/SATURATION | 0 | 30 | 60 | 90 | 120 |
|---|---|---|---|---|---|
| 100 | 0 | 0 | 0 | 0 | XX |
| 75 | 0 | 0 | 0 | XX | XX |
| 50 | 0 | 0 | 0 | XX | XX |
| 25 | 0 | 0 | 0 | XX | XX |
| 0 | 0 | XX | XX | XX | XX |

F I G. 2 0

|  | LIGHTNESS/SATURATION | 0 | 30 | 60 | 90 | 120 |
|---|---|---|---|---|---|---|
| | 100 | 0 | 0 | XX | XX | XX |
| ANGLE | 75 | 0 | 0 | XX | XX | XX |
| 220 | 50 | 0 | 0 | XX | XX | XX |
| DEGREES | 25 | 0 | XX | XX | XX | XX |
| | 0 | 0 | XX | XX | XX | XX |

|  | LIGHTNESS/SATURATION | 0 | 30 | 60 | 90 | 120 |
|---|---|---|---|---|---|---|
| | 100 | 0 | 5 | 10 | XX | XX |
| ANGLE | 75 | 0 | 2.5 | XX | XX | XX |
| 200 | 50 | 0 | 0 | XX | XX | XX |
| DEGREES | 25 | 0 | XX | XX | XX | XX |
| | 0 | 0 | XX | XX | XX | XX |

|  | LIGHTNESS/SATURATION | 0 | 30 | 60 | 90 | 120 |
|---|---|---|---|---|---|---|
| | 100 | 0 | 0 | 0 | XX | XX |
| ANGLE | 75 | 0 | 0 | 0 | XX | XX |
| 180 | 50 | 0 | 0 | XX | XX | XX |
| DEGREES | 25 | 0 | 0 | XX | XX | XX |
| | 0 | 0 | XX | XX | XX | XX |

FIG. 21

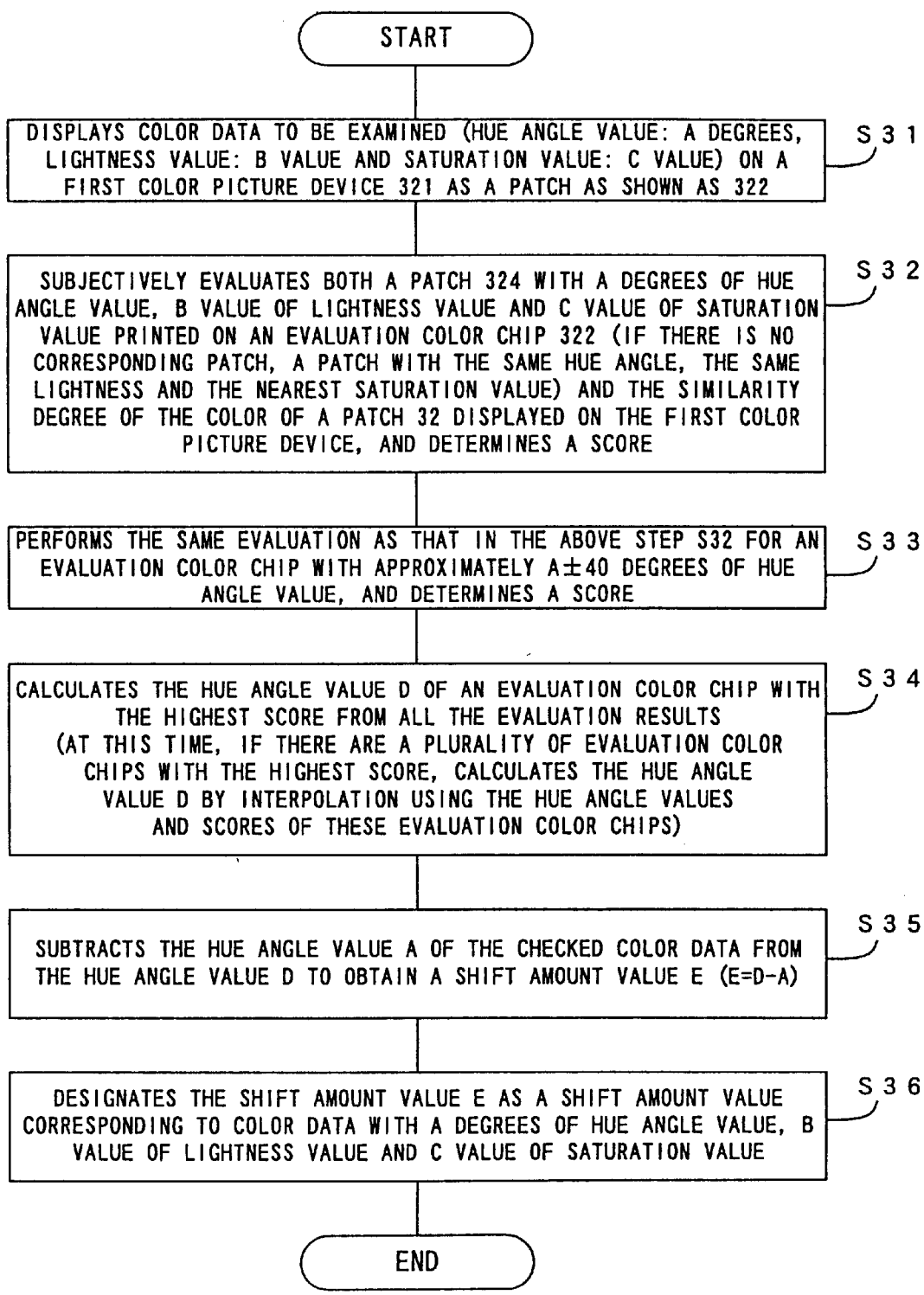
F I G. 2 4

| L*a*b VALUES | CMY VALUES |
|---|---|
| OMITTED | |
| 48 0 -8 | 114 117 116 |
| 48 0 0 | 110 119 136 |
| 48 0 8 | 107 120 155 |
| OMITTED | |
| 88 0 -8 | 7 4 -3 |
| 88 0 0 | 3 4 20 |
| 88 0 8 | 0 5 41 |
| OMITTED | |
| 96 0 -8 | -13 -14 -26 |
| 96 0 0 | -16 -14 -3 |
| 96 0 8 | -21 -15 17 |
| OMITTED | |

FIG. 41

| RGB VALUES | L*a*b VALUES |
|---|---|
| 0 0 0 | 0 18 -5 |
| 0 0 8 | 2 29 -36 |
| 0 0 16 | 3 57 -71 |
| OMITTED | |
| 128 128 120 | 74 0 2. 5 |
| 128 128 128 | 73 2 -1 |
| 128 128 136 | 73 3 -4 |
| OMITTED | |
| 255 255 255 | 93 0 -5 |

F I G. 4 2

METHOD OF CONVERTING COLOR DATA

BACKGROUND OF THE INVENTION

1. Field of the Invention

The present invention relates to a method of converting color data, and more particularly to a method of converting color data when the gamut of a color input/output device for input and that of a color input/output device for output are different.

Furthermore, the present invention relates to a method of modifying the registration data in a color conversion table which is referred to when the registration data are converted to a different expression system of color signals.

2. Description of the Related Art

Along with the recent advent of high-performance personal computers and low-cost color printers, opportunities to print color pictures have remarkably increased. When color pictures are printed, particularly the coincidence in appearance between color pictures displayed on a CRT display connected to a personal computer and those printed by a color printer is required.

There are a wide variety of expression methods of color signals. For example, printers and scanners express color using three primary colors, such as CMY values, RGB values, etc. Taking the output color of a printer in which the minimum signal value is 0 and the maximum signal value is 255, as an example, when color is expressed using CMY, all output colors are expressed by the combinations of CMY values ranging from 0 to 255. In this case, this method has a characteristic that even if data to be printed are prepared using the same CMY values, printed (reproduced) color varies with the kind of printer. For this reason, the CMY values are a way of expressing color, dependent on individual devices. A scope in which the colors of this individual device can be reproduced, is called a gamut.

Besides this expression method of color signals dependent on devices, there is an expression method of absolute colors independent of devices. This is a method of expressing colors using coordinate values, such as $L^*a^*b^*$, XYZ, etc. Since colors expressed by this method are clearly defined, colors can be expressed independently of individual devices. Color expression methods such as $L^*a^*b$, XYZ, etc. are used as an intermediate color expression method when colors are converted between the color spaces of different devices. That is, this method is used in such a case where, for example, RGB values used in a first device are once converted to, for example, $L^*a^*b^*$ values, and then the converted $L^*a^*b^*$ value are converted back to RGB values again. If color signals are accurately converted by these expression methods, inputted colors (in the case of scanners, etc.) and outputted colors (display on display monitors or printing by printers) between different devices can be matched with each other.

In this way, in order to match color outputs between devices, color data have to be converted using a variety of expression methods of color data. For a method of converting color data, there is a method of using the correspondence of color in each color space, that is, a color conversion table in which paired data of first color data in a first device and paired data of second color data in a second device are stored. Generally speaking, in a conversion method of using a color conversion table, when a color registered in the color conversion table is converted, the color can be converted by using the registered correspondence as it is. Therefore, the color conversion is processed at a remarkably high speed.

However, since data volume to be registered in the table becomes enormous, sometimes all the color correspondences are not registered in the color conversion table. In this case, when a color which is not registered in the color table is converted, colors in the neighborhood of the color to be converted are selected, by performing an interpolation operation process for color signals in the neighborhood, the color data to be converted is calculated, and the color conversion is performed based on this calculation result.

However, in the conversion of a color which is not registered in a color conversion table, errors occur in the interpolation operation process.

Although in preparing a color conversion table, operations to establish each color correspondence are performed, in these operations too, errors occur. For this reason, even when color conversion is performed using color data registered in the color table, errors often occur as a result of color conversion.

First, a conventional color data conversion method is described.

An example of conventional color data conversion methods and the used apparatuses is disclosed in the Japanese Laid-open Patent Publication No. 60-105376. In this example, first color data included in a first gamut dependent on a first color input/output device are converted toward an achromatic color with the same lightness as the first color data, and second color data included in a gamut dependent on a second color input/output device are calculated.

FIG. 1 shows the $L^*b^*$ cross section of a $L^*a^*b^*$ space. A field where $b^*$ is positive is largely the cross section of a yellow field, and an field where $b^*$ is negative is largely the cross section of a blue field. $L^*$ indicates lightness, and as a $a^*$ and $b^*$ values increase, the saturation also increase. A field enclosed by straight lines 3701 shown in FIG. 1 is a gamut in the $L^*a^*b^*$ space of a display using a CRT display being a general-purpose color input/output device. A field enclosed by straight lines 3702 is a gamut of a printer being a general-purpose color input/output device using inks of cyan, magenta and yellow (CMY).

When first color data 3703 being yellow with high saturation which can be displayed on the CRT display are printed, this color cannot be printed because of a characteristic problem on color available from a printer. Therefore, the color data 3703 has to be converted in such a way that they can be printed. In a conventional method, the color data 3703 are converted using an algorithm toward third color data 3704 of an achromatic color with the same lightness value as the color data 3703 so as to be included in a gamut 3702, and the second color data 3705 are calculated. In the same way, the first color data 3706 being blue with high saturation are converted toward third color data 3707 of an achromatic color with the same lightness value as the lightness value of the color data 3706 so as to be included in a gamut 3702, and the second color data 3708 are calculated.

Since a printer can print color data 3705 and 3708, the printer prints the color data 3705 instead of the color data 3703, and the color data 3708 instead of the color data 3706. However, as clearly shown in FIG. 1, the color data 3705 are obtained with fairly low saturation compared with the color data 3703, and the color data 3708 are also obtained with fairly low saturation compared with the color data 3706. Using the same algorithm as described above, second color data 3711 are obtained from first color data 3709. Although before conversion the color data 3703 has higher saturation than the color data 3709, after conversion the color data 3711 corresponding to the color data 3709 has far higher saturation than the color data 3705 corresponding to the color data 3703, and the order in saturation degree is reversed between before and after conversion.

In a technology disclosed in the Japanese Laid-open Patent Publication No. 4-101566, first color data included in a first gamut dependent on a first color input/output device are converted toward an achromatic color of different lightness for each hue angle, and second color data included in a gamut dependent on a second color input/output device are calculated.

Fields and straight lines 3701 and 3702 shown in FIG. 2 are the same as those shown in FIG. 1. Since first color data 3721 being yellow with high saturation which can be displayed on a CRT display, cannot be printed by a printer, the color data 3721 are converted using an algorithm toward third color data 3722 of an achromatic color with high lightness so as to be included in a gamut 3702, and second color data 3723 are calculated. In the same way, color data 3724 being blue with high saturation are converted toward color data 3725 of an achromatic color with low lightness so as to be included in the gamut 3702, and second color data 3726 are calculated. Then, the color data 3723 and 3726 are printed by a printer. In this conventional method, the color data 3723 are converted with fairly low saturation compared with the color data 3721, and the color data 3726 are converted with a fairly low saturation compared with the color data 3724.

Using the same algorithm as described above, second color data 3728 are calculated from first color data 3727. Although before conversion the color data 3721 has a higher saturation than the color data 3727, after conversion the color data 3728 corresponding to the color data 3727 has far higher saturation than the color data 3723 corresponding to the color data 3721, and here again the order in saturation degree is reversed between before and after conversion.

In a thesis by P. Laihanen, "Colour Reproduction Theory based on the Principles of Colour Science", a technology is described in which all the first color data included in a first gamut dependent on a first color input/output device are converted toward an achromatic color with a mean lightness value between the highest lightness value and the lowest lightness value of a second gamut, and second color data are calculated.

Fields and straight lines 3701 and 3702 shown in FIG. 3 are the same as those shown in FIG. 1. Since first color data 3741 being yellow with high saturation which can be displayed on a CRT display, cannot be printed by a printer, the color data 3741 are converted using an algorithm toward third color data 3742 of an achromatic color with a mean lightness value between the highest lightness value and the lowest lightness value of a second gamut 3702 so as to be included in the gamut 3702, and second color data 3743 are calculated. In the same way, color data 3744 being blue with high saturation are converted toward third color data 3742 so as to be included in the gamut 3702, and second color data 3745 are calculated. Then, the color data 3743 and 3745 are printed by a printer. In this conventional method, as clearly shown in FIG. 3, the color data 3743 and 3745 are converted with fairly low saturation compared with the color data 3741 and 3744.

Using the same algorithm as described above, second color data 3747 are calculated from first color data 3746. Although before conversion the color data 3741 has higher saturation than the color data 3746, after conversion the color data 3747 corresponding to the color data 3746 has higher saturation than the color data 3743 corresponding to the color data 3741, and here the order in saturation degree is reversed between before and after conversion.

The conventional color data conversion methods have the following problems.

FIG. 4 shows an a*b* plane corresponding to a specific L* value in L*a*b* values. A field enclosed by straight lines 3801 shown in FIG. 4 is a gamut in the L*a*b* space of a CRT display being a general-purpose color input/output device. A field encircled by straight lines 3802 is the gamut of a printer being a general-purpose color input/output device using inks of cyan, magenta and yellow (CMY).

When first color data 3803 being yellow with high saturation which can be displayed on a CRT display are printed by a printer, since this color cannot be printed by a printer, the color signal has to be converted so as to be printed by a printer. In the above three conventional methods, the color data 3803 are converted toward third color data 3804 of an achromatic color with the same lightness value as that of the color data 3803, a lightness value calculated dependent on the hue angle value of color data 3803 or a mean lightness value between the highest lightness value and the lowest lightness value of a second gamut (a field enclosed by the straight lines 3802) so as to be included in the gamut 3802, and second gamut 3805 are calculated. In the same way, first color data 3806 being blue with high saturation are converted toward the third color data 3804 of an achromatic color with the same lightness value as that of the color data 3806, a lightness value calculated dependent on the hue angle value of color data 3803 or a mean lightness value between the highest lightness value and the lowest lightness value of a second gamut (a field enclosed by the straight lines 3802) so as to be included in the gamut 3802, and second color data 3807 are calculated. First color data 3808 being magenta with high saturation are converted toward the third color data 3804 of an achromatic color with the same lightness value as that of the color data 3808, a lightness value calculated dependent on the hue angle value of color data 3803 or a mean lightness value between the highest lightness value and the lowest lightness value of the second gamut 3802 so as to be included in the gamut 3802, and second color data 3809 are calculated.

However, in this conventional method, because of the non-linearity of equi-hue lines on a CRT display in an L*a*b* space, the color data 3806 of blue with high saturation are compressed into the color data of purple, and as a result, the color displayed in blue with high saturation on the CRT display changes to purple when the color is printed by a printer.

First color data 3808 of magenta with high saturation are converted to second color data 3809 of purple with low saturation for the reason that the color data 3808 greatly differs in hue angle value from the color data 3810 of magenta with high saturation of the printer. The problem that since the color data of the primary and secondary colors of a CRT display and the color data of the primary and secondary colors of a printer greatly differ in hue angle value, the saturation is significantly lost when the color data of the CRT display are converted by the printer, which occurs in the cases of red, yellow, green, cyan, etc. with high saturation in addition to magenta with high saturation.

For the above problem that blue changes to purple, one solution is disclosed in the Japanese Laid-open Patent Publication No. 6-233129. In this conventional method, the problem is solved by rotating and shifting colors in both blue and purple fields around an achromatic color axis along the distribution curve of the blue and purple fields in an XY chromaticity diagram.

FIG. 5 shows the details of this conventional method. FIG. 5 shows an a*b* plane at a specific L* value. 3821 and 3822 shown in FIG. 5 are the gamuts of a printer and a CRT display, respectively. A vertically shaded field 3823 is a field judged to be purple and a horizontally shaded field 3824 is a field judged to be blue, when seen by the human eye.

Here, a case where first color data 3825 displayed on a CRT display by this conventional method are printed by a printer is described. Since the color data 3825 cannot be printed by a printer, the color data are compressed toward third color data 3826 on an achromatic color axis. However, if the color data 3825 are compressed toward color data 3826 without taking into consideration the distortion of equi-hue lines, the color data 3825 of blue are compressed into color data 3827 of purple. For this reason, before the saturation of the color data 3825 is converted, the color data 3825 is rotated around the achromatic color axis and are shifted to color data 3828. Thus, the color data 3825 of blue are converted to color data 3829 of blue. However, in this method, since the fact that the distortion of equi-hue lines differs depending on the lightness is not taken into consideration, colors which are converted with the hue accurately preserved are limited to color data with a certain lightness value.

FIG. 6 shows the states of the distortion of equi-hue lines in a purple field at each lightness. FIG. 6 shows the gamuts of both a CRT display and a printer in the cases where the lightness value is 25, 50 and 75, and (a), (c) and (e), and (b), (d) and (f) are the gamuts of the CRT display and the printer, respectively. In each gamut, a vertically shaded area 3841 indicates a purple field and a horizontally shaded area 3842 indicates a blue field. Broken lines 3843 are equi-hue lines connecting colors with a certain hue. It is shown in FIG. 6 that the equi-hue line 3843 of the CRT display and the equi-hue line 3843 of the printer differ in angle and shape for each lightness.

Therefore, in this conventional method, only colors with a certain lightness can be converted in such a way that the hues can be matched between the CRT display and the printer. For this reason, pictures displayed on a CRT display cannot be faithfully reproduced by a printer.

Next, a conventional method of generating a color conversion table according to a variety of color data conversion methods, and performing a color conversion is described.

In order to prevent errors from occurring in color conversion using a color conversion table, it can be considered that data registered in the table are adjusted, for which there is a method disclosed in the Japanese Laid-open Patent Publication No. 8-287226. In this method, an L*a*b* color space is reconfigured as a grid-shaped (particularly three-dimensional grid-shaped) space, and CMY values corresponding to L*a*b* values distributed on each grid point are registered in the color table. The L*a*b* values of measurement data which are surrounded with grids and exist inside the grids (that is, do not exist on the grid points when CMY values registered in the color table are calculated), is calculated in such a way that both actual CMY values corresponding to the L*a*b* values on the point and the squared error of CMY values calculated by interpolation operation may become a minimum. FIG. 7 is a flowchart summarizing the above method. First, an L*a*b* space is reconfigured in a grid shape, and L*a*b* values are set at each grid point. Then, a color is actually outputted by a printer, etc., the CMY values are calculated, and simultaneously corresponding L*a*b* values are calculated. This process is performed for a plurality of grid points, and CMY values registered at the grid point are determined based on the relation of measurement data at a grid point by making a printer output actual colors.

In the conventional method described above, particularly colors included in both yellow and blue fields are converted with the saturation lost. For this reason, when pictures including yellow with high saturation displayed on a display monitor (pictures in which a banana, lemon, etc. are photographed by a digital camera and are prepared, pictures in which vivid printed matters are inputted by a color image scanner, etc.) are printed by a printer, a problem occurs that the pictures become unnatural, since the colors are printed with the saturation of yellow greatly lost. In the same way, when pictures including blue with high saturation (sea, blue sky, etc.) are printed by a printer, a problem occurs that the pictures become unnatural, since the colors are printed with the saturation of blue greatly lost.

In the above conventional method, the order in saturation of two color data is reversed between before and after conversion. For this reason, when color pictures are printed, the gradation is reversed, and a problem occurs that the pictures become abnormal and unnatural.

In the above conventional method, when blue with high saturation displayed on a CRT display is printed by devices with a narrower gamut, such as printers, etc., the distortion of equi-hue lines in a blue field is not taken into consideration, and a problem occurs that the blue changes to purple.

When the primary and secondary colors of a first color picture device and the primary and secondary colors of a second color picture device greatly differ in hue angle value, such as when pictures displayed on a CRT display are printed by a printer, a problem occurs that colors in the neighborhood of the primary and secondary color of the first color picture device are printed with the saturation greatly lost.

Alternatively, in the conventional method, when blue with high saturation displayed on a CRT display is printed by a device with a narrower gamut, such as a printer, etc., colors in both blue and purple fields are rotated and shifted around an achromatic color axis along the curved shape of both blue and purple fields in an xy achromaticity diagram, the saturation is then converted; and the colors are printed by a printer. However, a problem occurs that the distortion of equi-hue lines varying with the lightness is not taken into consideration, and as a result, out of blue displayed on the CRT display only a part of the blue with a certain lightness value can be printed with the hue preserved, and most of the blue changes to purple.

Furthermore, in the conventional method, although the errors of a plurality of measurement data can be minimized, it is difficult to guarantee the accuracy of a specific color or to guarantee the conversion results of a specific color.

Specifically, for example, the following requirements cannot be met.
(1) It cannot be guaranteed that CMY values/CMYK values for the L*a*b* values of the color of paper is perfectly made 0.

In a color conversion table for printing, CMY values and CMYK values corresponding to the color of L*a*b* values distributed in a grid shape are registered. For grid points, values of integers are selected. However, generally speaking, the L*a*b* values of the color of paper, such as "90.5, 1.2,−4.2" do not coincide with grid points, and are not integers. Therefore, when color conversion is performed for the color of paper, by performing an interpolation operation based on data registered in the grid points around a measured L*a*b* value, CMY values for "90.5, 1.2,−4.2" have to be calculated.

Since this color is originally the color of paper, when the color is printed, the ink volume has to be perfectly 0, that is, all values of CMY(K) have to be 0 (it must be a state where nothing is printed). However, since the L*a*b* values are not integers, calculation errors occur in the interpolation operation. For this reason, all the CMY values always become 0. Thus, in this case, a problem occurs that colors are printed on the paper background (ink is deposited on the paper background).

Generally speaking, there are errors in the result of color conversion, and it is often the case that a difference in colors cannot be recognized, if printed colors are somewhat different from colors to be printed. However, since this is a part where something should be printed, the difference in color is not conspicuous only, and nothing more. When even a little volume of ink is deposited on a piece of paper which should be on the paper background of a printing medium and on which there should be no ink, a human eye recognizes the change as a great difference, even if the change volume of color is a little. Therefore, it is desirable to convert in such a way that an error may not occur in an interpolation operation.

(2) The color of characters overlaid on a picture inputted by a scanner, etc. becomes unnatural.

In a color conversion table for converting pictures inputted by a scanner (for example, RGB values) to L*a*b* values, L*a*b* values corresponding to RGB values distributed in a grid shape are registered.

Generally speaking, scanners are often designed to have a contingency in output signals. That is, the scanners are designed in such a way that signals representing colors read from an input picture may not take extreme values. For this reason, in such a case, the scanners are designed so that neither the maximum value of 255 nor the minimum value of 0 may be outputted as an R value, G value or B value. For this reason, in such a case, in a color conversion table prepared based on the actually measured values of color, for example, L*a*b* values corresponding to a grid point of RGB=(255, 255, 255) cannot be directly calculated. This is because the data of RGB=(255, 255, 255) are not outputted from a scanner.

Thus, in order to calculate L*a*b* values corresponding to RGB=(255, 255, 255), anticipated and prepared L*a*b* values are stored by performing some process, such as extrapolation, etc.

The L*a*b* values which are anticipated and prepared by performing some process, such as extrapolation, etc. described above are not always integers. For example, a value of a number with fractions such as (98.5, 1.2, 7.2) is registered. As described earlier, in a scanner designed in such a way that the maximum value of 255 may not be outputted, since the data of RGB=(255, 255, 255) are not outputted, even if a picture is scanned, there is no problem in color conversion for the scanned picture, even if any kind of L*a*b* values are registered at this grid point.

However, characters, etc. are often overlaid on a picture inputted by a scanner. For example, when a white character is overlaid on a picture, a picture element corresponding to the character takes a value, such as RGB=(255, 255, 255). Here, it is generally understood that the value of RGB=(255, 255, 255) means white in a display monitor.

When by using a color conversion table registering a value of (98.5, 1.2, 7.2) for RGB=(255, 255, 255), a picture on which characters are overlaid as described above is converted, the part of characters becomes L*a*b*=(98.5, 1.2, 7.2). If L*a*b* values of (98.5, 1.2, 7.2) are assumed not to represent white, a problem occurs that although the part is a portion where originally white is intended and characters are overlaid, by color conversion the characters become colored.

Although as concrete problems, the color of paper in (1) and overlaid white characters in (2) have been so far described, regarding (1), the problems occur for a variety of colors, for example, that yellow with high purity reproduced using Y (yellow) ink is mixed with ink of another color. Problems on the color of overlaid characters in (2) are not limited to white, but also occur in a variety of colors, such as red RGB=(255, 0, 0), black RGB=(0, 0, 0), etc.

The present invention has been made in order to solve the problems described above, and it is an object of the present invention to provide a method of converting color which can be displayed on a first color picture device, particularly both yellow and blue with high saturation, to color data which can be displayed on a second color picture device without degrading saturation.

Furthermore, it is another object of the present invention to provide a method of converting two pieces of color data which can be displayed on a first color picture device, to color data which can be displayed on a second color picture device without reversing the order in saturation between the two pieces of color data.

Furthermore, it is another object of the present invention to provide a method of converting pictures displayed on a first color picture device, such as a CRT display, etc., to color data for a second color picture device without changing all the hue values of the first color data in order to faithfully reproduce the pictures on the second color device, such as a printer, etc.

Furthermore, it is another object of the present invention to provide a method of converting pictures displayed on a first color picture device, such as a CRT display, etc., to the color data of the primary and secondary colors with high saturation of a second color picture device without the loss of the vividness of the primary and secondary colors with high saturation of the first color picture device in order to reproduce the pictures on the second color picture device, such as a printer, etc.

Furthermore, it is another object of the present invention to implement a method of converting the registration data of a color conversion table such that errors based on the interpolation operation can be removed.

According to the first aspect of the present invention, in a color conversion method of generating second color data included in the second gamut of a second color picture device from the first color data included in the first gamut of a first color picture device, the color data conversion method of the present invention comprises the steps of calculating third color data which are included in the second gamut and correspond to the saturation value of the first color data, and calculating the second color data to convert the first color data toward third color data included in the second gamut.

Then, particularly in the step of calculating the third color data, the third color data are calculated in such a way that the data may be included in the second gamut, and the greater is the saturation value of the first color data, the greater may become the saturation value of the third color data.

Furthermore, in the step of calculating the third color data, fourth color data with the highest saturation of the color data included in a first gamut are calculated in the same hue as the first color data, fifth color data with the highest saturation of the color data included in a second gamut are calculated in the same hue as the first color data, and third color data are calculated in such a way that the third color data can be included in the second gamut, the greater is the saturation value of the first color data, the greater may become the saturation value of the third color data, and the saturation value of the third color data may become nearly equal to the saturation value of the fifth color data, when the saturation value of the first color data is nearly equal to the saturation value of the fourth color data.

Furthermore, in the step of calculating the third color data, fifth color data with the highest saturation of the color data included in a second gamut are calculated in the same hue as the first color data, a first difference in lightness value between the first color data and the fifth color data, and third color data are calculated in such a way that the third color data may be included in the second gamut and the saturation value of the third color data can be determined by two factors, one being a factor in which the greater is the saturation value of the first color data, the greater becomes the saturation value of the third color data, and the other being a factor in which the greater is the first lightness difference value, the smaller becomes the saturation value of the third color data.

Furthermore, in the step of calculating the third color data, the third color data are calculated on a first straight line connecting sixth color data being an achromatic color and the fifth color data.

Furthermore, in the step of calculating the third color data, the sixth color data are for an achromatic color with lightness value nearly equal to that of the fifth color data, and in the step of calculating the third color data, the sixth color data are for an achromatic color with lightness value nearly equal to a mean value between the maximum lightness value and the minimum lightness value of the second gamut.

Furthermore, in the step of calculating the second color data, a second straight line is connected between the first color data and the third color data, and color data positioned at the intersecting point of the second straight line and the outermost boundary of the second gamut are calculated as second color data, the first color data and the third color data are connected by the second straight line, seventh color data positioned at the cross point of the second straight line and the outermost boundary of the first gamut are calculated, eighth color data positioned at the cross point of the second straight line and the outermost boundary of the second gamut are calculated, and color data obtained by dividing the part of a line on the second straight line surrounded with the third color data and the eighth color data based on the ratio of distance between the third color data and the seventh color data to the distance between the third color data and the first color data are calculated.

According to the second aspect of the present invention, in a color data conversion method of generating second color data included in the second gamut of a second color picture device, a color data conversion method comprises the steps of calculating a shift amount value from the hue angle value, lightness value and saturation value of first color data, and converting the hue angle value of the first color data based on the shift amount value.

In the step of calculating the shift amount value, a multi-dimensional table is used to calculate the shift amount value.

Alternatively, when the first color data are color data representing blue or purple of the first color picture device, the step of calculating the shift amount value is a process of calculating the shift amount value to reduce the hue angle value.

Furthermore, when the first color data are color data representing colors in the neighborhood of the primary and secondary colors of the first color picture device, the step of calculating the shift amount value is a step of calculating a shift amount value to convert the hue angle value of first color data to that of color data representing color in the neighborhood of the primary and secondary colors of the second color picture device.

Alternatively, the step of converting the hue angle value of the first color data based on the shift amount value is a step of rotating the first color data around the color data of an achromatic color with the same lightness as the first color data based on the shift amount value, and converting the hue angle value of the first color data.

In a color conversion system for generating the second value of a color space which is included in the second gamut of a second color picture device and is dependent on the second color picture device, from the first value of a color space which is included in the first gamut of a first color picture device and is dependent on the first color picture device, the color conversion system of the present invention comprises a unit for converting the value of the color space dependent on the first color picture device to the third value of the color space independent of devices, a unit for calculating a shift amount value from the hue angle value, lightness value and saturation value of the third value of the color space, a unit for converting the hue angle value of the third value of the color space based on the shift amount value, and a unit for converting the third value of the color space of which the hue angle value is converted, to the second value of a color space dependent on the second color picture device.

The modification method of registration data registered in the color conversion table of the present invention in which the correspondences between colors before and after conversion to be referred to at the time of conversion are stored, comprises the steps of referring to the correspondences of colors to be guaranteed, selecting data of which the registration value is modified, and modifying the registration data so as to guarantee the referred correspondence.

BRIEF DESCRIPTION OF THE DRAWINGS

FIG. 7 explains the conventional generation method of a color conversion table.

FIG. 15 explains the principle of the second aspect of the color data conversion method.

FIG. 16 is a shift amount value table used when first color data are for colors in the blue or purple fields.

FIG. 17 is a shift amount value table when first color data are for colors in the magenta field.

FIG. 18 is a shift amount value table used when first color data are for colors in the red field.

FIG. 19 is a shift amount value table when first color data are for colors in the yellow field.

FIG. 20 is a shift amount value table used when first color data are for colors in the green field.

FIG. 21 is a shift amount value table when first color data are for colors in the cyan field.

FIG. 24 is a flowchart showing a conversion method using a color data saturation conversion process.

FIG. 41 shows an example of the configuration of the color conversion table of the first preferred embodiment.

FIG. 42 shows an example of the configuration of the color conversion table of the third preferred embodiment.

DESCRIPTION OF THE PREFERRED EMBODIMENTS

Figure 1:
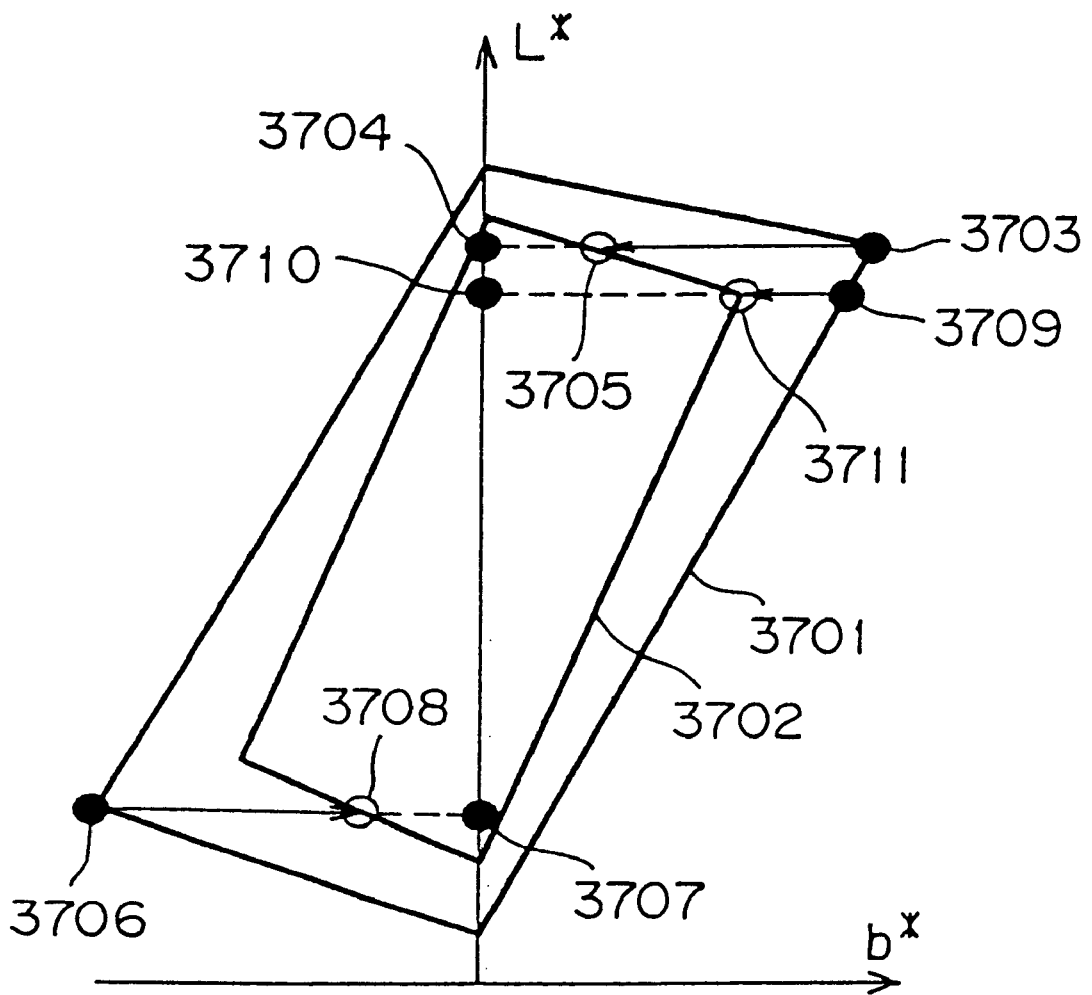
FIG. 1 explains a conventional color data conversion method (No. 1).
Figure 2:
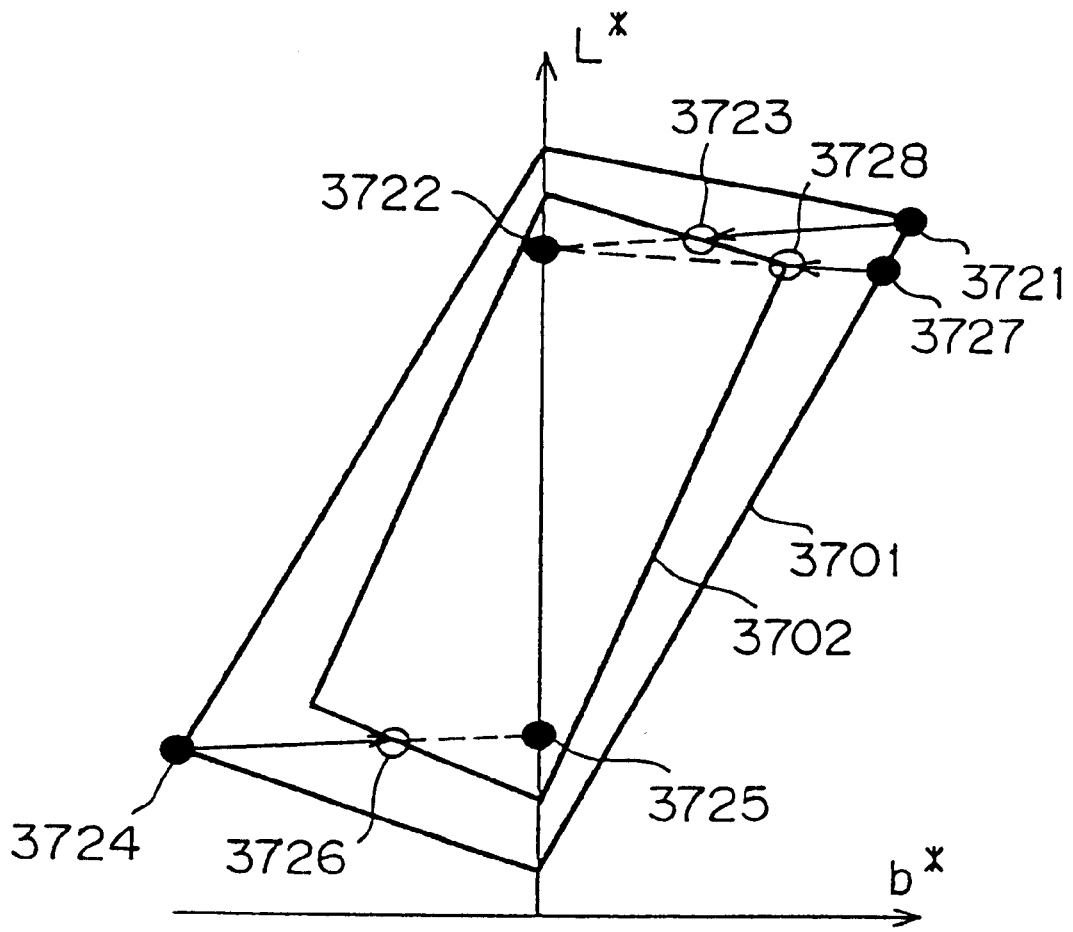
FIG. 2 explains a conventional color data conversion method (No. 2).
Figure 3:
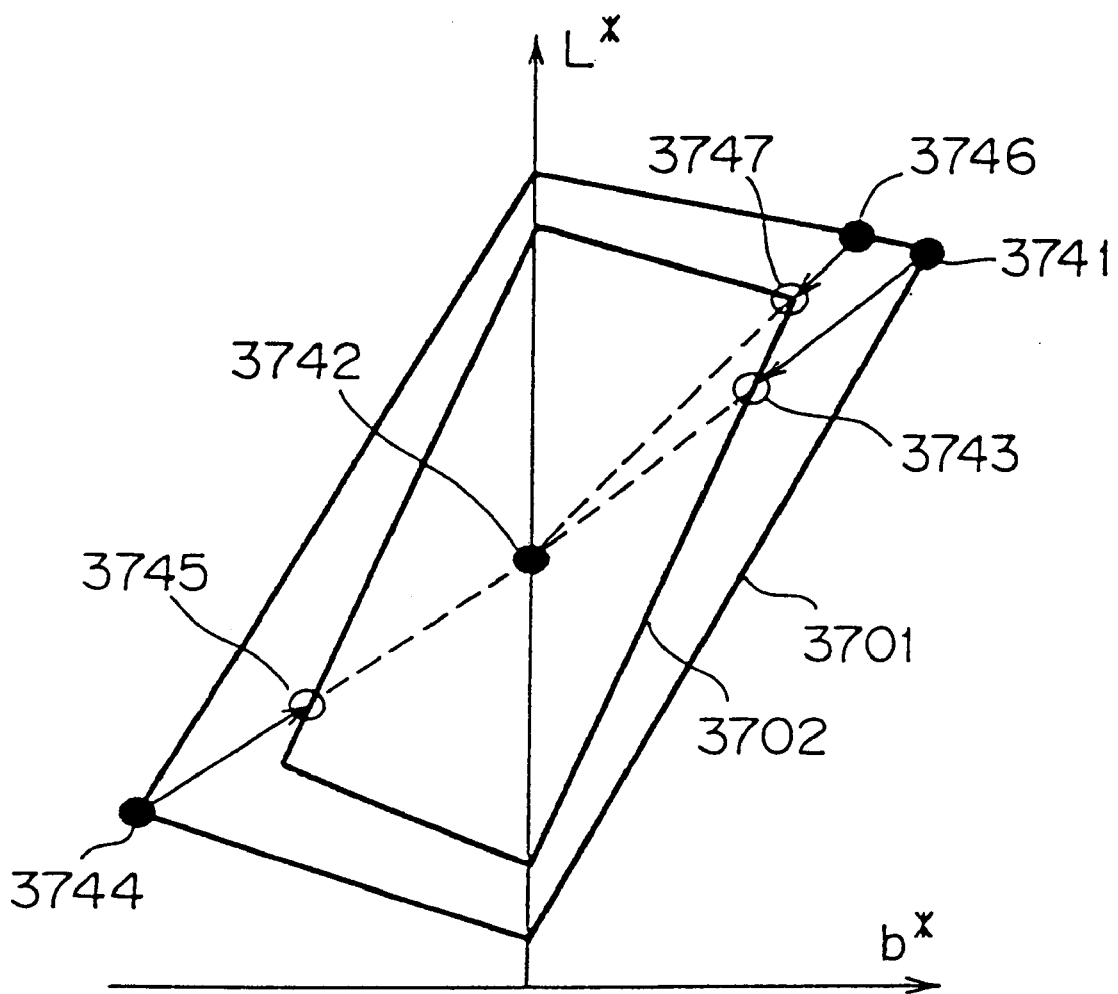
FIG. 3 explains a conventional color data conversion method (No. 3).
Figure 4:
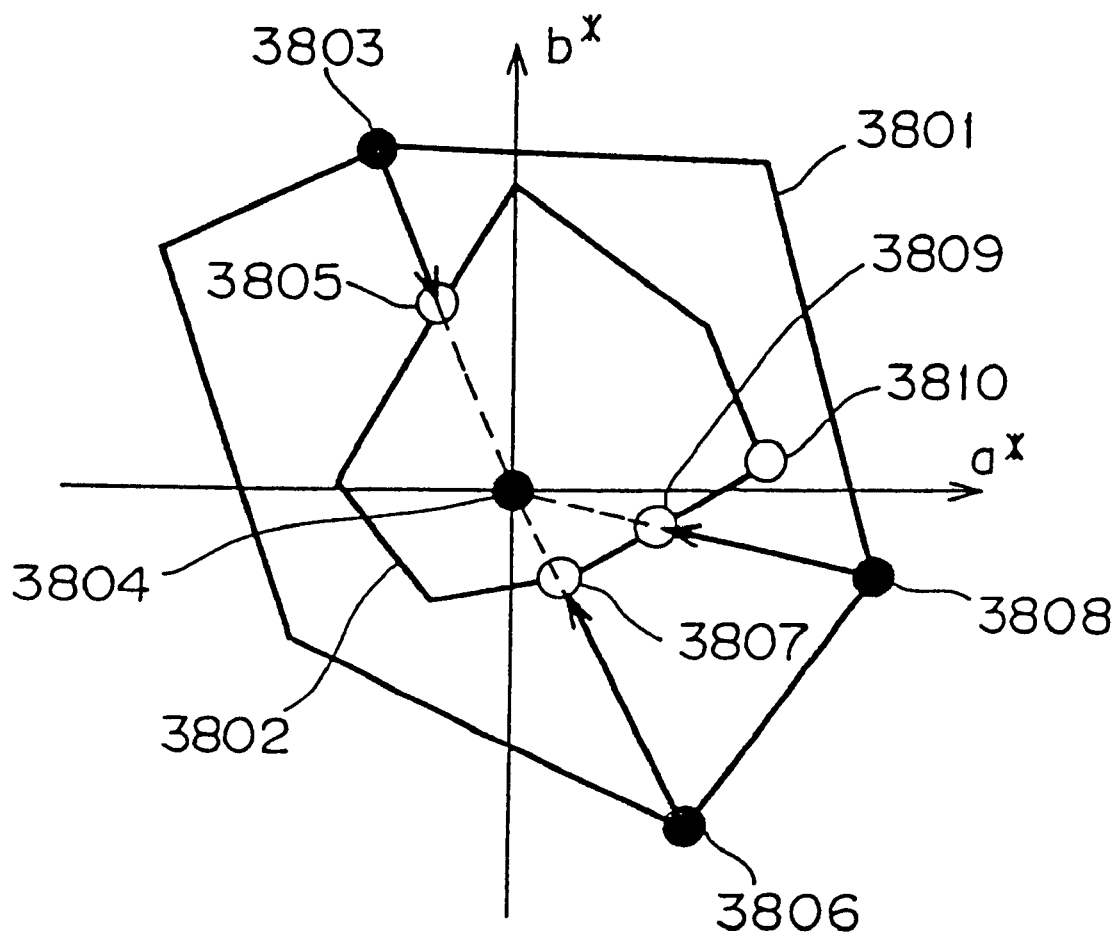
FIG. 4 explains a conventional color data conversion method (No. 4).
Figure 5:
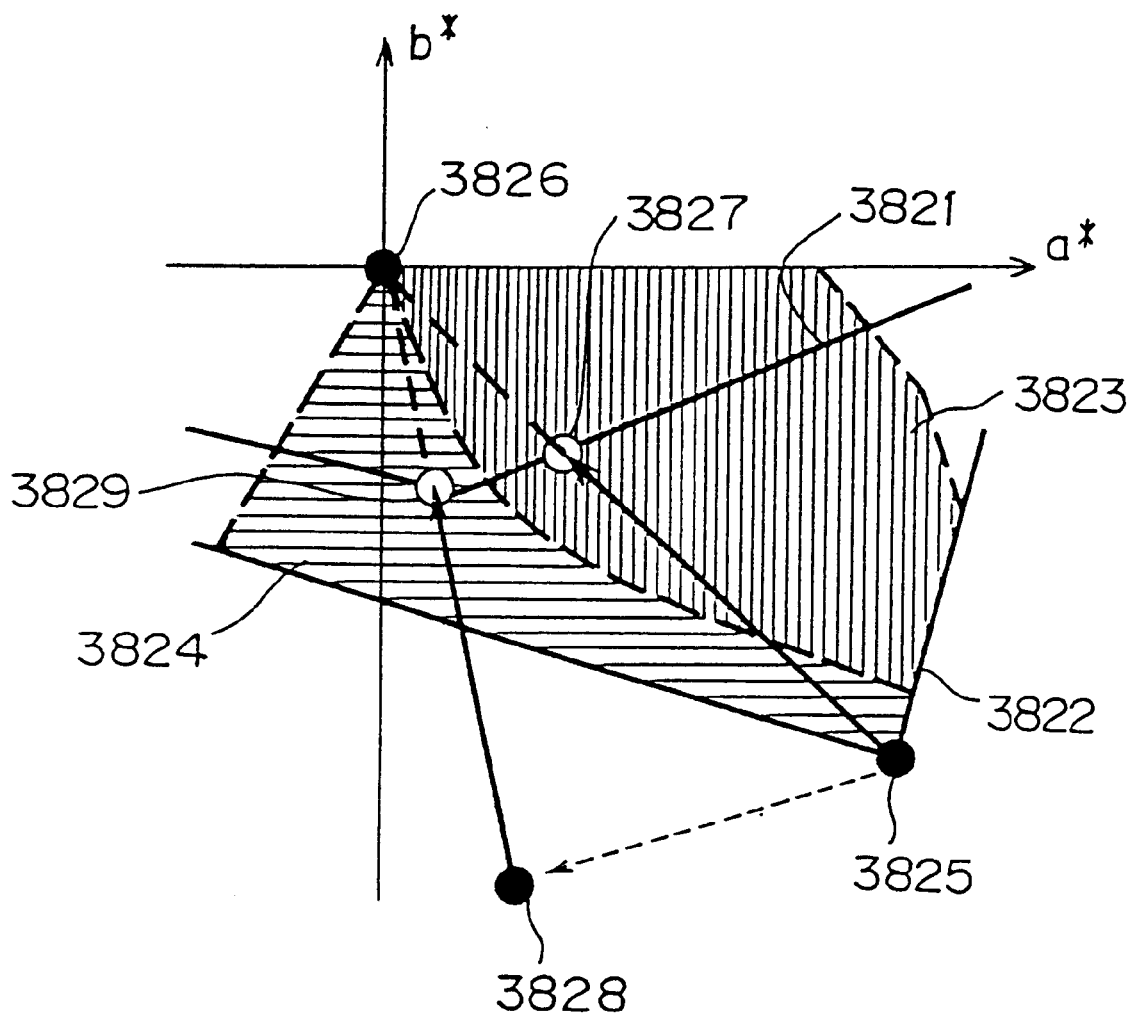
FIG. 5 explains a conventional color data conversion method (No. 5).
Figure 6:
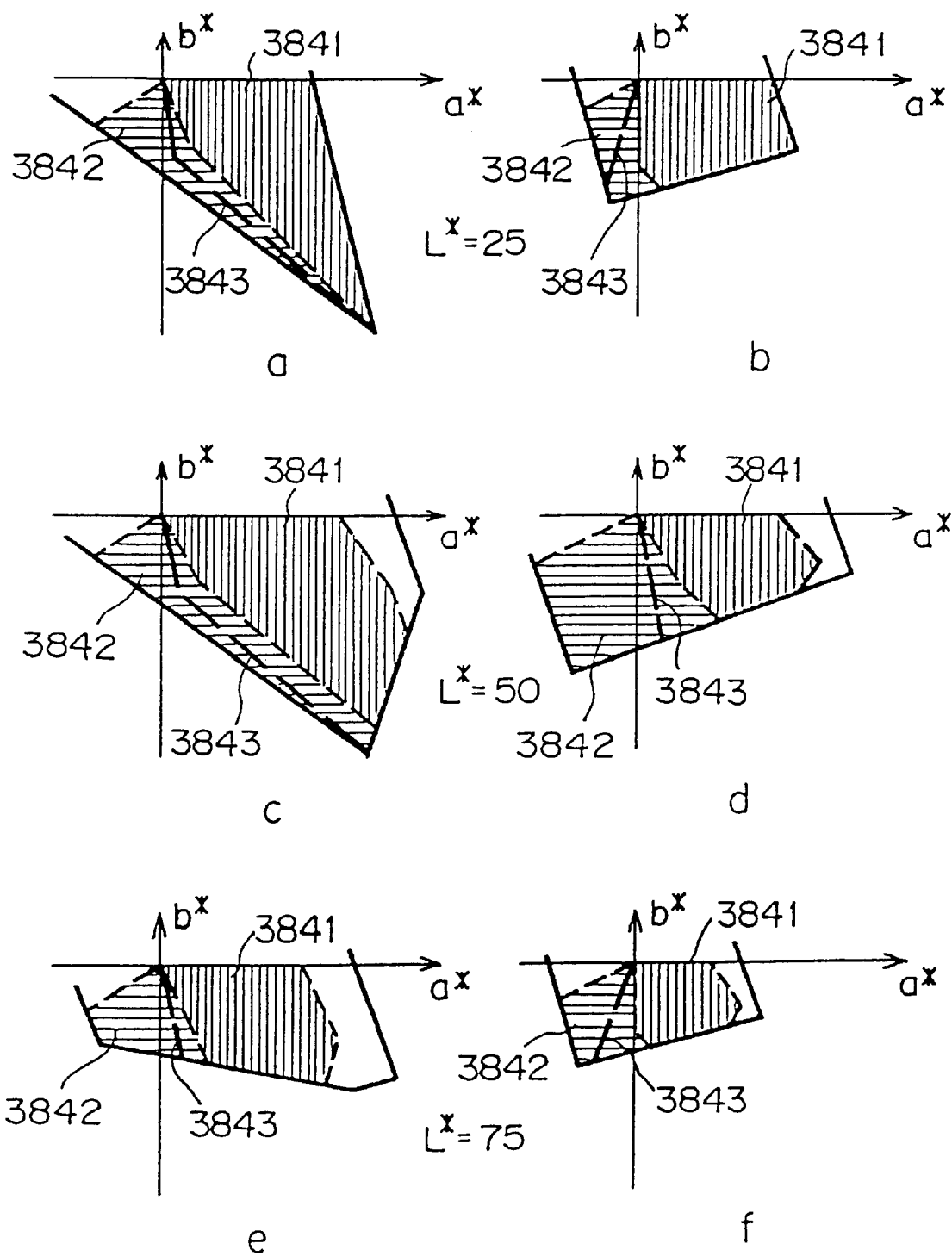
FIG. 6 shows blue and purple fields at the lightness values of 25, 50 and 75 of both a printer and a CRT display.
Figure 8:
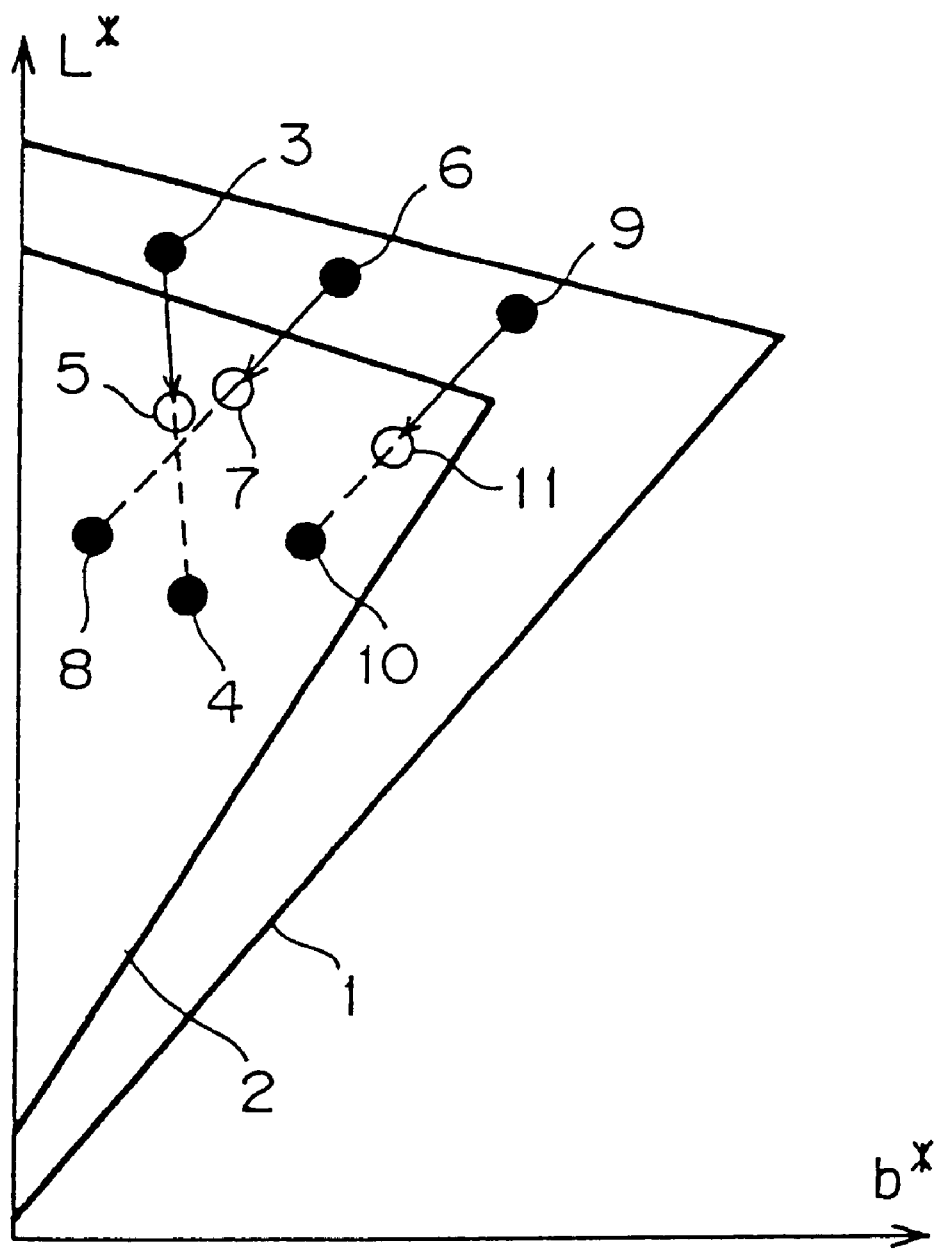
FIG. 8 explains the first principle of the first aspect of the color data conversion method of the present invention.

FIG. 8 explains the first principle of the first aspect of the color data conversion method of the present invention. FIG. 8 shows an L*b* space being the cross section of the yellow field. 1 and 2 shown in FIG. 8 are the first gamut of a first color picture device (a device for handling color data of input/output devices such as a printer, display, scanner, etc. or a personal computer) and the second gamut of a second color picture device, respectively. As shown in FIG. 8, the first gamut and the second gamut differ in the range. 3, 6 and 9 are first color data included in the first gamut, and 4, 8 and 10 are third color data calculated so as to correspond to the saturation values of the first color data. 5, 7 and 11 are second color data calculated by converting the first color data toward the third color data so as to be included in the second gamut.

The first color data 3 are converted toward the third color data 4 corresponding to the color data, and the second color data 5 included in the second gamut are calculated. The first color data 6 are converted toward the third color data 8 corresponding to the color data, and the second color data 7 included in the second gamut are calculated. The first color data 9 are converted toward the third color data 10 corresponding to the color data, and the second color data 11 included in the second gamut are calculated.

In the configuration shown in FIG. 8, the third color data 4, 8 and 10 are calculated based on the saturation values of the first color data 3, 6 and 9, and the first color data 3, 6 and 9 are converted toward the third color data 4, 8 and 10, respectively, to generate the second color data 5, 7 and 11. Since the third color data 4, 8 and 10 are calculated so as to have some degree of saturation, conversion can be performed without the reduction of the saturation of color data particularly in yellow and blue fields compared with the conventional methods.

Figure 9:
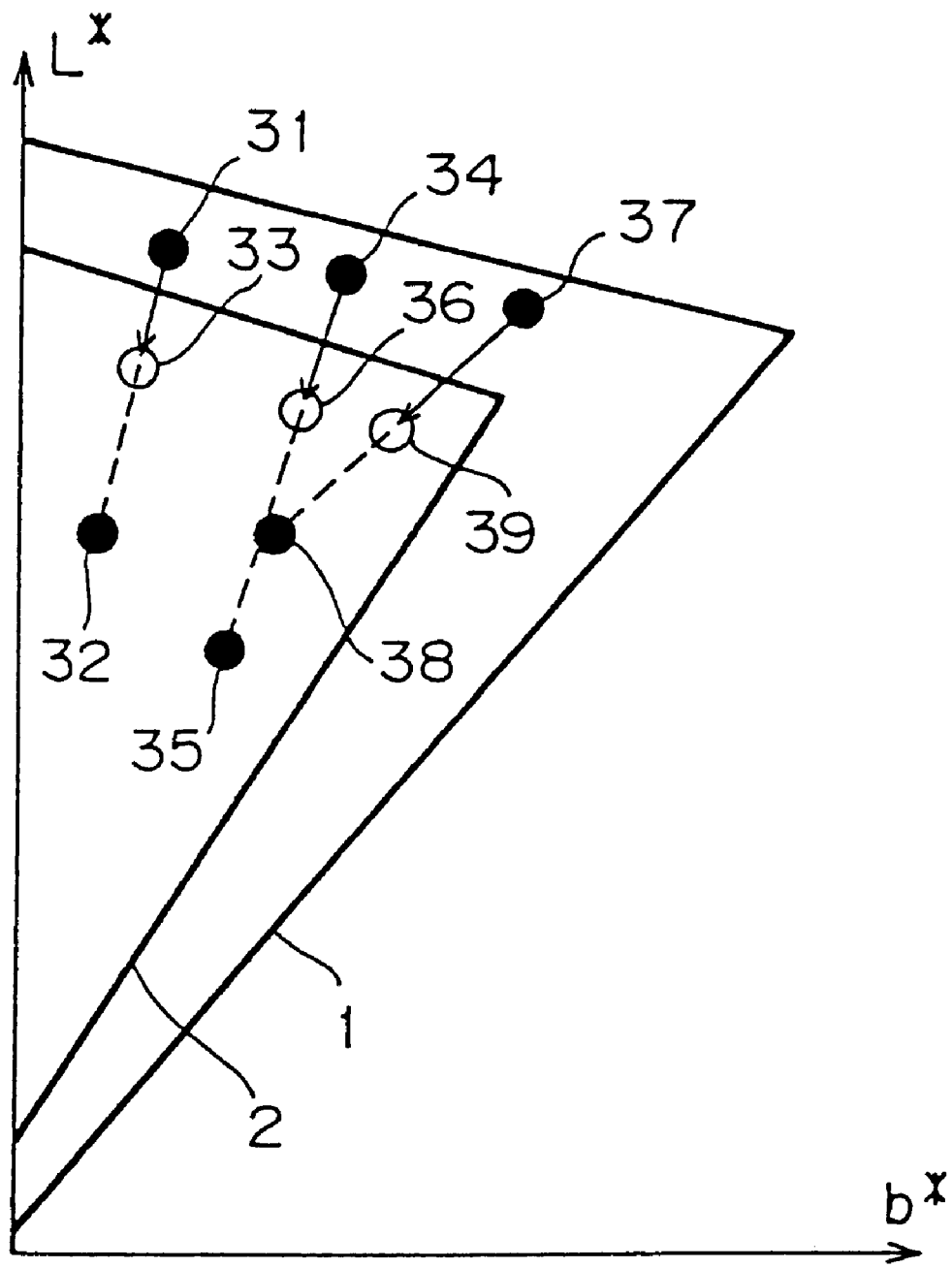
FIG. 9 explains the second principle of the first aspect of the color data conversion method of the present invention.

FIG. 9 explains the second principle of the first aspect of the color data conversion method of the present invention.

1 and 2 shown in FIG. 9 are the same as those in FIG. 8. 31, 34 and 37 are first color data included in a first gamut, and 32, 35 and 38 are the third color data which are included in the second gamut and which are calculated so that the greater is the saturation value of the first color data, the greater may become the saturation of the third color data. 33, 36 and 39 are second color data which are calculated by converting the first color data toward third color data so as to be included in the second gamut.

In the configuration shown in FIG. 9, the first color data 31, 34 and 37 are converted toward the third color data 32, 35 and 38 which are calculated so that the greater is the saturation value of the first color data, the greater may become the saturation value of the third color data. Since the first color data 37 with high saturation are converted toward the third color data 38 with high saturation, conversion can be performed without a reduction of the saturation of color data, particularly in the yellow and blue fields, compared with the conventional methods. Since the method is also designed so that the greater is the saturation of the first color data, the greater may become the saturation of the third color data, the reversion of saturation order hardly occurs before and after the conversion of the two pieces of color data.

Figure 10:
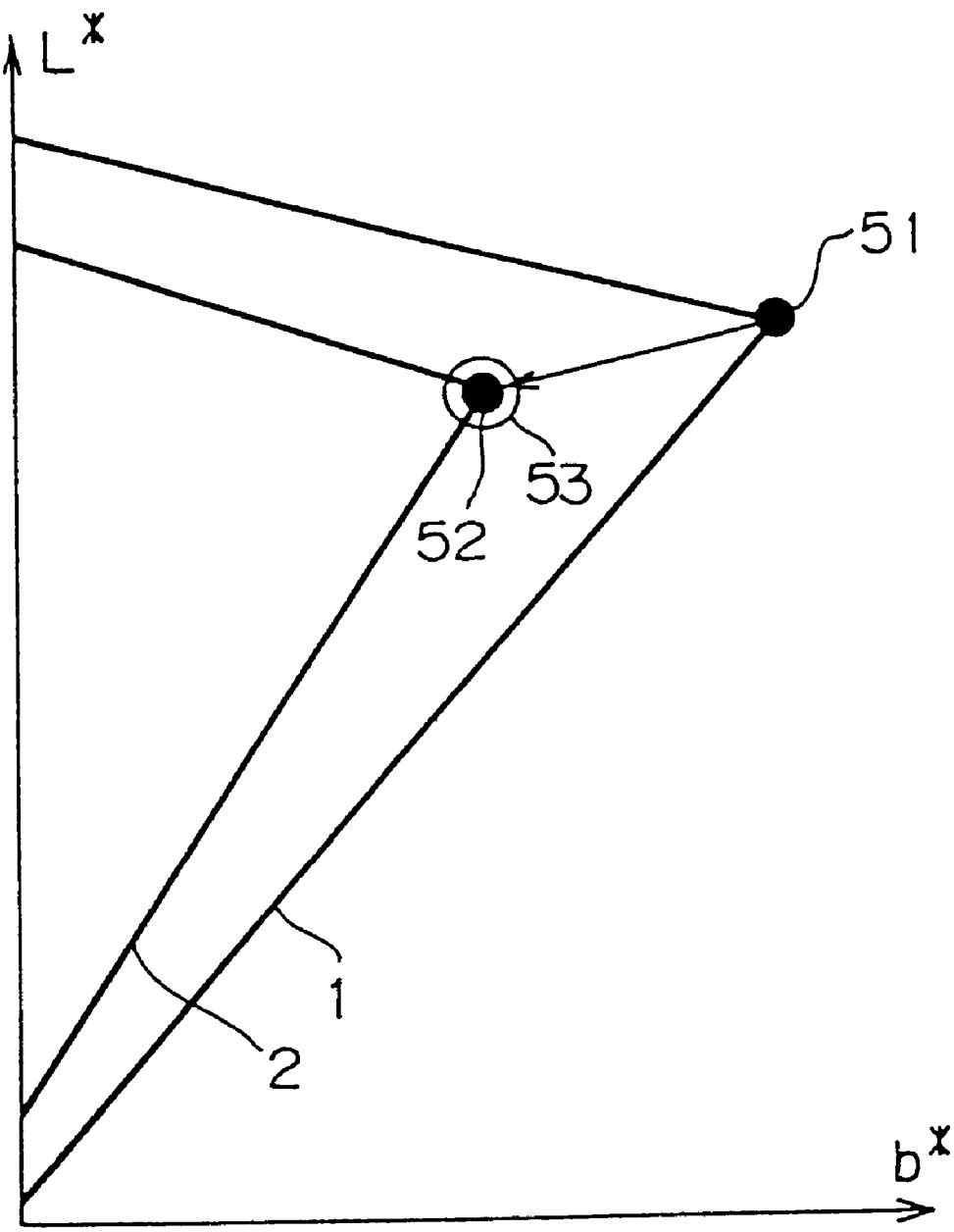
FIG. 10 explains the third principle of the first aspect of the color data conversion method of the present invention.

FIG. 10 explains the third principle of the first aspect of the color data conversion method of the present invention.

1 and 2 shown in FIG. 10 are the same as those shown in FIG. 8. 51 shown in FIG. 10 is fourth color data with the highest saturation of color data included in the first gamut in the same hue as the first color data. 52 shown in FIG. 10 is fifth color data with the highest saturation of color data included in the second gamut in the same hue as the first color data.

51 shown in FIG. 10 also indicates first color data included in the first gamut with the same saturation value as that of the fourth color data 51, that is, the first color data in the same position as the fourth color data. 52 shown in FIG. 10 also indicates third color data calculated in such a way that when the saturation value of the first color data are nearly equal to that of the fourth color data, the third color data may become nearly equal to the fifth color data. The first color data 51 are converted toward the third color data 52 so as to be included in the second gamut. Since the fifth color data 52 are positioned at the peak of the gamut as shown in FIG. 10, and the third color data exist in the same position as the fifth color data, the second color data 53 are calculated so as to be equal to the third and fifth color data 52.

In the configuration shown in FIG. 10, when the saturation value of the fourth color data 41 which are in the same hue as the first color data included in the first gamut and have the highest saturation in the first gamut 1, and the saturation value of the first color data 51 are equal, the third color data 53 are made equal to the fifth color data 53 which are in the same hue as the first color data and have the highest saturation in the second gamut. Thus, when compared with the conventional method not only the reduction of the saturation of color data particularly in the yellow and blue fields is reduced, but also the color data with the highest saturation included in the first gamut are converted to the second color data so as to be included, it can be guaranteed that color data in the first gamut are converted to color data with the highest saturation in the second gamut.

Figure 11:
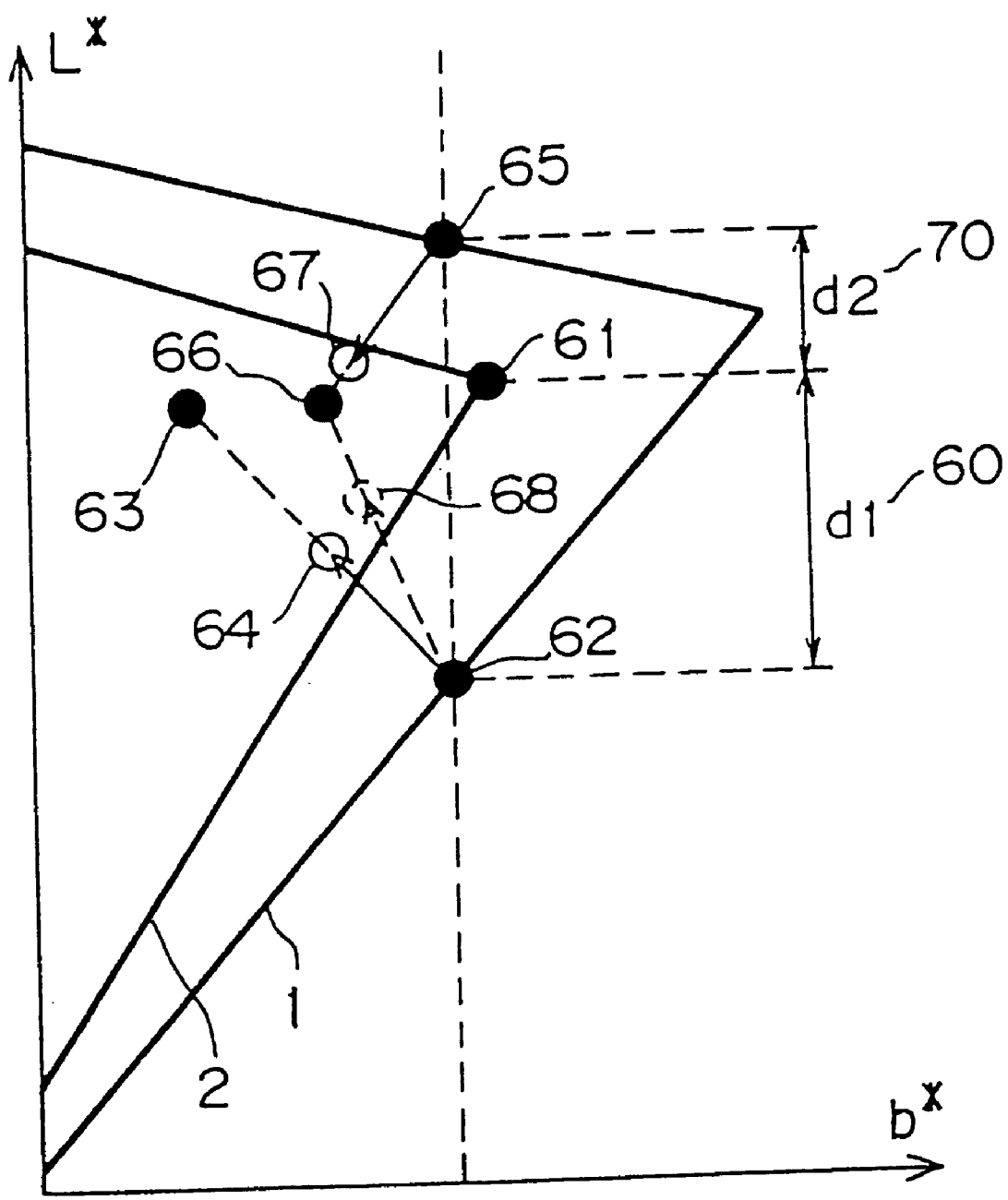
FIG. 11 explains the fourth principle of the first aspect of the color data conversion method of the present invention.

FIG. 11 explains the fourth principle of the first aspect of the color data conversion method of the present invention.

1 and 2 shown in FIG. 11 are the same as those shown in FIG. 8. 65 is first color data included in the first gamut, and the hue values and saturation values of both color data are equal. 61 is fifth color data with the maximum saturation of color data included in the second gamut in the same hue as the first color data 62 and 65. 60 is a difference value in lightness, d1, between color data 61 and 62, and 70 is a lightness difference value d2, between color data 61 and 65.

66 is third color data which are calculated by two factors, one of which is a factor in which the greater is the saturation value of the first color data 65, the greater becomes the saturation of the third color data, and the other is a factor in which the greater is the value of the lightness difference value d2, the smaller becomes the saturation of the third color data. 63 are third color data which are calculated by two factors, one of which is a factor in which the greater is the saturation of the first color data 62, the greater becomes the saturation of the third color data, and the other is a factor in which the greater is the value of the lightness difference value d1, the smaller becomes the saturation of the third color data.

Then, the first color data 65 are converted toward the third color data 66 to generate second color data 67, and the first color data 62 are converted toward the third color data 63 to generate second color data 64.

In the configuration shown in FIG. 11, when third color data 63 are calculated from the first color data 62, not only the saturation value of the first color data 62, but also the lightness difference value, d1 between the first color data 62 and the fifth color data 61 are used to determine the saturation value of the third color data 63.

In a method of not using lightness difference d1, the first color data 62 are converted toward the third color data 66 calculated by these methods to generate second color data 68. In this case, a problem often occurs that these second data 68 extremely differ in lightness from the first color data 62.

However, in a method shown in FIG. 11, the saturation of the third color data 63 calculated from the first color data is suppressed by the factor of the lightness difference value d1 compared with the color data 66, and as a result, the first color data 62 are converted toward the third color data 63 to generate second color data 64 of which the lightness change is suppressed compared with the second color data 68. Therefore, compared with the conventional method, not only the reduction in saturation value of particularly the yellow and blue fields of the second color data can be suppressed in conversion, but also a problem that the lightness greatly changes, can be avoided.

Figure 12:
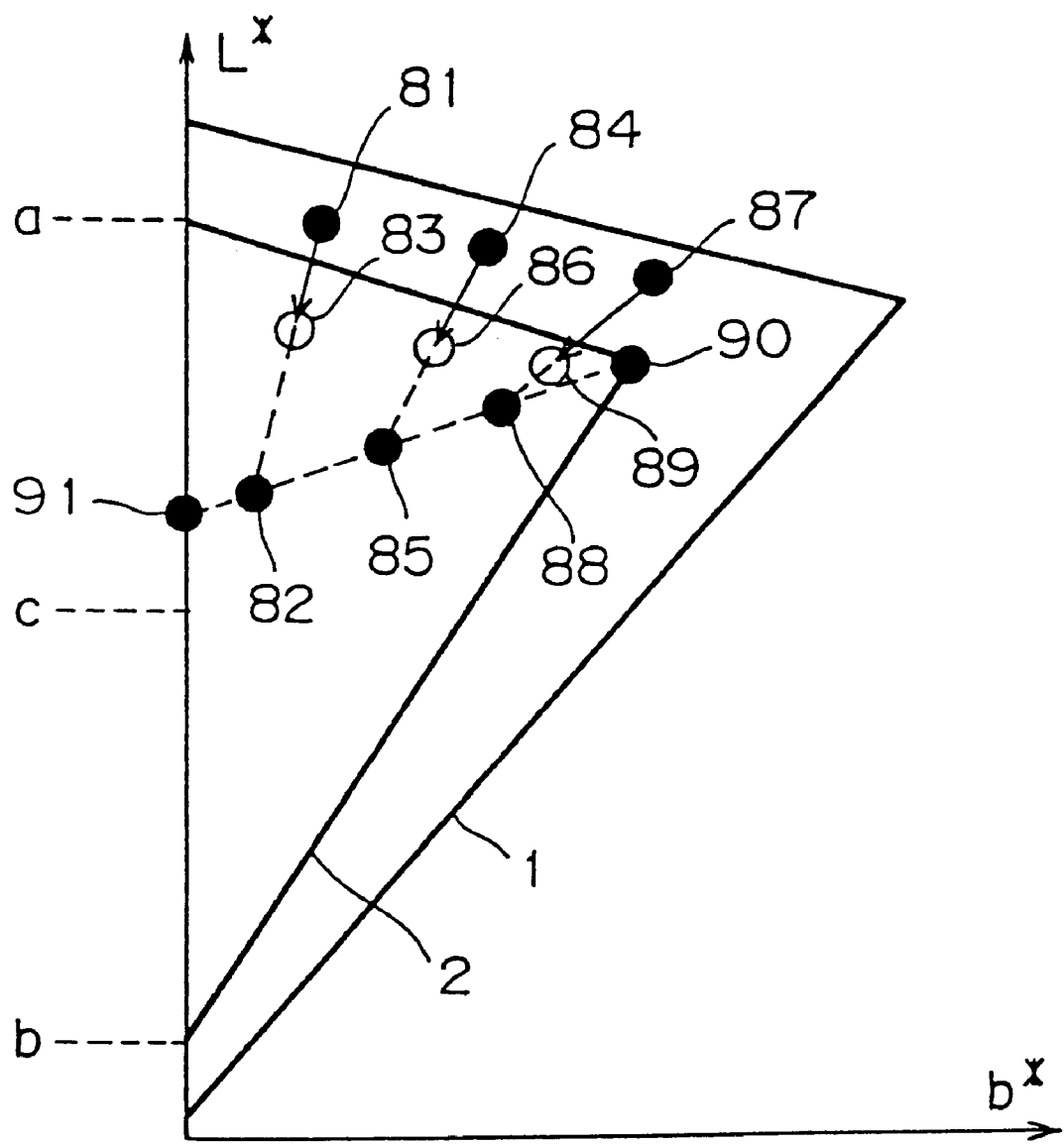
FIG. 12 explains the fifth principle of the first aspect of the color data conversion method of the present invention.

FIG. 12 explains the fifth principle of the first aspect of the color data conversion method of the present invention.

1 and 2 shown in FIG. 12 are the same as those shown in FIG. 8. 81, 84 and 87 shown in FIG. 12 are first color data included in the first gamut. 90 is fifth color data with the maximum saturation of color data included in the second gamut in the same hue as the first color data. 91 is sixth color data of an achromatic color. 82, 85 and 88 are third color data which correspond to the saturation of the first color data and are calculated on the straight line connecting the fifth color data 90 and the sixth color data 91. The first color data 81, 84 and 87 are converted toward the third color data 82, 85 and 88, to generate second color data 83, 86 and 89, respectively.

In the configuration shown in FIG. 12, when the third color data 82, 85 and 88 are calculated from the first color data 81, 84 and 87, respectively, the third color data are calculated so as to be on the straight line connecting the fifth color data 90 and the sixth color data 91. Thus, the second color data 83, 86 and 89 which are calculated by converting the first color data 81, 84 and 87 toward the third color data 82, 85 and 88, respectively, are calculated in a position reflecting the position relation among the first color data 81, 84 and 87. Therefore, not only the reduction of saturation in particularly the yellow and blue fields of the second color data can be suppressed compared with the conventional method, but also the second color data can be calculated in such a way that the relative position relation of a plurality of first color data may not be lost.

Figure 13:
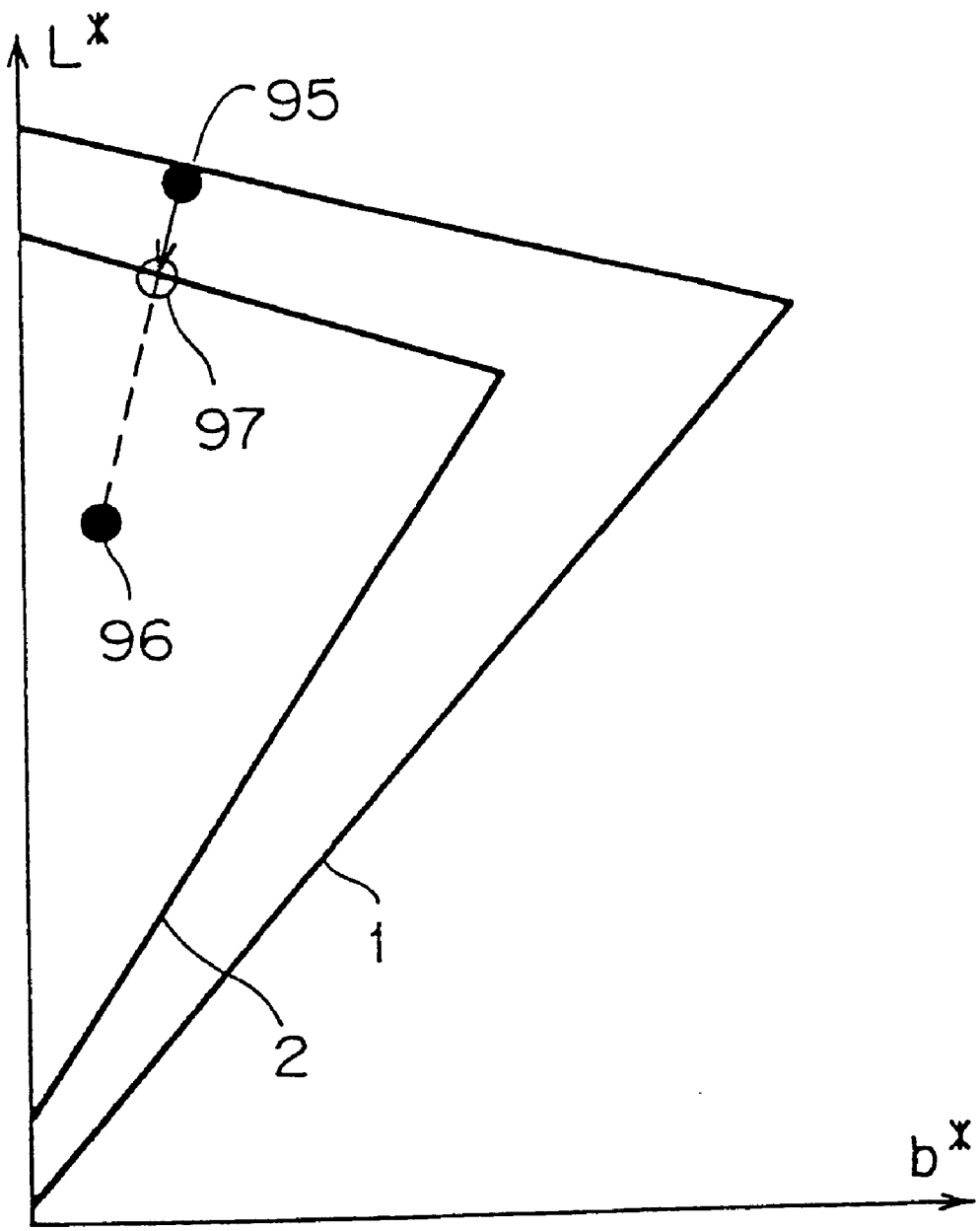
FIG. 13 explains the sixth principle of the first aspect of the color data conversion method of the present invention.

FIG. 13 explains the sixth principle of the first aspect of the color data conversion method of the present invention.

1 and 2 shown in FIG. 13 are the same as those shown in FIG. 8. 95 is the first color data included in the first gamut, and 96 is the third color data calculated based on the saturation value of the first color data. Then, a straight line connecting the first color data 95 and the third color data 96 is calculated, and an intersecting point of the straight line and the second gamut 2 is calculated as second color data 97.

In the configuration shown in FIG. 13, when third color data 96 are calculated from the first color data 95, and second color data 97 are calculated from both the first color data 95 and the third color data 96, the first color data 95 and the third color data 96 are connected with a straight line, and an intersecting point of the straight line and the second gamut is designated as second color data 97. For this reason, when the first color data 95 are converted toward the third color data 96, the second color data 97 becomes nearest to the first color data. Therefore, not only the reduction of saturation value in particularly the yellow and blue fields is suppressed compared with the conventional method, but also the saturation is preserved.

Figure 14:
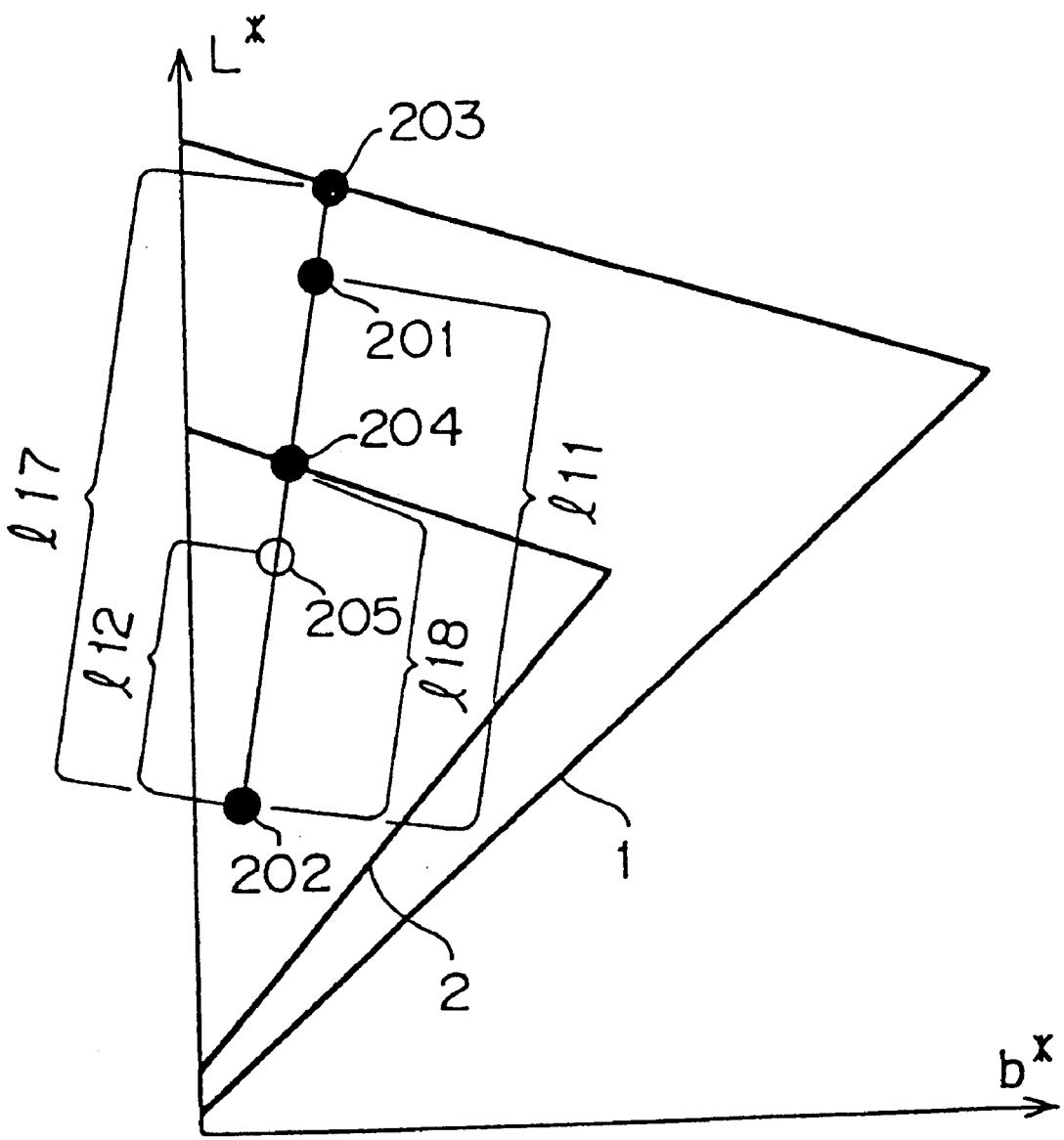
FIG. 14 explains the seventh principle of the first aspect of the color data conversion method of the present invention.

FIG. 14 explains the seventh principle of the first aspect of the color data conversion method of the present invention.

1 and 2 shown in FIG. 14 are the same as those shown in FIG. 8. 201 is the first color data included in the first gamut, and 202 is the third color data calculated based on the saturation value of the first color data. Then, a second straight line connecting the first color data 201 and the third color data 202 is calculated, and intersecting points of the straight line and the first gamut 1 and that of the second straight line and the second gamut 2 are calculated as seventh color data 203 and eighth color data 204, respectively.

Distance $l_{17}$ between the third color data and the seventh color data, distance $l_{11}$ between the third color data and the first color data, and distance $l_{13}$ between the third color data and the eighth color data are calculated. Thus, if the distance between the third color data and the second color data is assumed $l_{12}$ when second color data 205 are calculated on the second straight line, second color data 205 satisfying $(l_{11}/l_{17})=(l_{12}/l_{18})$ is obtained.

In the configuration shown in FIG. 14, the third color data 202 are calculated from the first color data 201, and when the second color data 205 are calculated from both the first color data 201 and the third color data 202, the second color data 205 are calculated so as to satisfy $(l_{11}/l_{17})=(l_{12}/l_{18})$ assuming the distance from the third color data of each of the first, second, seventh and eight color data is $l_{11}$, $l_{12}$, $l_{17}$ and $l_{18}$, respectively. Therefore, not only the reduction in saturation value of color data in particularly the yellow and blue fields is suppressed compared with the conventional method, but also a problem that all the color data outside the second gamut gather on the outermost boundary of the second gamut and gradation collapse occurs, can be avoided.

FIG. 15 explains the principle of the second aspect of the color data conversion method.

301 shown in FIG. 15 is a first color picture device, such as a CRT display, etc. First color data 302 are displayed on the first color data device, and are included in the gamut of the first color picture device. 303 is a shift amount value generation process of generating a shift amount value 304 used to convert the hue angle value of the first color data. The details are described later. 304 is a shift amount value which is calculated in the shift amount value generation process 303. 305 is a color data hue angle value conversion process of converting the hue angle value of the first color data 302 based on both the first color data 302 and the shift amount value 304 which is calculated in the shift amount value generation process 303. 306 are first color data of which the hue angle value is converted in the color data hue angle value conversion process 305. 307 is a color data saturation value conversion process of converting the saturation value of the first color data 302, of which the hue angle value is converted so as to be included in the gamut of the second color picture device. 308 are second color data which are calculated in the color data saturation value conversion process 307. 309 is a second color picture device, such as a printer, etc. to print or display pictures based on the second color data 308. By these means, the first color data 302 representing a color displayed and printed on the first color picture device 301 are converted to the second color data 308 to display or print the first color data 302 on the second color picture device 309.

The details of the shift amount value generation in the shift amount value generation process 303 are described below. This is a process of inputting first color data 302 and outputting a shift amount value 304 to correct the hue angle value of the first color data 302. When in this process the first color data 302 are inputted, three values of the hue angle value, lightness value and saturation value are calculated from the color data. The shift amount value 304 is calculated based on these three values and using a shift amount value tables shown in FIGS. 16 through 21. For example, if the hue angle value, lightness value and saturation value of first color data 302 are 300, 50 and 90 degrees, respectively, the shift amount value 304 calculated in this process becomes −22.5 degrees (See FIG. 16). If the hue angle value, lightness value and saturation value are calculated by converting the first color data 302, the values often become values with decimal places. In this case a shift amount value 304 is calculated by interpolation using the shift amount value tables shown in FIGS. 16 through 21. If the shift amount value is calculated from the hue angle value, lightness value and saturation value of first color data 302, function expressions similar to the shift amount value tables shown in FIGS. 16 through 21 can also be used.

Figure 22:
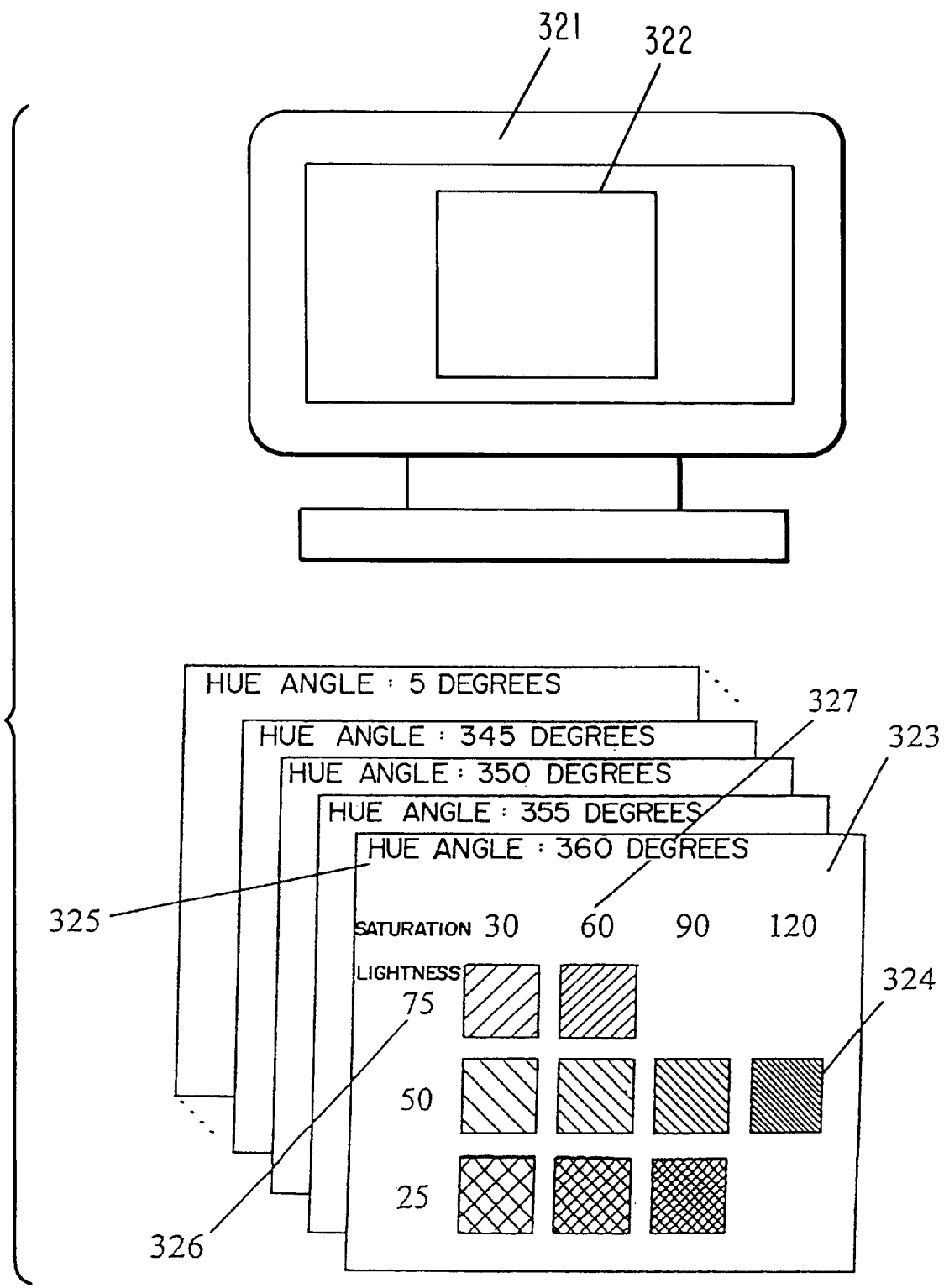
FIG. 22 explains an environment and facilities used when a shift amount conversion table is calculated.
Figure 23:
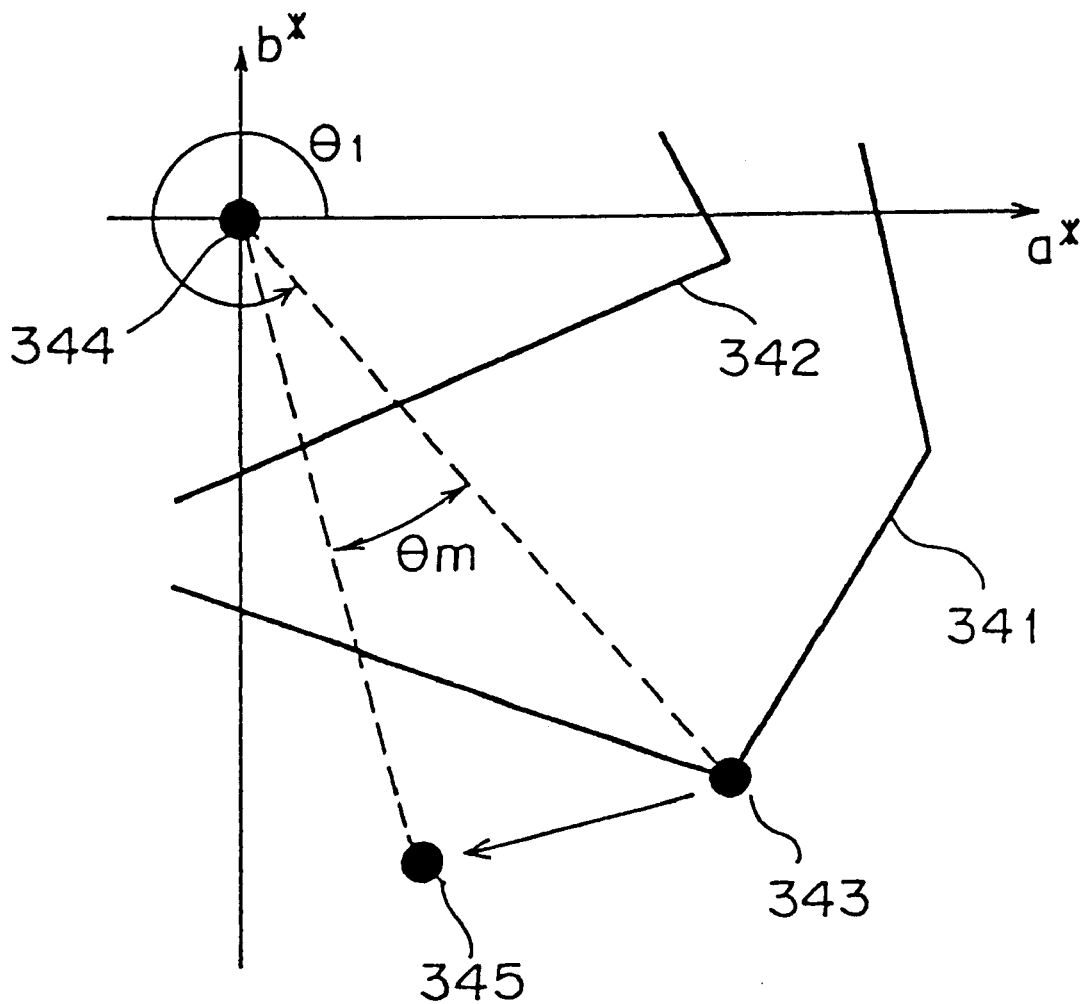
FIG. 23 shows a work flow for determining a shift amount value corresponding to first color data.

Next, the generation method of the shift amount value tables shown in FIGS. 16 through 21 is described. Of the shift amount value tables shown in FIGS. 16 through 21, the shift amount value table shown in FIG. 16 is a table for correcting the distortion of equi-hue lines in blue and purple fields. This shift amount value table is generated using an evaluation color chip 323 on which a plurality of single color patches 324 are printed by both the first color picture device 321 (for example, a CRT display, etc.) and the second color picture device (for example, a printer, etc.). On the evaluation color chip 323, three parameters of the hue angle, saturation and lightness composing second color data are changed at certain intervals and printed by the second color device (In the example shown in FIG. 22, the hue angle, lightness value and saturation value are changed and printed at intervals of 5 degrees within the range of 5 to 360 degrees, 25 degrees within the range of 25 to 75 degrees and 30 degrees within the range of 30 to 120 degrees, respectively). Then, in some of the first color data included in the blue and purple fields where a hue change problem is observed (all the combinations of color data of which the angle, lightness value and saturation value are changed at intervals of 5 degrees within the range of 220 to 320 degrees, 25 degrees within the range of 25 to 75 degrees and 30 degrees within the range of 30 to 120 degrees), shift amount values corresponding to the color data are visually checked by a human eye according to the flow shown in FIG. 24, and a shift amount value table shown in FIG. 16 is generated.

Namely, in step S31, color data to be checked (The hue angle value, lightness value and saturation value are assumed to be A, B and C degrees, respectively) are displayed on the first color picture device as a patch 322. Then, in step S32, a similarity degree in color condition between a patch 324 with A degrees of hue angle value, B degrees of lightness value and C degrees of saturation value, printed on the evaluation color chip 323, and a patch 322 displayed on the first color picture device are subjectively evaluated with scores for each value. In step S33, an evaluation color chip with a hue angle A±approximately 40 degrees is also evaluated with scores in the same way as in the process S32 described above. In step S34, the hue angle value D of an evaluation color chip with the highest evaluation score in all the evaluation items is obtained (If in this case there is a plurality of evaluation color chips with high evaluation scores, the hue angle value D is calculated by interpolation using both the hue angle values of the evaluation color chips and the evaluation scores). In step S35, the checked hue angle value A of the color data is subtracted from the hue angle value D to obtain a shift amount value E (E=D−A). Then, in step S36, the shift amount value E is designated as a shift amount value corresponding to the color data with A degrees of hue angle value, B degrees of lightness value and C degrees of saturation value.

If the first and second color picture devices are a CRT display and a printer, respectively, it is shown in FIG. 16 that a shift amount value to correct the distortion in a field where there is distortion in the equi-hue lines of blue and purple has the following tendencies.

The distortion of equi-hue lines exists in the range of approximately 220 to 320 degrees of a hue angle value.

The shift amount value becomes a maximum when the hue angle value is nearly equal to the hue angle value of color data representing the blue being the primary color of the first color picture device (approximately 300 degrees).

The absolute value of the shift amount value becomes a maximum when the first color data becomes equal to the color data representing the blue being the primary color of the first color picture device, which is approximately 30 degrees.

The absolute value of the shift amount value increases in proportion to the increase of the saturation value of the first color data.

The absolute value of the shift amount value has, under the condition of the same saturation, a tendency that as the lightness value of the first color data increases from a mean value to a high value, the absolute value of the shift amount value increases, and as the lightness value of the first color data decreases from a mean value to a low value, the absolute value of the shift amount value also increases. In this case, the absolute value of the shift amount value in the case where the lightness of the first color data is low or high, is approximately 1.5 times that in the case that the lightness of the first color data is intermediate.

The shift amount value tables shown in FIGS. 17 through 21 are used to maintain the saturation of colors in the neighborhood of primary and secondary colors with high saturation which are displayed or printed on the first color picture device. FIG. 17, FIG. 18, FIG. 19, FIG. 20 and FIG. 21 are for magenta, red, yellow, green and cyan, respectively. The generation method is common to all the cases of FIGS. 17 through 21.

As the typical example, the preparation method of a shift amount value table for magenta shown in FIG. 17 is described below. First, the hue angle value $\theta_1$, saturation value $C_1$ and lightness value $L^*_1$ of the color data of magenta being the primary and secondary colors of the first color picture device are checked ($\theta_1$=340 degrees, $C_1$=100 degrees and $L^*_1$=55 in a general-purpose CRT display). Then, the hue angle value $\theta_2$, saturation value $C_2$ and lightness value $L^*_2$ of the color data of magenta being the primary and secondary colors of the second color picture device are checked ($\theta_2$=360 degrees, $C_2$=70 degrees and $L^*_2$=50 in a general-purpose CRT display). Then, a value obtained by subtracting the hue angle value $\theta_1$ of the color data of magenta being the primary and secondary colors of the first color picture device from the hue angle value $\theta_2$ of the color data of magenta being the primary and secondary colors of the second color picture device is set to the element value $\theta_{m1}$ of an element g1 with values closest to the hue angle value $\theta_1$, saturation value $C_1$ and lightness value $L^*_1$ ($\theta_{g1}$=340 degrees, $C_{g1}$=90 degrees and $L^*_{g1}$=50 shown in FIG. 17) in the shift amount value table ($\theta_{m1}$=360−340=20 degrees in the example shown in FIG. 17). Then, the ranges of hue angles in a field to be rotated, $\theta_s$ and $\theta_e$ are set ($\theta_s$=320 degrees and $\theta_e$=20 degrees in the example shown in FIG. 17. However, it is assumed here that $\theta_e$=20+360=380 degrees for consideration of calculation expressions). Lastly, a value is set to the element value $\theta_{mn}$ of all the elements gn (hue angle value $\theta_{gn}$, saturation value $C_{gn}$ and lightness value $L^*_{gn}$) included in the ranges of hue angle in a field to be rotated, $\theta_s$ and $\theta_e$ using the following equations.

$$F_\theta = \frac{\theta_{gn} - \theta_s}{\theta_{gl} - \theta_s} \ldots (\theta_{gl} > \theta_{gn} \geq \theta_s)$$

$$F_\theta = \frac{\theta_e - \theta_{gn}}{\theta_e - \theta_{gl}} \ldots (\theta_e > \theta_{gn} \geq \theta_{gl})$$

$$F_c = \frac{60 - |C_{gn} - C_{gl}|}{60} \ldots \text{(where in case } F_c < 0, F_c = 0)$$

$$F_L = \frac{50 - |L^*_{gn} - L^*_{gl}|}{50} \ldots \text{(where in case } F_L < 0, F_L = 0)$$

$$\theta_{mn} = \theta_{ml} \cdot F_\theta \cdot F_C \cdot F_L$$

The details of hue angle value conversion in the color data hue angle value conversion process 307 are described below. This is a process of converting a hue angle value of first color data, $\theta_1$ using a shift amount value $\theta_m$. FIG. 24 shows a first method, in which 341 is the gamut of the first color picture device, 342 is the gamut of the second color picture device, 343 is first color data, 344 is the color data of an achromatic color with the same lightness as the first color data, and 345 is the color data of which the hue angle value is converted. In this method, the first color data 343 are rotated by $\theta_m$ degrees around the color data 344 using a shift amount value $\theta_m$ to obtain the color data 345. This method is effective when both the first color data included in the second field and those not included are to be shifted.

In the second aspect of the present invention, as shown in FIG. 15, when first color data 302 displayed on the first color picture device are converted to second color data 308 printed on the second color picture device 309, first, a shift amount value 304 to correct the hue angle value of the first color data is calculated based on the first color data, and the hue angle value of the first color data 302 is converted by a color data hue angle value converter unit 305 based on the shift amount value 304, then a saturation value is converted by a color data saturation value converter unit 307 in such a way that the first color data are included in the gamut of the second color picture device.

An angle value calculator unit 303 calculates a shift amount value 304 according to the shift amount value table shown in FIGS. 16 through 21. Thus, when first color data 302 are for color in a field where there is a distortion of equi-hue lines of blue, purple, etc., the shift amount value 304 is calculated as a value to convert the hue angle value of the first color data 302 to the hue angle value of second color data with the same hue as the first color data 302. When the first color data 302 represents color in the neighborhood of the primary and secondary colors of the first color picture device, the shift amount value 304 is calculated as a value to convert the hue angle value of the first color data 302 to the hue angle value of color data of color in the neighborhood of the primary and secondary colors of the second color picture device 309.

Figure 25:
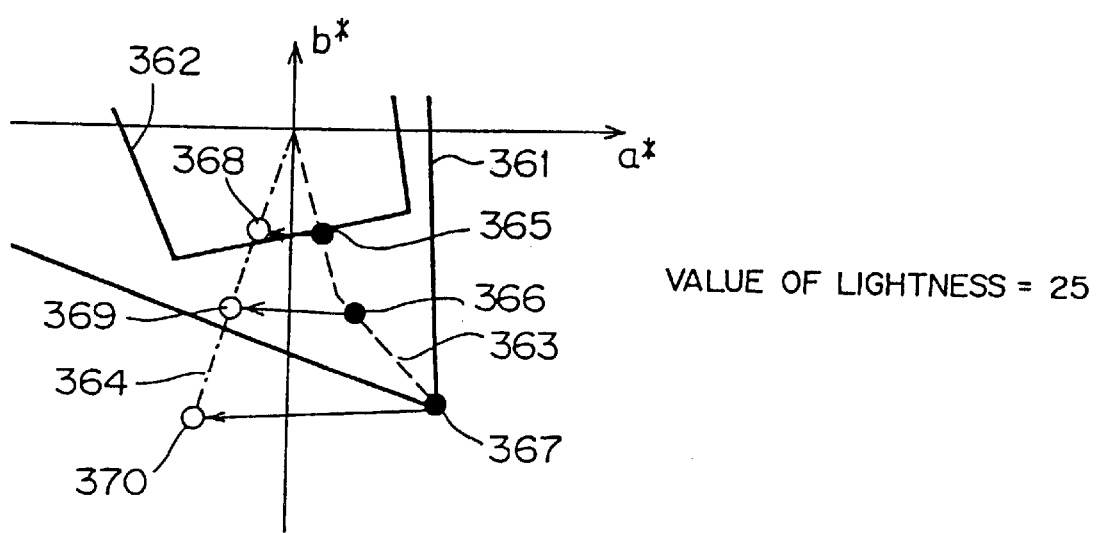
FIG. 25 explains the operations of the present invention performed in the blue and purple fields, particularly in a field with low lightness.
Figure 26:
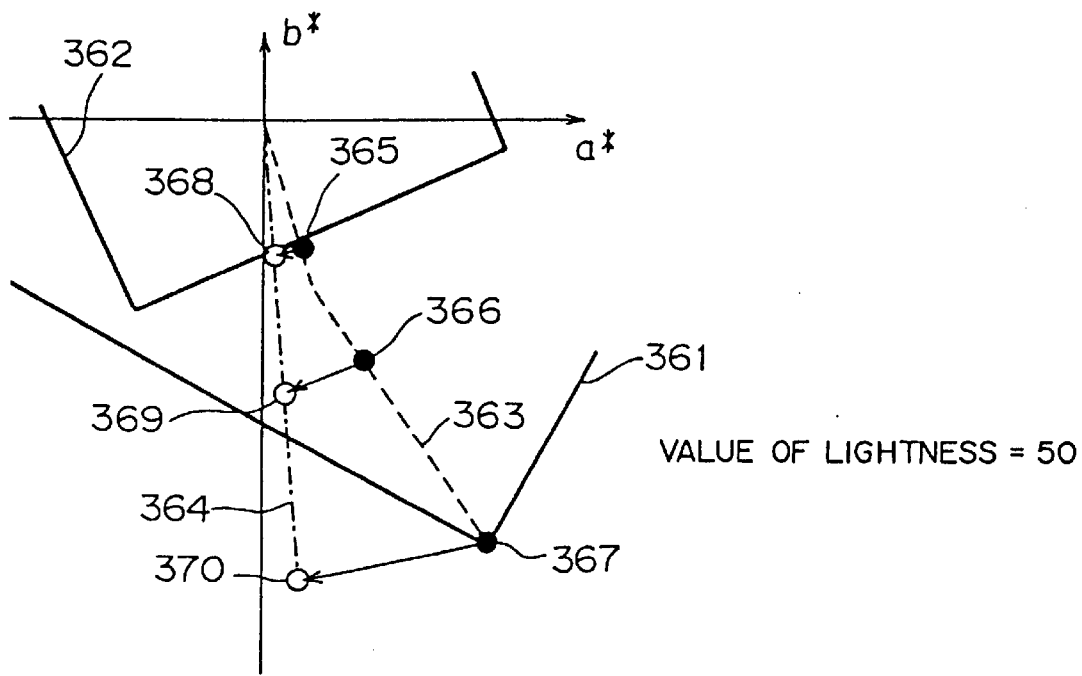
FIG. 26 explains the operations of the present invention performed in the blue and purple fields, particularly in a field with intermediate lightness.
Figure 27:
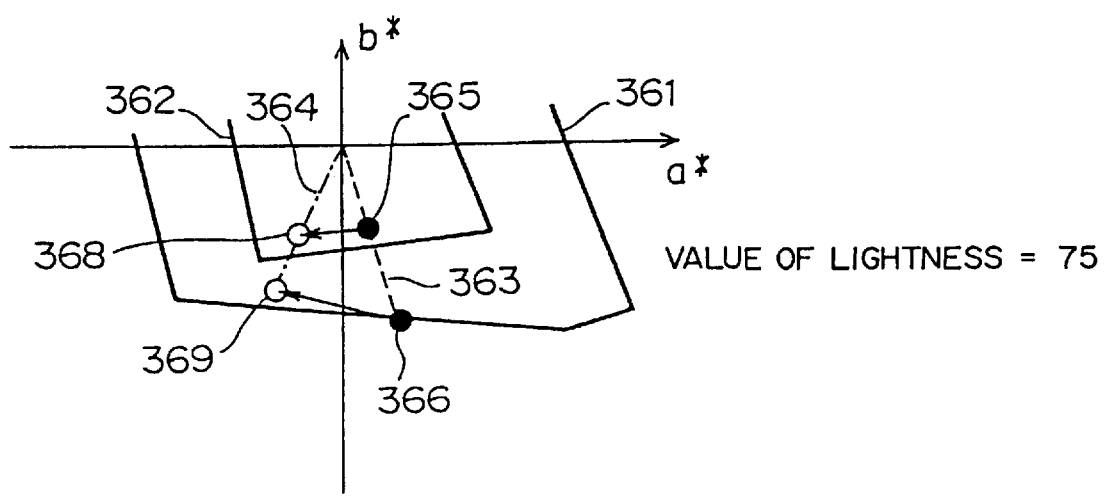
FIG. 27 explains the operations of the present invention performed in the blue and purple fields, particularly in a field with high lightness.

Therefore, when the first color data are for color in a field where there is a distortion of equi-hue lines of blue, purple, etc., in each case of low lightness as shown in FIG. 25, intermediate lightness shown in FIG. 26 and high lightness shown in FIG. 27, first color data 365, 366 and 367 which are included in the gamut 361 of the first color picture device 301 and are on an equi-hue line 368 are converted to color data 368, 369 and 370, respectively, which have the same hue as the first color data 365, 366 and 367, respectively, and have the same hue angle value as that of second color data 308 included in the gamut 362 of a second color picture device 309. For this reason, second color data 308 obtained by reducing the saturation value with the hue angle value kept constant by a color data saturation converter unit 307 in such a way that the color data 368, 369 and 370 may become the second color data 308 included in the gamut 362 of the second color picture device, become color data with the same hue as the first color data 365, 366 and 367. Therefore, all the first color data 302 can be converted to second color data 308 without the hue being changed.

Figure 28:
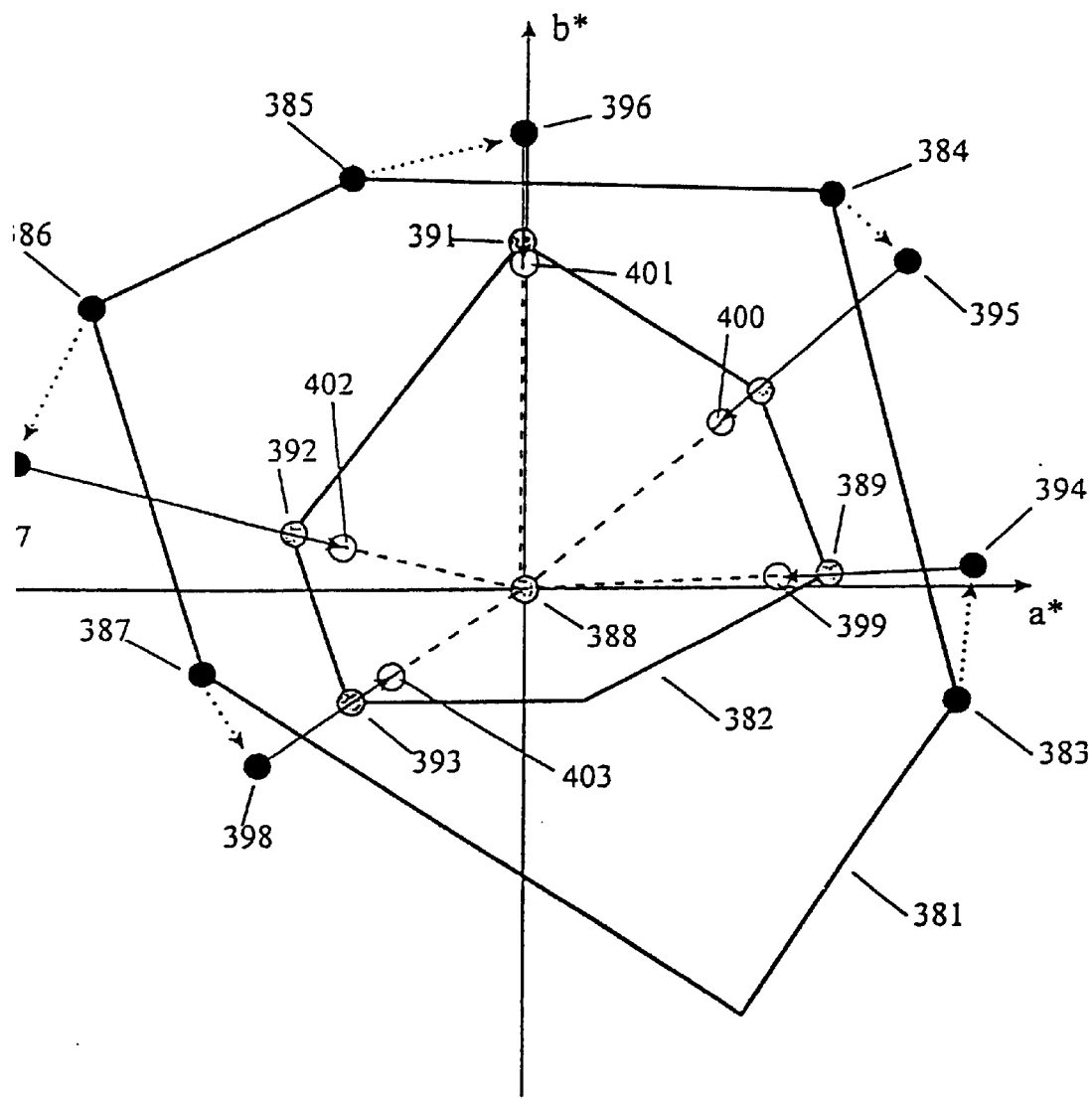
FIG. 28 explains the operations of the second aspect of the color data conversion of the present invention.

When first color data 302 are for color in the neighborhood of the primary and secondary colors of a first color picture device, as shown in FIG. 28, first color data 383, 384, 385, 386 and 387 which are included in the gamut 381 of the first color picture device and are for color in the neighborhood of the primary and secondary colors of the first color picture device, are converted to color data 394, 395, 396, 397 and 398, respectively, with the same hue angle as second color data 389, 390, 391, 392 and 393, respectively, which are included in the gamut of a second color picture device 309 and are for colors in the neighborhood of the primary and secondary colors of the first color picture device. Then, second color data 399 to 403 are obtained by reducing the saturation value with the hue angle value kept constant by a color data saturation converter unit 307 in such a way that the color data 394, 395, 396, 397 and 398 may become the second color data 308 included in the gamut 362 of the second color picture device. Therefore, the first color data 383 to 398 which have high saturation and are for colors in the neighborhood of the primary and secondary colors of the first color picture device, can be converted without losing the saturation to second color data 399 to 403 which have high saturation and are for colors in the neighborhood of the primary and secondary colors of the second color picture device 309.

Figure 29:
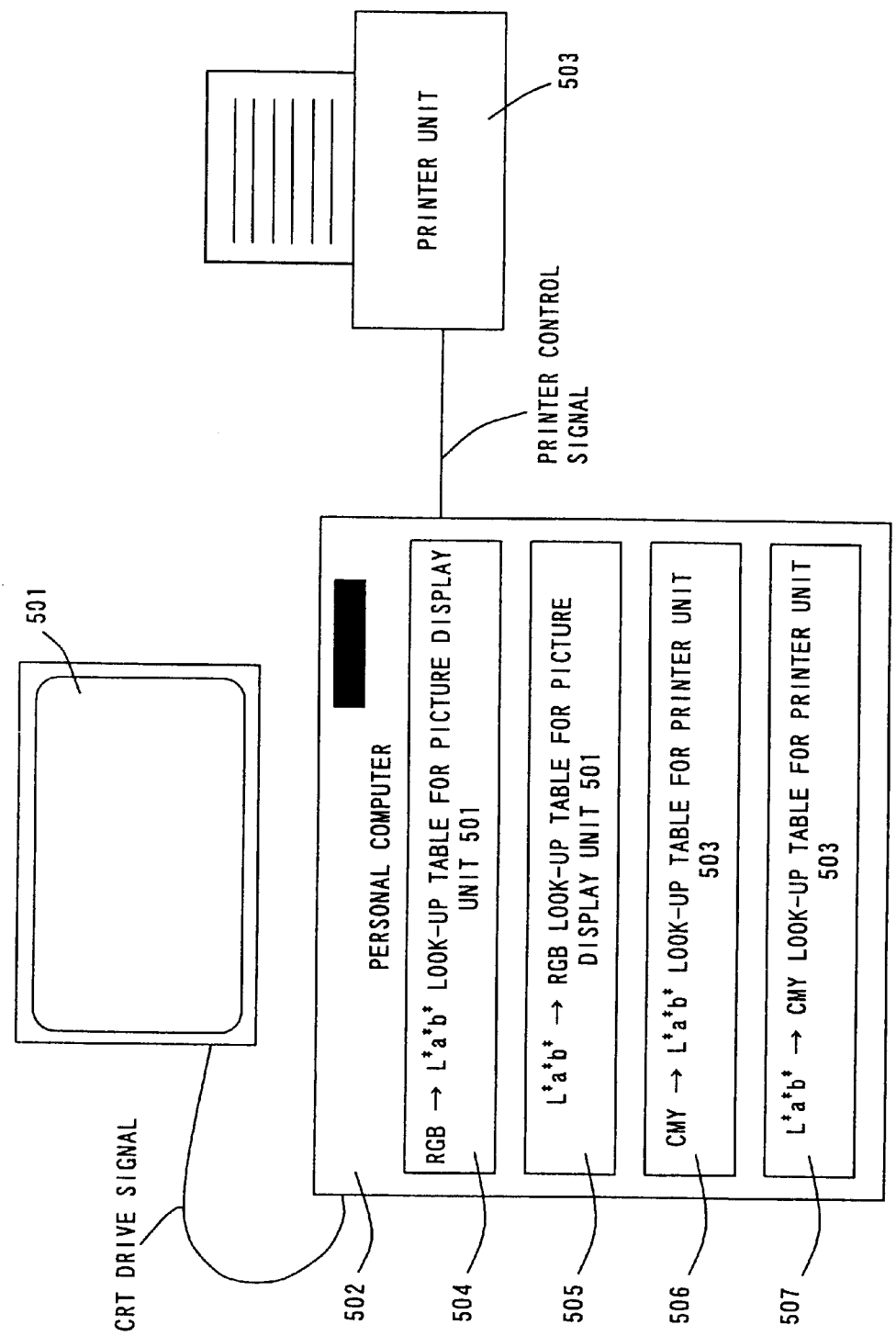
FIG. 29 shows the rough configuration corresponding to the first preferred embodiment of the present invention.

FIG. 29 shows the rough configuration corresponding to the first preferred embodiment of the present invention, which comprises a general-purpose personal computer (hereinafter called "PC") and peripheral equipment.

501 shown in FIG. 29 is a picture display unit, such as a CRT display connected to a PC, etc., and displays pictures using CRT drive signals from the PC. 503 is a picture printer unit, such as a color ink-jet printer, etc., and prints pictures by receiving printer control signals from the PC. 502 is a general-purpose PC, and stores color pictures, of which each element is composed of RGB values, in a variety of storage media. This PC 502 transfers the RGB values of each picture element composing a color picture to the picture display unit 501 as CRT drive signals, and makes the picture display unit 501 display the color picture. The PC 502 converts the RGB values of each picture element from the color picture to CMY values, generates printer control signals from the CMY values, and makes the picture printer unit 503 print the color picture.

The PC 502 also stores information (look-up tables) 504 through 507 indicating the characteristics of both the picture display unit 501 and the picture printer unit 503. An RGB→L*a*b* look-up table 504 (hereinafter called "Lut 504") is a correspondence list of RGB values dependent on the picture display unit 501 and colors (L*a*b* values) displayed when CRT drive signals corresponding to the RGB values are transferred to the picture display unit 501. The RGB values are converted to the L*a*b* values by this Lut 504. An L*a*b*→RGB look-up table 505 (Lut 505) is a look-up table generated by the Lut 504. This is a list in which RGB values needed when colors represented by L*a*b* values are displayed on the picture display unit 501, are stored. If the picture display unit 501 cannot display a color represented by a certain L*a*b* value, the numbers of RGB values corresponding to the L*a*b* value are missing. When a color represented by L*a*b* values is desired to be displayed, by using this Lut 505, RGB values needed to display the color can be obtained. Since for L*a*b* values which can be displayed on the picture display unit 501, the RGB values can be obtained, and for L*a*b* values which cannot be displayed on the picture display unit 501, the RGB values cannot be obtained, this Lut 505 can also be used to judge whether or not certain L*a*b* values are included in the gamut of the picture display unit 501.

A CMY→L*a*b* look-up table 506 (Lut 506) is a list of correspondences needed to convert CMY values being values of colors dependent on the picture printer unit 503, to L*a*b* values, and L*a*b*→CMY look-up table 507 (Lut 507) is equivalent to Lut 505, and is a list of correspondences needed to convert L*a*b* values to CMY values which are used to display colors represented by the L*a*b* values on the picture printer unit 503. This Lut 507 can also be used to judge whether or not certain L*a*b* values are included in the gamut of the picture printer unit 503.

Figure 30:
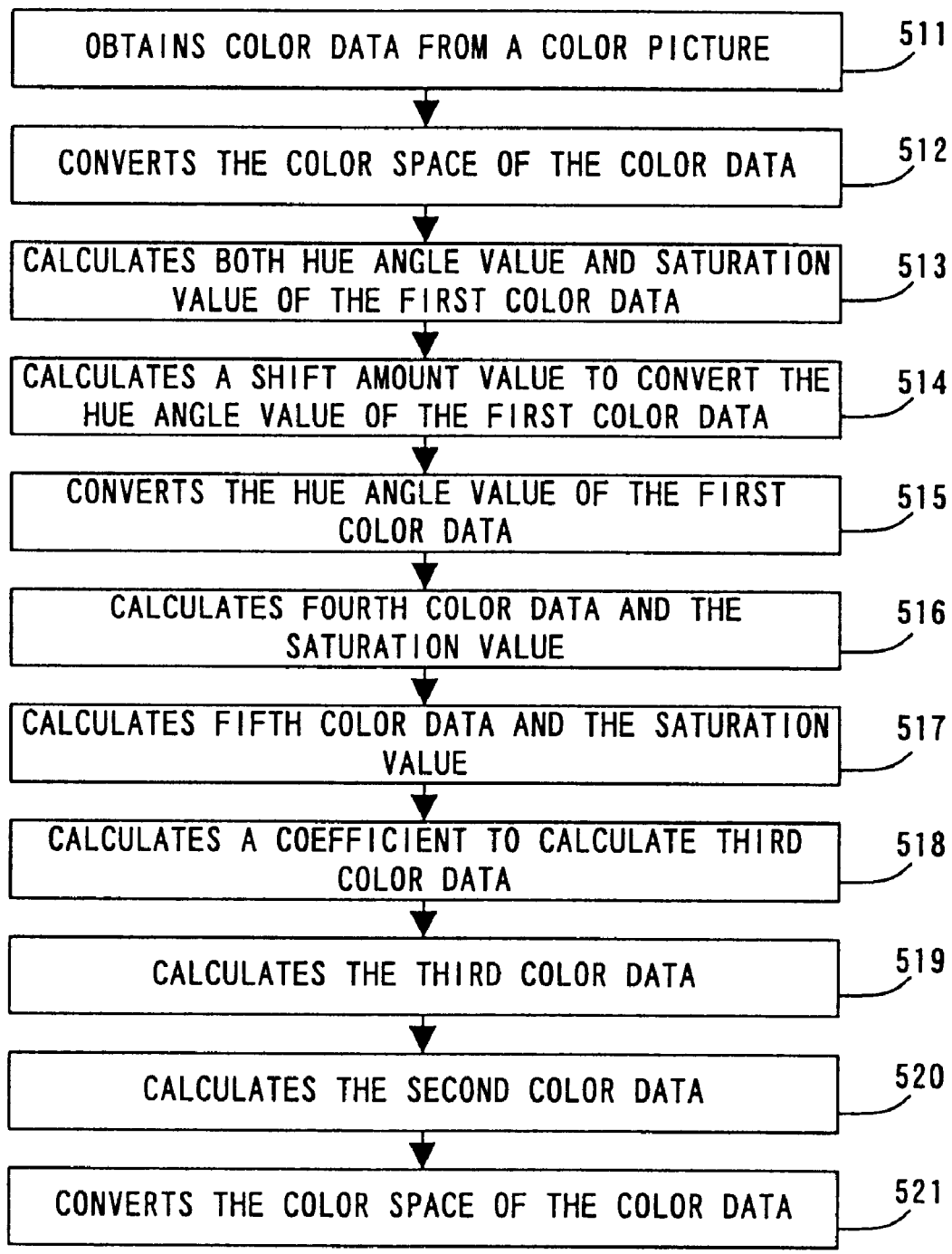
FIG. 30 is a detailed flowchart showing a method of converting the RGB values of each picture element composing a color picture to CMY values.
Figure 31:
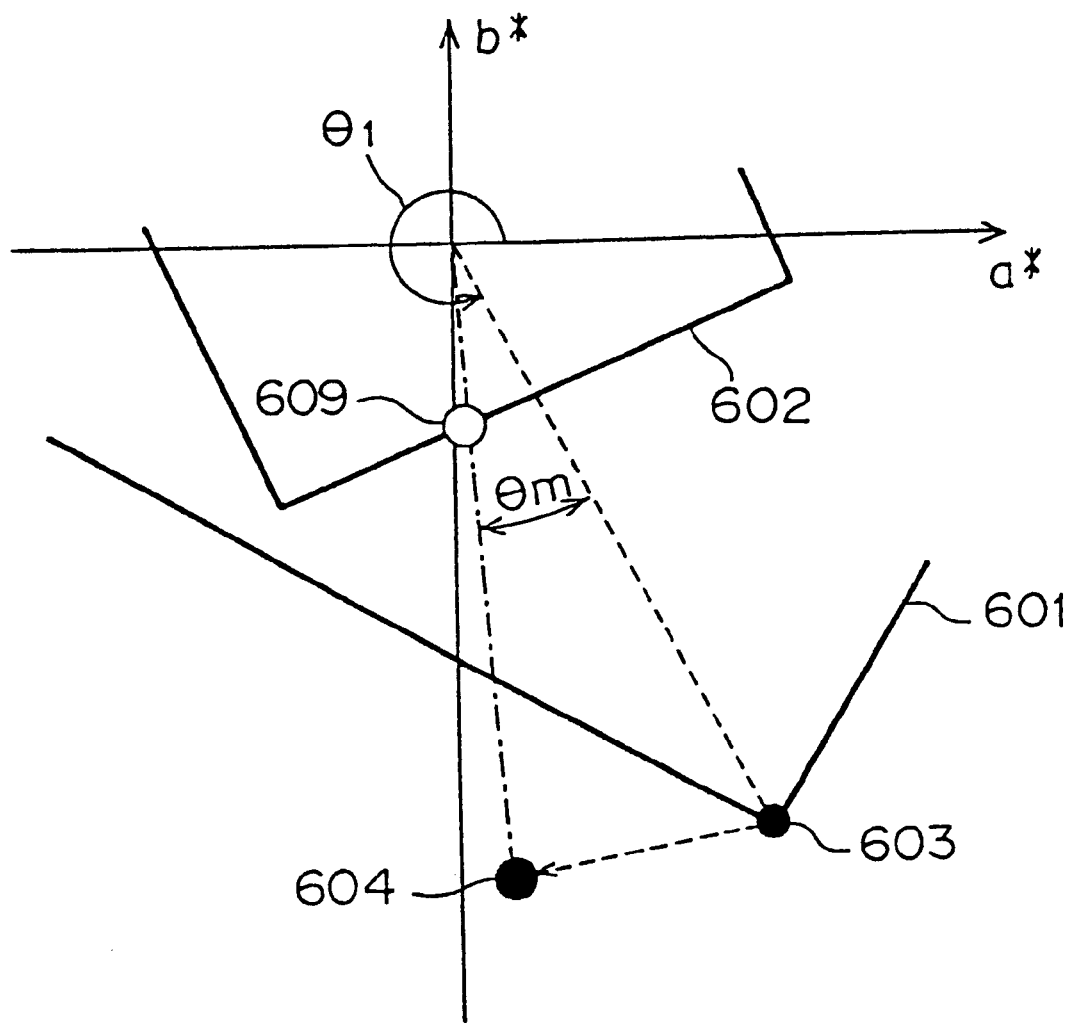
FIG. 31 shows a variety of color data and gamuts indicated using an L*a*b* space which are used when RGB values are converted to CMY values corresponding to the detailed flowchart shown in FIG. 30 (No. 1).
Figure 32:
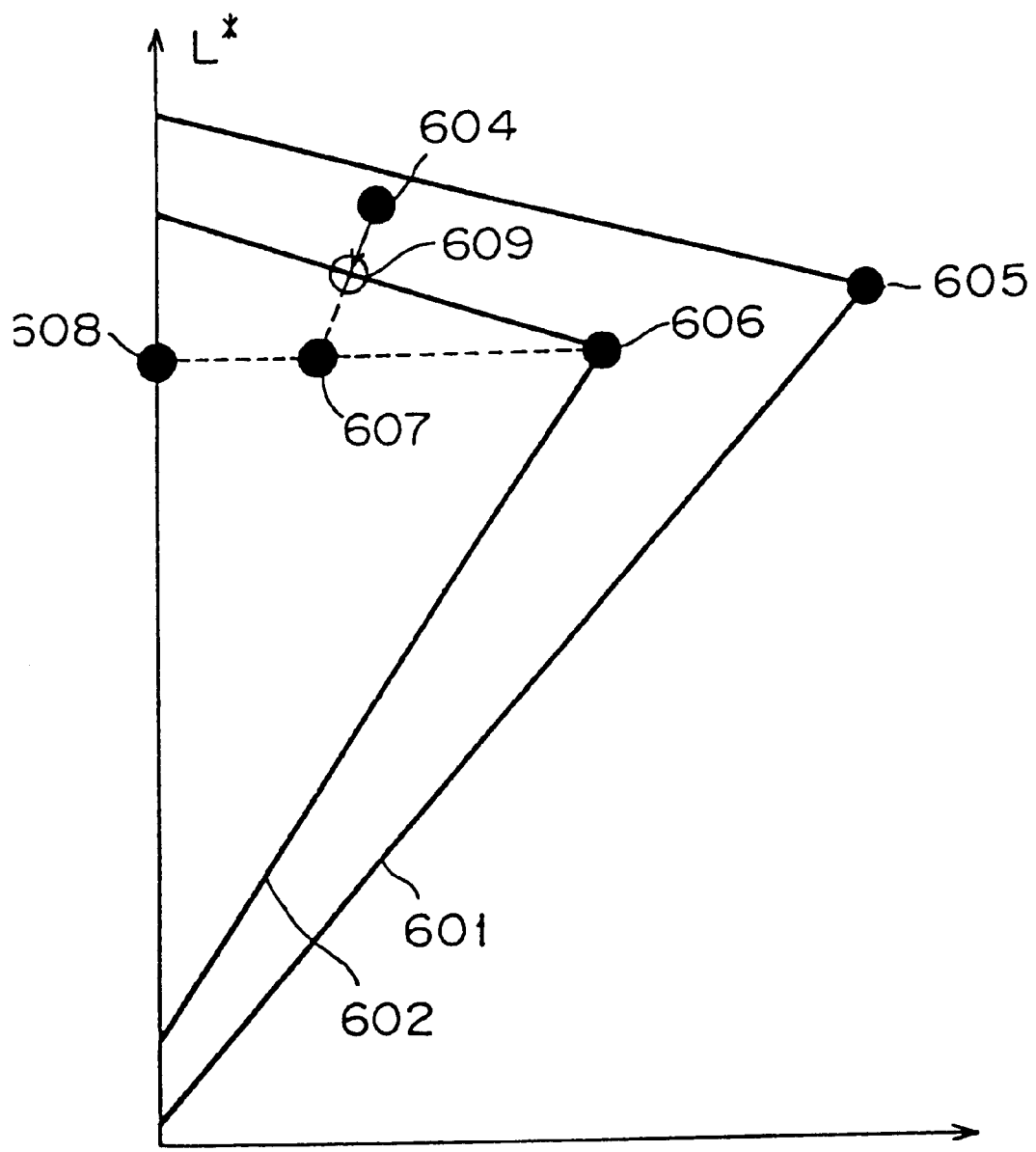
FIG. 32 shows a variety of color data and gamuts indicated using an L*a*b* space which are used when RGB values are converted to CMY values corresponding to the detailed flowchart shown in FIG. 30 (No. 2).

FIG. 30 is a detailed flowchart showing a method of converting the RGB values of each picture element composing a color picture to CMY values. FIGS. 31 and 32 show a variety of color data and gamuts indicated using an L*a*b* space which is used when converting RGB values to CMY values corresponding to the detailed flowchart shown in FIG. 30, which is described in detail below.

Step S511: RGB values are extracted from each picture element composing a color picture which are stored in a variety of storage media. The RGB values are values of color spaces dependent on the picture display unit 501, and all the values obtainable by the RGB values are the gamut of the picture display unit 501. This gamut is indicated by 601 shown in FIGS. 31 and 32. The CMY values are values of color spaces dependent on the picture printer unit 503, and all the values obtainable by the CMY values are the gamut of the picture printer unit 503. This gamut is indicated by 602 shown in FIGS. 31 and 32.

Step S512: The RGB values are converted to the values of L*a*b* color spaces which are easy to be converted and are independent of devices. The Lut 504 is used to convert the RGB values to L*a*b* spaces. These L*a*b* values ($L*_1$, $a*_1$ and $b*_1$) are first color data 603 shown in FIG. 31.

Step S513: The hue angle value $\theta_1$ and saturation value $C_1$ of the first color data are calculated as follows.

$$\theta_1 = \arctan(b^*_1/a^*_1)$$

$$C_1 = ((a^*_1)^2 + (b^*_1)^2)^{(1/2)}$$

Figure 33:
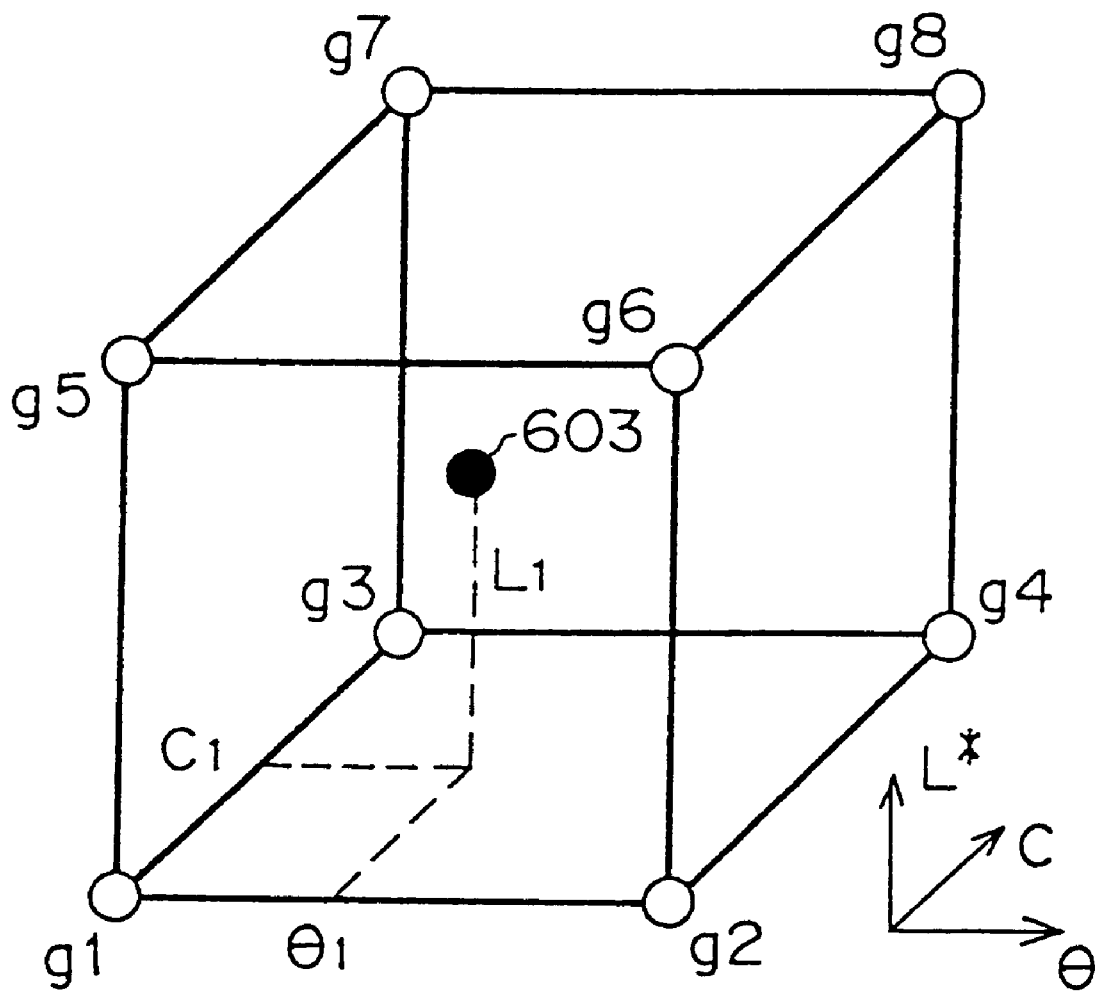
FIG. 33 explains an interpolation operation.

Step S514: A shift amount value $\theta_m$ to convert the hue angle value of the first color data 603 is calculated. The shift amount value tables shown in FIGS. 16 through 21, and the hue angle value $\theta_1$, saturation value $C_1$ and lightness value $L^*_1$ of the first color data 603 are all used to calculate this shift amount value $\theta_m$. First, the shift amount value tables shown in FIGS. 16 through 21 are referred to using the hue angle value $\theta_1$, saturation value $C_1$ and lightness value $L^*_1$ of the first color data 603, and the hue angle values $\theta_{g1}$ to $\theta_{g8}$, saturation values $C_{g1}$ to $C_{g8}$ and lightness values $L^*_{g1}$ to $L^*_{g8}$ of eight elements g1 to g8 existing in a position surrounding the first color data 603, and element values (shift amount values) $\theta_{m1}$ to $\theta_{m8}$ being values stored in the element, shown in FIG. 33 are extracted. Then, the $]\theta_m$ is calculated by performing an interpolation operation as follows.

$$\theta_m = \sum_{i=1}^{8}(V_i \cdot \theta_{mi}/V)$$

where $$V = (\theta_{g2} - \theta_{g1}) - (C_{g3} - C_{g1}) - (L^*_{g5} - L^*_{g1})$$

$$V_i = \Delta\theta - \Delta C - \Delta L^*$$

$\Delta\theta = \theta_1 - \theta_{gi} \ldots (\theta_1 \geq \theta_{gi})$
$\Delta\theta = \theta_{gi} - \theta_1 \ldots (\theta_{gi} > \theta_1)$
$\Delta C = C_1 - C_{gi} \ldots (C_1 > C_{gi})$
$\Delta C = C_{gi} - C_1 \ldots (C_{gi} > C_1)$
$\Delta L^* = L^*_1 - L^*_{gi} \ldots (L^*_1 \geq L^*_{gi})$
$\Delta L^* = L^*_{gi} - L^*_1 \ldots (L^*_{gi} > L^*_1)$ Step S515: The hue angle value of the first color data is converted using the angle value (shift amount value) $\theta_m$, and intermediate color data 604 on the way of the conversion of the first color data are calculated. The $L^*a^*b^*$ values of the color data 604 are calculated as follows.

$\theta_{1D}\theta_m + \theta_1$ $L^*_{1D} = L^*_1$ $a^*_{1D} = C_1 \cdot \cos(\theta_{1D})$ $b^*_{1D} = C_1 \cdot \sin(\theta_{1D})$ $C_{1D} = ((a^*_{1D})^2 + (b^*_{1D})^2)^{(1/2)}$ Step S516: Fourth color data 605 ($L^*_4$, $a^*_4$ and $b^*_4$) with the highest saturation of color data included the first gamut of the picture display unit 501 in the equi-hue plane indicated by an angle value $\theta_{1D}$ are calculated. For all the color data in the equi-hue plane indicated by the angle value $\theta_{1D}$, judgement on whether or not the color data are included in the first gamut 601 is made, and color data with the highest saturation of color data which are judged to be included are designated as the fourth color data. The Lut 505 is used to judge whether or not certain color data are included in the first gamut 601 of the picture display unit 501 (that is, to judge whether or not for certain $L^*a^*b^*$ values RGB values are registered). The saturation value $C_4$ of the fourth color data 605 is calculated as follows.

$$C_4 = ((a^*_4)^2 + (b^*_4)^2)^{(1/2)}$$

Step S517: Fifth color data 606 ($L^*_5$, $a^*_5$ and $b^*_5$) with the highest saturation of color data included in the second gamut 602 of the picture printer unit 503 in the equi-hue plane indicated by an angle value $\theta_{1D}$ are calculated. For all the color data in the equi-hue plane indicated by the angle value $\theta_{1D}$, judgement on whether or not the color data are included in the second gamut 602 is made, and color data with the highest saturation of color data which are judged to be included are designated as the fifth color data. The Lut 507 is used to judge whether or not certain color data are included in the second gamut 602 of the picture printer unit 503. The saturation value $C_5$ of the fifth color data 605 is calculated as follows.

$$C_5 = ((a^*_5)^2 + (b^*_5)^2)^{(1/2)}$$

Step S518: A coefficient value k to calculate third color data 607 is calculated as follows.

In the case of $|L^*_4 - L^*_{1D}| \leq 50.0$: $k = C_1 (1/C_4) ((50.0 - |L^*_4 - L^*_{1D}|)/50.0)$ In the case of $|L^*_4 - L^*_{1D}| > 50.0$: $k = 0.0$ Step S519: Using the coefficient value k calculated earlier, the fifth color data 606 and a first straight line connecting sixth color data 608 ($L^*_6$, $a^*_6$ and $b^*_6$) being an achromatic color, and the third color data ($L^*_3$, $a^*_3$ and $b^*_3$) on the first straight line are calculated. In this preferred embodiment the sixth color data 608 are assumed to be an achromatic color with the same lightness as the fifth color data 606. The calculation expressions to calculate the third color data are as follows.

$L^*_3 = (L^*_5 - L^*_6)k + L^*_6$ $a^*_3 = (a^*_5 - a^*_6)k + a^*_6$ $b^*_3 = (b^*_5 - b^*_6)k + b^*_6$

Using these expressions the third color data 607 are calculated in such a way that the higher is the saturation of the intermediate color data 604, the higher is made the saturation value of the third color data 607, and the greater are the lightness of both the intermediate color data 604 and the fifth color data 606, the lower is made the saturation value of the third color data 607. The third color data 607 are also calculated in such a way that when the saturation value of the intermediate color data 604 is equal to that of the fourth color data 605, the third color data 607 and the $L^*a^*b^*$ values of the fifth color data 606 become nearly equal.

Step S520: When the intermediate color data needed to calculate the second color data, and the third color data are connected by the second straight line, one point ($L^*_L$, $a^*_L$ and $b^*_L$) on the straight line is calculated as follows.

$L^*_L = (L^*_3 - L^*_{1D})t + L^*_{1D}$ $a^*_L = (a^*_3 - a^*_{1D})t + a^*_{1D}$ $b^*_L = (b^*_3 - b^*_{1D})t + b^*_{1D}$ where t is a coefficient, of which the value is 0.0 to 1.0.

Using the Lut 507 and the above expressions, an intersecting point of the second straight line and the outermost boundary of the second gamut is calculated. The color data at this cross point are the second color data 609.

Step S521: The $L^*a^*b^*$ values ($L^*_2$, $a^*_2$ and $b^*_2$) of the second color data are converted to CMY values. The Lut 507 is used to convert the $L^*a^*b^*$ values to the CMY values.

The second preferred embodiment of the present invention is described below. The summary of this preferred embodiment is similar to the first preferred embodiment described earlier, but the detailed flow and the positions of the corresponding color data differ from those of the first preferred embodiment. Therefore, the descriptions of the same parts as the first preferred embodiment are omitted, and only the different parts are described below.

Figure 34:
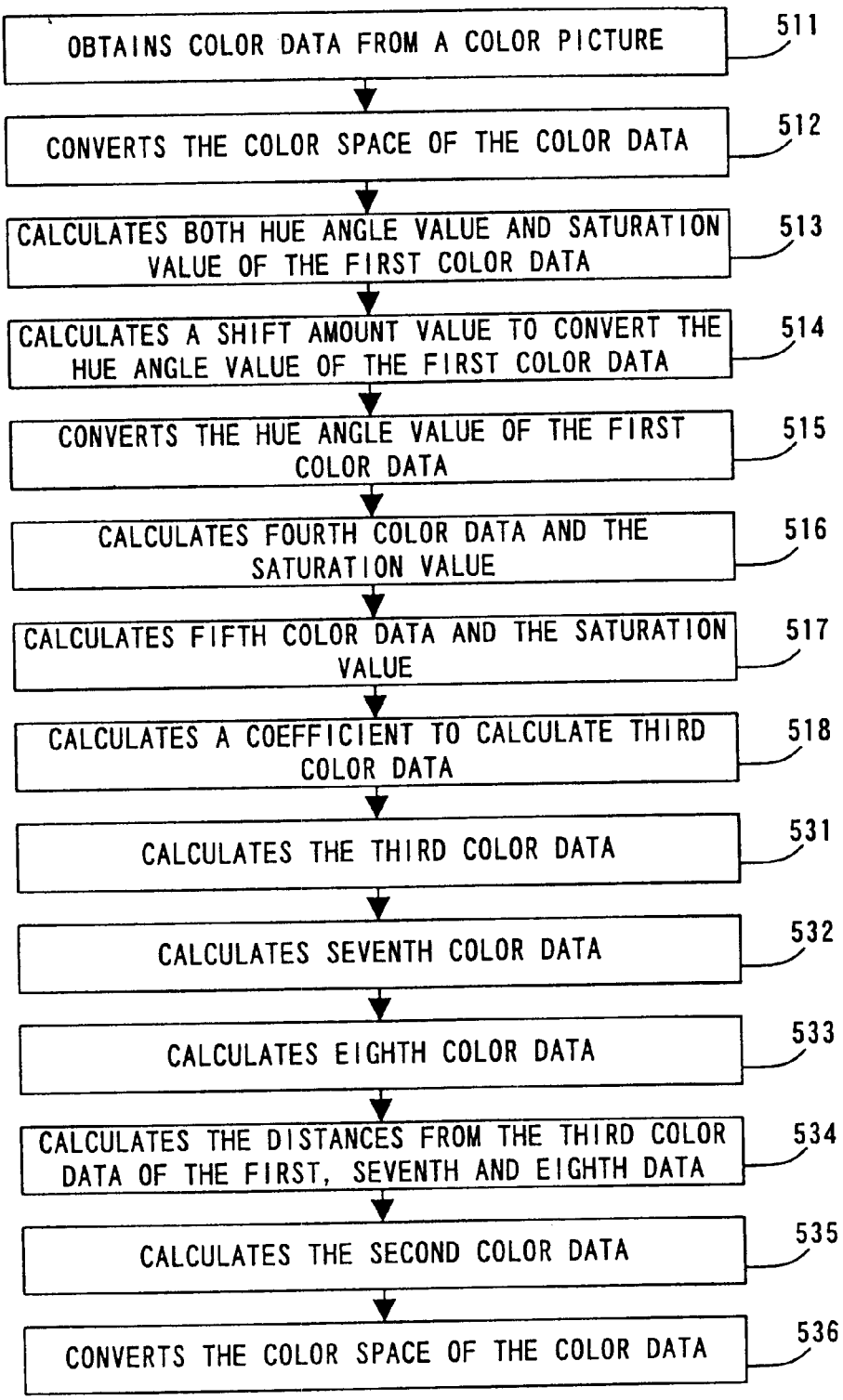
FIG. 34 is a detailed flowchart showing the color data conversion in which CMY values are calculated from the RGB values of each picture element composing a color picture.
Figure 35:
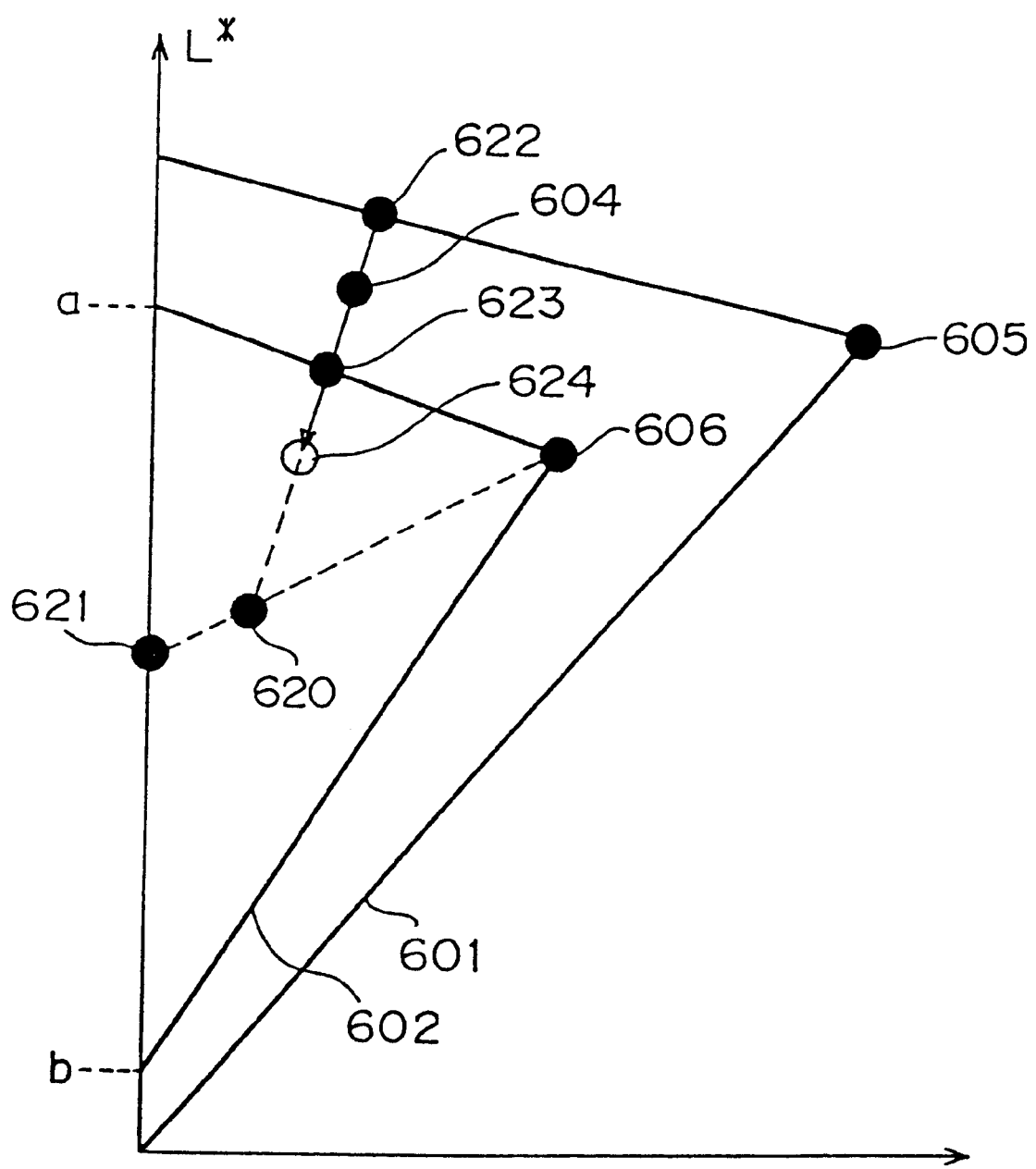
FIG. 35 shows a variety of color data and gamuts indicated using an L*a*b* space which are used when RGB values are converted to CMY values corresponding to the detailed flowchart shown in FIG. 34.

FIG. 34 is a detailed flowchart showing the color data conversion in which CMY values are calculated from the RGB values of each picture element composing a color picture, which is performed in the PC 502. FIG. 35 shows a variety of color data and gamuts indicated using a L*a*b* space which are used when RGB values are converted to CMY values corresponding to the detailed flowchart shown in FIG. 34.

Of the detailed flow showing the conversion of color data, steps S511 through S518 are the same as the steps S511 through S518 of the first preferred embodiment described earlier. Therefore, the descriptions are omitted, and only the parts different from the first embodiment are described below.

Step S531: Using the coefficient value k calculated earlier, the fifth color data 606, and a first straight line connecting sixth color data 621 ($L^*_6$, $a^*_6$ and $b^*_6$) being an achromatic color, and the third color data ($L^*_3$, $a^*_3$ and $b^*_3$) on the first straight line are calculated. In this preferred embodiment, the lightness value of the sixth color data 621 is assumed to be a rough mean value between the highest lightness value a and the lowest lightness value b of the second gamut 602. The highest lightness value a is equal to the lightness value of the measured color value of the color of paper for the picture printer unit 503, and the lowest lightness value b is equal to the lightness value of the measured color value of the color black of the picture printer unit. These values are obtained in advance by color measurement. The third color data are calculated as follows.

$$L^*_3 = (L^*_5 - L^*_6)k + L^*_6$$

$$a^*_3 = (a^*_5 - a^*_6)k + a^*_6$$

$$b^*_3 = (b^*_5 - b^*_6)k + b^*_6$$

Using these expressions, the third color data 620 are calculated in such a way that the higher is the saturation of the intermediate color data 604, the higher is made the saturation value of the third color data 620, and the greater are the lightness of both the intermediate color data 604 and the fourth color data 605, the lower is made the saturation value of the third color data 620. The third color data 620 are also calculated in such a way that when the saturation value of the intermediate color data 604 are equal to that of the fourth color data 605, the third color data 620 and the L*a*b* values of the fifth color data 606 become nearly equal.

Step S532: When the intermediate color data needed to calculate the second color data and the third color data are connected by the second straight line, one point ($L^*_L$, $a^*_L$ and $b^*_L$) on the straight line is calculated as follows.

$$L^*_L = (L^*_3 - L^*_1)t + L^*_1$$

$$a^*_L = (a^*_3 - a^*_1)t + a^*_1$$

$$b^*_L = (b^*_3 - b^*_1)t + b^*_1$$

where t is a coefficient, of which the value is 0.0 to 1.0.

Using the Lut 505 and these expressions, seventh color data 622 being color data of an intersecting point of the second straight line and the outermost boundary of the first gamut are calculated.

Step S534: The distances from the third color data of the seventh and eighth color data calculated before, $l_7$ and $l_8$, respectively, are calculated. The distance l between two color data ($L^*_a$, $a^*_a$ and $b^*_a$) and ($L^*_b$, $a^*_b$ and $b^*_b$) is calculated as follows.

$$l = (L^*_b - L^*_a)^2 + (a^*_b - a^*_a)^2 + (b^*_b - b^*_a)^2)$$

Step S535: Using the above expression of the second straight line, and $l_7$ and $l_8$, second color data are calculated. Coefficient t to be given to the second straight line in order to calculate the second color data is calculated as follows.

$$t = (l_7/l_8)$$

Using this coefficient and the expression of the second straight line, second color data 624 ($L^*_2$, $a^*_2$ and $b^*_2$) are calculated.

Step S536: The L*a*b* values of the second color data ($L^*_2$, $a^*_2$ and $b^*_2$) are converted to CMY values. The Lut 507 is used to convert the L*a*b* values to the CMY values.

In this way, in this preferred embodiment, a color data conversion method of generating second color data included in the second gamut of a second color picture device, from first color data included in the first gamut of a first color picture device, comprises the steps of calculating a shift amount value from the hue angle value, lightness value and saturation value of the first color data, and the steps of converting the hue angle value of the first color data based on the shift amount value and shifting the first color data toward the third color data included in the second gamut existing on a certain straight line, and obtaining second color data.

In the step of calculating a shift amount value, a multiple-dimensional table can also be used to calculate the shift amount value.

In the step of calculating a shift amount value, when the first color data are color data representing the blue or purple of the first color picture device, a shift amount value to reduce the hue angle value of the first color data can also be calculated.

Alternatively, in the step of calculating a shift amount value, color data representing color in the neighborhood of blue being the primary and secondary colors of the first color picture device can be used instead of color data representing the blue or purple of the first color picture device.

Alternatively, in the process of calculating a shift amount value, the hue angle value of color data representing color in the neighborhood of blue being the primary and secondary colors of the first color picture device can be set between approximately 220 degrees and approximately 320 degrees.

Alternatively, in the process of calculating a shift amount value, when the first color data have a hue angle value nearly equal to that of color data representing blue being the primary and secondary colors of the first color picture device, a shift amount value can be calculated in such a way that the absolute value of the shift amount value can be a maximum.

Alternatively, in the step of calculating a shift amount value, the hue angle value of color data representing blue being the primary and secondary colors of the first color picture device may be approximately 300 degrees.

Alternatively, in the step of calculating a shift amount value, when the first color data are nearly equal to color data representing blue being the primary and secondary colors of the first color picture device, the shift amount value can be calculated in such a way that the absolute value of the shift amount value may be approximately 30 degrees.

Alternatively, in the step of calculating a shift amount value, the shift amount value can be calculated in such a way that as the saturation value of the first color data increases, and the absolute value of the shift amount value may increase.

In this case, in the step of calculating the shift amount value, the shift amount value can also be calculated in such a way that, when the saturation value of the first color data is 0, the absolute value of the shift amount value may become 0, as the saturation value of the first color data increases, the absolute value of the shift amount value may proportionally increase, and when the saturation value of the first color data is 120, the absolute value of the shift amount value may be saturated.

Alternatively, in the step of calculating a shift amount value, the shift amount value can be calculated in such a way that as the lightness value of the first color data falls down below an arbitrary lightness value between the lowest lightness value and the highest lightness value of the first gamut, the absolute value of the shift amount value may increase.

In this case, particularly in the process of calculating the shift amount value, when the lightness value of the first color data is nearly equal to the lowest lightness value of the first gamut, the absolute value of the shift amount value can also be approximately 1.5 times the absolute value of the shift amount value in the case of an arbitrary lightness value.

Alternatively, in the step of calculating a shift amount value, when the first color data are representing color in the neighborhood of the primary and secondary colors of the first color picture device, a shift amount value to convert the hue angle value of the first color data to the hue angle value of color data representing a color in the neighborhood of the primary and secondary colors of the second color picture device can be calculated.

In this case, particularly in the process of calculating the shift amount value, the shift amount value can also be calculated in such a way that when the first color data are representing the primary and secondary colors of the first color picture device, the absolute value of the shift amount value may become a maximum.

Furthermore, in this case, in the step of calculating a shift amount value, the shift amount value can also be calculated in such a way that when the first color data are representing the primary and secondary colors of the first color picture device, as the difference between the first color data and color data representing primary and secondary colors of the first color picture device increases, the absolute value of the shift amount value may decrease.

Alternatively, in the step of converting the hue angle value of the first color data based on the shift amount value, the first color data can be rotated around color data of an achromatic color with the same lightness as the first color data, and the hue angle value of the first color data can be converted.

A color conversion system for generating the second value of a color space dependent on a second color picture device, from the first value of a color space dependent on the first color picture device can also comprise a unit for converting the value of a color space dependent on a first color picture device to the third value of a color space independent of devices, a unit for calculating a shift amount value from the hue angle value, lightness value and saturation value of the third value of the color space, a unit for converting the hue angle value of the third value of the color space based on the shift amount value, and a unit for converting the third value of the color space of which the hue angle value is converted, to the second value of the color space dependent on the second color picture device.

Figure 36:
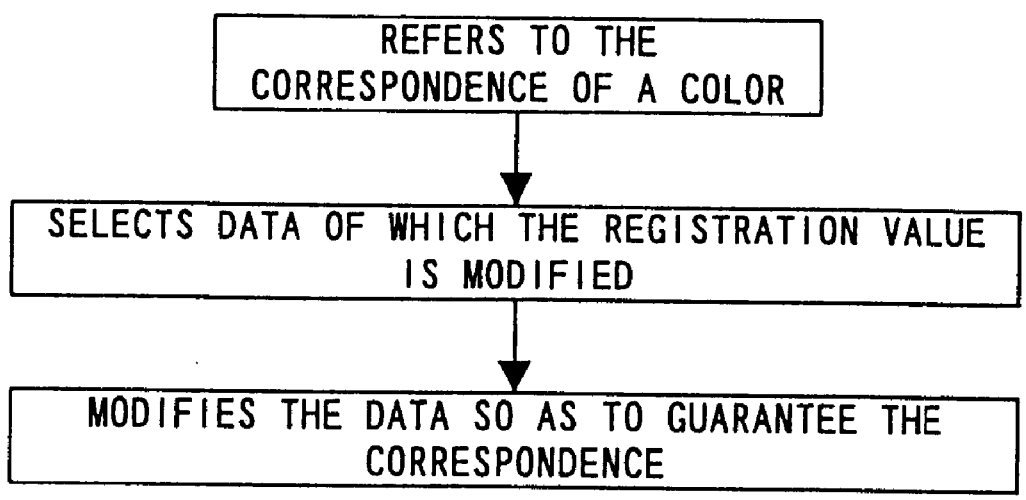
FIG. 36 explains the operation principle of the registration data modification method of the color conversion table of the present invention.

FIG. 36 explains the operation principle of the registration data modification method of the color conversion table of the present invention.

The present invention comprises a reference step of referring to the correspondence of a color to be guaranteed when the registration data of a color conversion table are converted, a selection step of selecting the data to be color-converted in the color conversion table, and a modification step of modifying the registration data so as to guarantee the correspondence referred to above.

By these steps the accuracy of a specific color can be guaranteed, or for a specific color the conversion results can be guaranteed.

The registration data modification method of the color conversion table of the present invention comprises a reference step of referring to a color correspondence, a selection step of selecting data of which the registration value is modified, and a modification step of modifying registration data so as to guarantee the correspondence referred to in the reference step. Since in this way the registration data of the color conversion table can be modified, the accuracy of a specific color can be guaranteed or for a specific color the conversion result can be guaranteed.

The registration data can also be modified by using the expression of color conversion. For example, taking a case where L*a*b* values are converted to CMY values, in a color conversion operation a color conversion table in which CMY values corresponding to L*a*b* values in a grid shape are registered is used, and the conversion result is obtained by using the weighted mean of CMY values registered at a grid point (for example, 8 points) around an L*a*b* value to be converted. Assuming that C (Li, ai, bi) is a value C registered corresponding to a grid point (Li, ai, bi), the numbers of the grid points around the L*a*b* are i0 to i7, and the weights for the grid points are w0 to w7, the conversion result c is as follows.

$$c=(w0 \cdot C(Li0, ai0, bi0)+w1 \cdot C(Li1, ai1, bi1)+ \ldots +w7 \cdot C(Li7, ai7, bi7))/(w0+w1+ \ldots +w7) \qquad (1)$$

When the conversion result c has to be guaranteed for a specific value cs, it is sufficient that the cs value is assigned to the c value of the numerical expression (1), and the expression is transformed into an equation of the C value (Li, ai, bi) of the grid point to be converted. The same also applies to both an M value and a Y value. In this way, the values of the grid points of which the conversion result can be guaranteed, can be generated.

The registration data can also be modified by setting the value of a color referred to in a reference process. For example, when RGB values inputted by a scanner are converted to L*a*b* values, a color conversion table in which L*a*b* values corresponding to RGB values in a grid shape are registered, is used, and if (100, 0, 0) is guaranteed as L*a*b* values corresponding to RGB=(255, 255, 255), for the grid point of RGB=(255, 255, 255), (100, 0, 0) is set as L*a*b* values. This method is effective when colors referred to in the reference step coincide with colors on the grid point.

A grid point nearest to the color referred to in the reference process (color to be guaranteed) can also be selected as the grid point at which the registration data are modified. Since usually in the numerical expression (1), the nearer to the color referred to in the reference process (color to be guaranteed) is the grid point, the greater the weight (w) is made, by modifying a grid point near to the color, the modification amount can be reduced, and thereby the influence on colors other than a color to be guaranteed can be minimized.

A grid point at which the registration data are modified can also be selected from grid points outside the gamut. Thus, the influence on colors inside the gamut other than the color to be guaranteed, can be reduced.

When a grid point of which the registration data are modified, is selected, a plurality of pieces of data can also be selected. Thus, the modification amount per one piece of data can be reduced.

A preferred embodiment regarding a method of guaranteeing the color of paper in a color conversion table for printers is described below.

The First Preferred Embodiment

Figure 37:
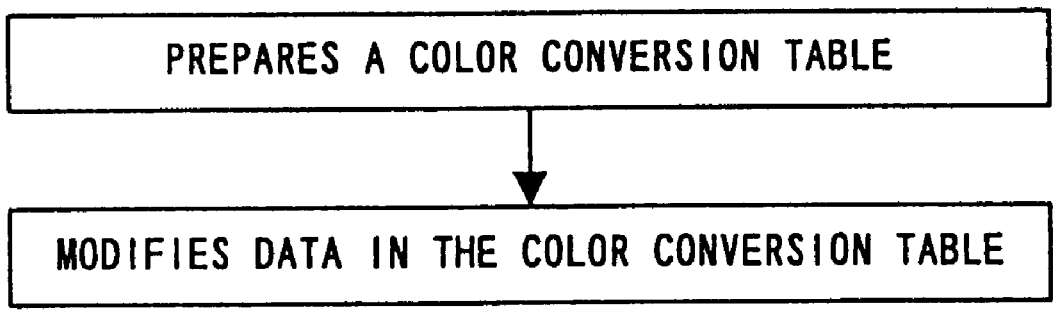
FIG. 37 explains the operations of the preferred embodiment of the registration data modification method of the present invention.

In the color conversion of this preferred embodiment, L*a*b* values are assumed to be converted to CMY values. As shown in FIG. 37, the basic procedures consist of two steps of generating a color conversion table and modifying data registered in the table, and this preferred embodiment relates to the modification of the data registered in the table.

Before describing the modification of the registered data, both a color conversion table registering colors distributed in a grid shape and a color conversion method of interpolating this table are briefly described.

In a color conversion table where colors are registered distributed in a grid shape, colors after conversion (CMY values in this preferred embodiment) corresponding to colors before conversion (L*a*b* values in this preferred embodiment) distributed in a grid shape (all values at intervals of "8" in this preferred embodiment) are stored. Specifically, CMY values are assumed to be stored in the arrays of C[L][a][b], M[L],[a][b], Y[L][a][b]. L, a and b are the numbers of a grid, and the grid numbers corresponding to the minimum value (0, −128, −128) of the L*a*b* values are L=0, a=0 and b=0. The grid numbers corresponding to (8, −128, −128) are L=1, a=0 and b=0, and the grid numbers corresponding to (8, 0, 0) are L=1, a=16 and b=16.

An example of the procedures of color conversion is described below. Conversion is made by an interpolation operation using eight points (in a cubic grid shape) surrounding L*a*b* values to be converted (Lconv, aconv, bconv).

(1) Selects grid points used for interpolation (eight points surrounding L*a*b* values to be converted (Lconv, aconv, bconv)

w is a grid interval, and is assumed to be "8" (Note: (int) means to omit decimal places). L, a and b are grid numbers.

$$L=(int)(Lconv/w)$$
$$a=(int)((aconv+128.0)/w)$$
$$b=(int)((bconv+128.0)/w) \qquad (2)$$

Besides grid points calculated by the above expressions, grid points of (L+1, a, b), (L, a+1, b), (L, a, b+1), (L, a+1, b+1), (L+1, a, b+1), (L+1, a+1, b) and (L+1, a+1, b+1) are used to interpolate.

Figure 38:
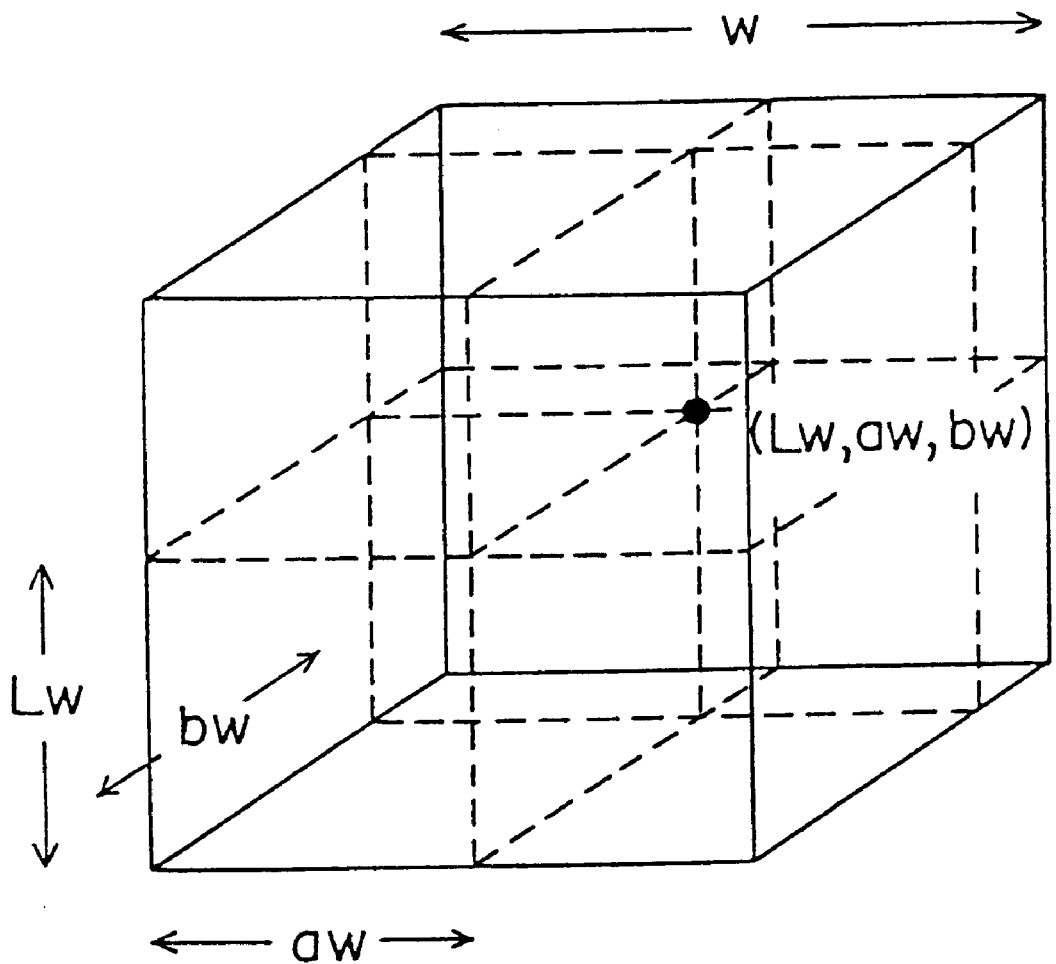
FIG. 38 shows a color space which is configured in a grid shape.

(2) Calculates positions inside a cube (See FIG. 38)

Calculates the positions (Lw, aw, bw) inside a cube of L*a*b* values.

$$Lw=(Lconv/w-L)\cdot w$$
$$aw=((aconv+128.0)/w-a)\cdot w$$
$$bw=((bconv+128.0)/w-b)\cdot w \qquad (3)$$

(3) Calculates weight coefficients (the volumes of rectangular parallelepipes generated by dividing (V (0, 0, 0) to V (1, 1, 1))

Calculates the volumes from the positions inside the cube of the L*a*b* values.

$$V(0, 0, 0)=(w-Lw)\cdot(w-aw)\cdot(w-bw)$$
$$V(1, 0, 0)=Lw\cdot(w-aw)\cdot(w-bw)$$
$$V(0, 1, 0)=(w-Lw)\cdot aw\cdot(w-bw)$$
$$V(0, 0, 1)=(w-Lw)\cdot(w-aw)\cdot bw$$
$$V(0, 1, 1)=(w-Lw)\cdot aw\cdot bw$$
$$V(1, 0, 1)=Lw\cdot(w-aw)\cdot bw$$
$$V(1, 1, 0)=Lw\cdot aw\cdot(w-bw)$$
$$V(1, 1, 1)=Lw\cdot aw\cdot bw \qquad (4)$$

(4) Performs an interpolation process

Calculates means weighed with the V (0, 0, 0) to V (1, 1, 1) of the CMY values of (L, a, b), (L+1, a, b), (L, a+1, b), (L, a, b+1), (L, a+1, b+1), (L+1, a, b+1), (L+1, a+1, b) and (L+1, a+1, b+1).

$$C=(C[L][a][b]\cdot V(0,0,0)+C[L+1][a][b]\cdot V(1,0,0)+C[L][a+1][b]\cdot V(0,1,0)+C[L]$$

$$[a][b+1]V(0,0,1)+C[L][a+1][b+1]\cdot V(0,1,1)+C[L+1][a][b+1]\cdot V(1,0,1)+C[L+1]$$

$$[a+1][b]\cdot V(1,1,0)+C[L+1][a+1][b+1]\cdot V(1,1,1))/(w\cdot w\cdot w)$$

$$M=(M[L][a][b]\cdot V(0,0,0)+M[L+1][a][b]\cdot V(1,0,0)+M[L][a+1][b]\cdot V(0,1,0)+M[L]$$

$$[a][b+1]\cdot V(0,0,1)+M[L][a+1][b+1]\cdot V(0,1,1)+M[L+1][a][b+1]\cdot V(1,0,1)+M[L+1]$$

$$[a+1][b]\cdot V(1,1,0)+M[L+1][a+1][b+1]\cdot V(1,1,1,))/(w\cdot w\cdot w)$$

$$Y=(Y[L][a][b]\cdot V(0,0,0)+Y[L+1][a][b]\cdot V(1,0,0)+Y[L][a+1][b]\cdot V(0,1,0)+Y[L]$$

$$[a][b+1]\cdot V(0,0,1)+Y[L][a+1][b+1]\cdot V(0,1,1)+Y[L+1][a][b+1]\cdot V(1,0,1)+Y[L+1]$$

$$[a+1][b]\cdot V(1,1,0)+Y[L+1][a+1][b+1]\cdot V(1,1,1)/(w\cdot w\cdot w) \qquad (5)$$

So far the summary of the color conversion method has been described.

Next, a method of modifying the registration values of a color conversion table used in a color conversion method peculiar to this preferred embodiment is described. Here, a method in which the CMY values after conversion corresponding to the L*a*b* values of paper are assumed to be perfectly C=0, M=0 and Y=0 is described.

Figure 39:
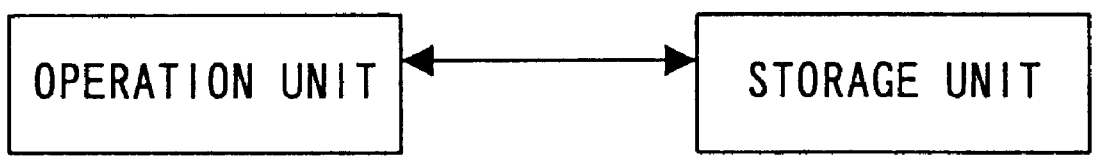
FIG. 39 the rough configuration of a system adopting the first preferred embodiment.

FIG. 39 shows the rough configuration of a system adopting the first preferred embodiment.

The system comprises an operation unit (CPU) and a storage unit. The storage unit stores programs based on process procedures, a color conversion table, and relationship between colors to guarantee correspondence. The color conversion table is stored in the storage unit in the arrays of C[L][a][b], M[L],[a][b], Y[L][a][b].

Figure 40:
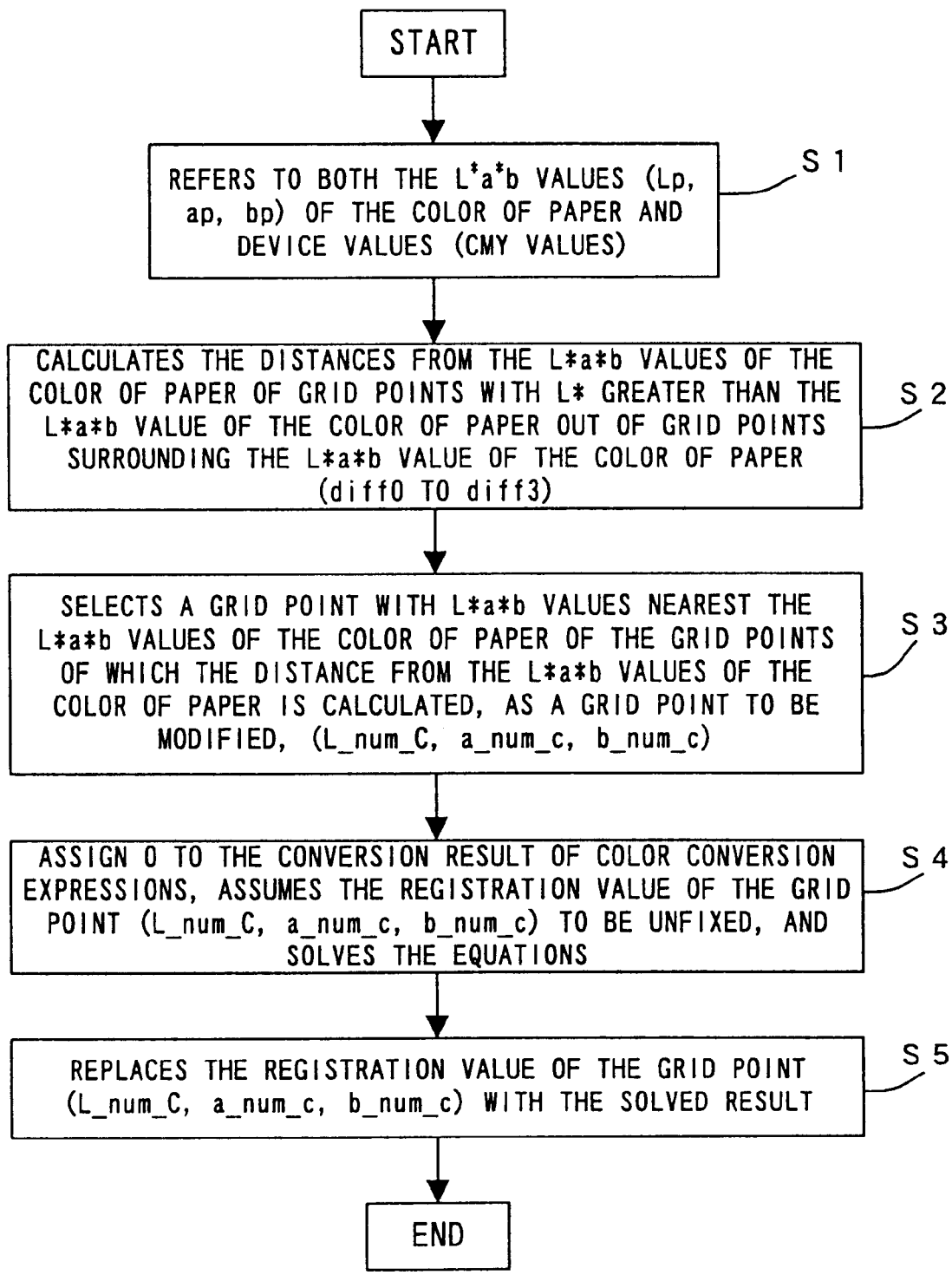
FIG. 40 is a flowchart showing the processes of the first preferred embodiment.

FIG. 40 is a flowchart showing the process procedures of the first preferred embodiment.

It is assumed here that a color conversion table is prepared in advance. For example, as shown in FIG. 41, in the color conversion table L*a*b* values are registered matched with CMY values. In the configuration shown in FIG. 41, if L*a*b* values are (48, 0, −8), the CMY values of (114, 117, 116) are matched and registered. The correspondence of a color to be guaranteed is for the color of paper, and the color conversion table is generated in such a way that all the CMY values after color conversion corresponding to the L*a*b* values of the color of paper may become 0. The L*a*b* values of the color of paper (Lp, ap, bp) are assumed to be measured in advance, and stored in the storage unit. Instead of being stored in advance, the L*a*b* values of the color of paper (Lp, ap, bp) can also be inputted by the operator using a keyboard, etc. and be stored in the storage unit.

First, the correspondence of a color to be guaranteed is referred to (step S1). Here, CMY values corresponding to the L*a*b* values (Lp, ap, bp) are referred to.

Then, data of which the registration value of a color conversion table is modified, are selected. The selection is meant to determine the array argument of the color conversion table. The data to be modified can be any of eight grid points used to convert the (Lp, ap, bp) (See numerical expression (2)). For example, it can be L, a, b which are calculated by the numerical expression (2). Alternatively, out of (L, a, b), (L+1, a, b), (L, a+1, b), (L, a, b+1), (L, a+1, b+1), (L+1, a, b+1), (L+1, a+1, b) and (L+1, a+1, b+1), a grid point nearest to the (Lp, ap, bp) can be used as the data.

Here, in order to reduce the influence on colors inside the gamut other than the color of paper, the data are assumed to be selected from grids outside the gamut. Since the color of paper is a color with the greatest L* value in the gamut of the printer, out of the numbers of the above arguments, (L+1, a, b), (L+1, a, b+1), (L+1, a+1, b) and (L+1, a+1, b+1) are outside the gamut (colors brighter than the color of paper). Thus, data are assumed to be selected from a grid nearest to (Lp, ap, bp) out of these.

The specific procedures are as follows (in the case below, w=8). Here, the argument of a grid point to be selected is assumed to be (L_num_c, a_num_c, b_num_c).

$$L=(int)(Lp/w)$$

$$a=(int)((ap+128.0)/w)$$

$$b=(int)((bp+128.0)/w)$$

$$Lf=Lp/w$$

$$af=(ap+128.0)/w$$

$$bf=(bp+128.0)/w \tag{6}$$

$$\text{diff0}=(af-a)^2+(bf-b)^2$$

$$\text{diff1}=(af+1-a)^2+(bf-b)^2$$

$$\text{diff2}=(af-a)^2+(bf+1-b)^2$$

$$\text{diff3}=(af+1-a)^2+(bf+1-b)^2 \tag{7}$$

In step S2, the above numerical values are calculated using the above expressions.

Then, if diff0≦diff1, diff0≦diff2 and diff0≦diff3, $$L\_num\_c=L+1, a\_num\_c=a, b\_num\_c=b$$

If the above is excluded, and diff1≦diff0, diff1≦diff2 and diff1≦diff3, $$L\_num\_c=L+1, a\_num\_c=a, b\_num\_c=b$$

If the above two are excluded, and diff2≦diff1, diff2≦diff1 and diff2≦diff3, $$L\_num\_c=L+1, a\_num\_c=a, b\_num\_c=b+1$$

If the above three are excluded, and diff3≦diff0, diff3≦diff1 and diff3≦diff2, $$L\_num\_c=L+1, a\_num\_c=a+1, b\_num\_c=b+1 \tag{8}$$

In step S3 shown in FIG. 40, the above grid points are set.

Thus, after (L_num_c, a_num_c, b_num_c) are determined, CMY values registered in the grid points are modified. Actually, the CMY values can be calculated by transforming the expressions assuming that the left-hand side of numerical expression (5) are CMY values corresponding to the L*a*b* values to be guaranteed (all 0 here) and the registration values of the grid points to be modified are not fixed. The specific processes are as follows (steps S4 and S5).

$$Lw=(Lf-L)\cdot w$$

$$aw=(af-a)\cdot w$$

$$bw=(bf-b)\cdot w$$

$$V(0,0,0)=(w-Lw)\cdot(w-aw)\cdot(w-bw)$$

$$V(1,0,0)=Lw\cdot(w-aw)\cdot(w-bw)$$

$$V(0,1,0)=(w-Lw)\cdot aw\cdot(w-bw)$$

$$V(0,0,1)=(w-Lw)\cdot(w-aw)\cdot bw$$

$$V(0,1,1)=(w-Lw)\cdot aw\cdot bw$$

$$V(1,0,1)=Lw\cdot(w-aw)\cdot bw$$

$$V(1,1,0)=Lw\cdot aw\cdot(w-bw)$$

$$V(1,1,1)=Lw\cdot aw\cdot bw \tag{9}$$

If a_num_c=a and b_num_c=b, $$C[L\_num\_c][a\_num\_c][b\_num\_c]=-(C[L][a][b]\cdot V(0,0,0)+C[L][a+1][b]$$

$$]\cdot V(0,1,0)+C[L][a][b+1]\cdot V(0,0,1)+C[L][a+1][b+1]\cdot V(0,1,1)+C[L+1][a][b+1]\cdot V(1,0,1)$$

$$+C[L+1][a+1][b]\cdot V(1,1,0)+C[L+1][a+1][b+1]\cdot V(1,1,1))/V(1,0,0)$$

M and Y are calculated in the same way.
If a_num_c=a+1 and b_num_c=b, $$C[L\_num\_c][a\_num\_c][b\_num\_c]=-(C[L][a][b]\cdot V(0,0,0)+C[L][a+1][b]\cdot$$

$$V(0,1,0)+C[L][a][b+1]\cdot V(0,0,1)+C[L][a+1][b+1]\cdot V(0,1,1)+C[L+1][a][b]\cdot V(1,0,0)$$

$$+C[L+1][a][b]\cdot V(1,0,1)+C[L+1][a+1][b+1]\cdot V(1,1,1))/V(1,1,0)$$

M and Y are calculated in the same way.
If a_num_c=a and b_num_c=b+1, $$C[L\_num\_c][a\_num\_c][b\_num\_c]=-(C[L][a][b]\cdot V(0,0,0)+C[L][a+1][b]\cdot$$

$$V(0,1,0)+C[L][a][b+1]\cdot V(0,0,1)+C[L][a+1][b+1]\cdot V(0,1,1)+C[L+1][a][b]\cdot V(1,0,0)$$

$$+C[L+1][a+1][b]\cdot V(1,1,0)+C[L+1][a+1][b+1]\cdot V(1,1,1)/V(1,0,1)$$

M and Y are calculated in the same way.
If a_num_c=a+1 and b_num_c=b+1, $$C[L\_num\_c][a\_num\_c][b\_num\_c]=-(C[L][a][b]\cdot V(0,0,0)+C[L][a+1][b]\cdot$$

$$V(0,1,0)+C[L][a][b+1]\cdot V(0,0,1)+C[L][a+1][b+1]\cdot V(0,1,1)+C[L+1][a][b]\cdot V(1,0,0)$$

$+C[L+1][a][b+1] \cdot V(1,0,1)+C[L+1][a+1][b] \cdot V(1,1,0))/V(1,1,1,)$ (10)

According to the above procedures, the color conversion table can be modified, and if this table is used, all CMY values corresponding to the L*a*b* value of the color of paper become 0.

The Second Preferred Embodiment

Although in the first preferred embodiment, a case where the data of one grid point in a color conversion table are modified, is described, the data of a plurality of grid points can also be modified. If the data of a plurality of grid points are modified, the modification amount per grid point can be reduced.

The specific procedures are as follows. First, the modification values of the data of grid points are calculated in the same way as described above. However, the calculated values are temporary values, and actually mean values between values before modification and these calculated values are considered as the modification result. That is, the modification volume is halved. Once more the same process as in the first preferred embodiment is performed. In this case, for (L_num_c, a_num_c, b_num_c), a grid point nearest to (Lp, ap, bp) outside the gamut except for grid points already modified is designated. Thus, the modification volume of the data in a color conversion table can largely divided into two grid points.

The Third Preferred Embodiment

In the first preferred embodiment, a case where a color conversion table for printers is targeted, and a color to be guaranteed is the color of paper and usually does not coincide with the color data of a grid point of the color conversion table, is described. In this third preferred embodiment, the color conversion of scanners (RGB values are converted to L*a*b* values) is targeted, and the object of this preferred embodiment is to generate a color conversion table which can guarantee and convert the colors of characters overlaid on pictures. The colors of characters overlaid on a picture which is inputted by a scanner are perfect black, perfect white, etc., and often coincide with any color distributed in a grid shape in an RGB space (any color registered in the color conversion table). Therefore, in this preferred embodiment, a method of generating a color conversion table in which L*a*b* values corresponding to any RGB values of colors distributed in a grid shape in an RGB space are guaranteed, is described.

This preferred embodiment relates to conversion of the data of an RGB value=(0, 0, 0) overlaid on a picture as black characters to L*a*b*=(0, 0, 0).

The basic procedures are the same as those of the first preferred embodiment, and as shown in FIG. 37, consist of two steps of generating a color conversion table and modifying data registered in the table. This preferred embodiment relates to modifying the data registered in the table. The color conversion table is assumed to be prepared in advance.

FIG. 42 shows an example of the configuration of the color conversion table of the third preferred embodiment.

As shown in FIG. 42, L*a*b* values are matched with RGB values. For example, in the case of FIG. 42, for an RGB value=(0, 0, 16), an L*a*b* value=(3, 57, −71) is registered. In this way, for RGB values with an integer, corresponding L*a*b* values are checked and registered in advance. Since the R value, G value and B value of an RGB value can take any number between 0 and 255 at predetermined intervals ("8" in the case of FIG. 42), for all combinations obtained if each of the R value, G value and B value is changed at the predetermined intervals, corresponding L*a*b* values are registered in advance.

Like the first preferred embodiment, this preferred embodiment comprises an operation unit (CPU) and a storage unit. The storage unit stores programs based on the process procedures, a color conversion table and relation of colors of which the correspondence is guaranteed. The color conversion table is stored in the storage unit in the arrays of L[R][G][B], a[R][G][B], b[R][G][B]. The array arguments correspond to RGB values distributed in a grid shape (for example, at intervals of 8). An array argument corresponding to an RGB value=(0, 0, 0) is (0, 0, 0). An array argument corresponding to an RGB=(0, 0, 8) is (0, 0, 1). If any of the R,G and B values is 255, 32 is exceptionally assigned to the corresponding argument value. For example, an array argument corresponding to an RGB value=(255, 255, 255) is (32, 32, 32).

Figure 43:
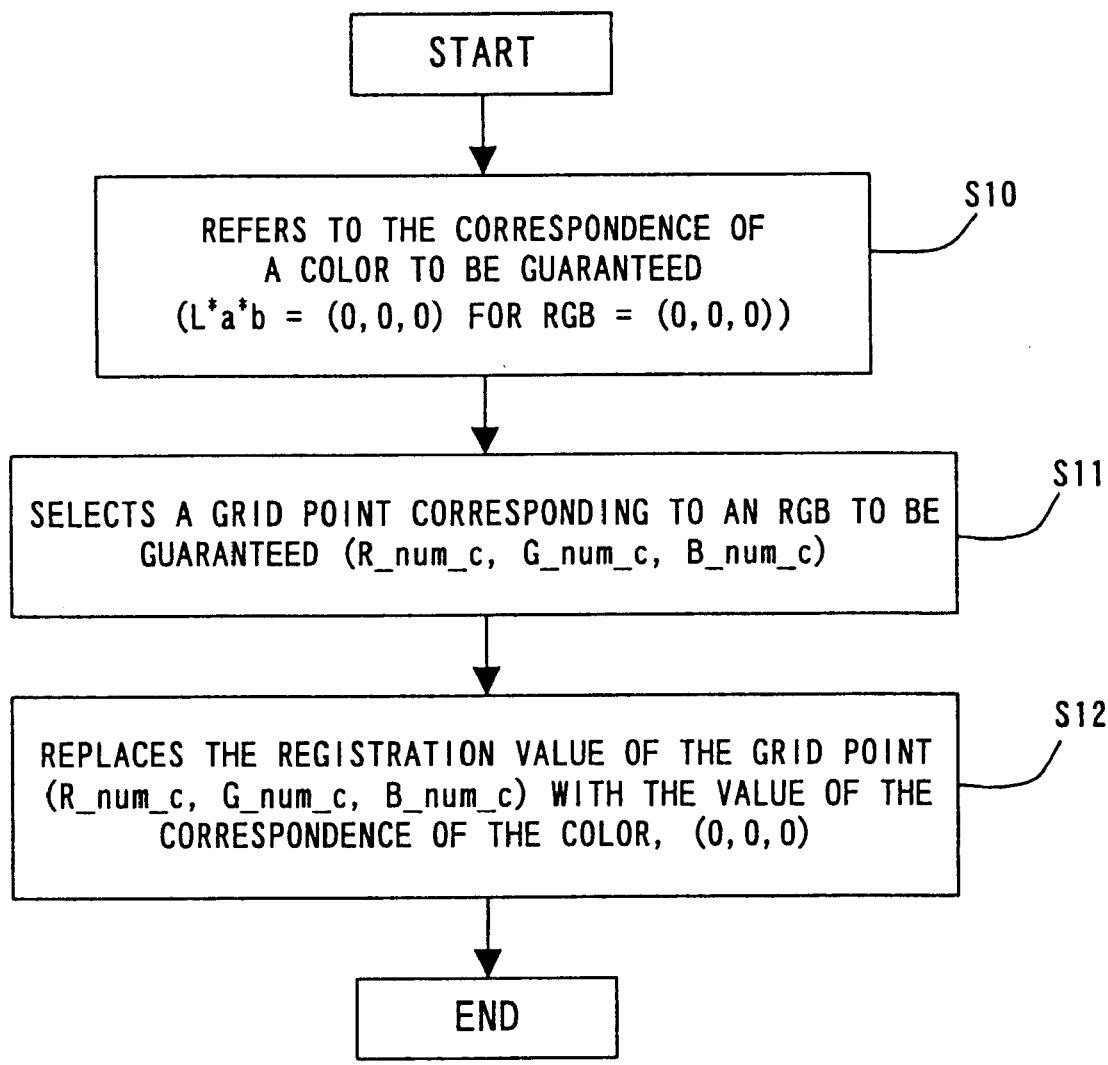
FIG. 43 is a flowchart showing the processes of the third preferred embodiment.

FIG. 43 is a flowchart showing the process of the third preferred embodiment. First, the correspondence of a color to be guaranteed is referred to. Here, for RGB values (0, 0, 0), L*a*b* values (0, 0, 0) are referred to (step S10).

Then, data of which the registration value of a color conversion table is modified are selected (step S11). Since an array argument corresponding to RGB values with the numbers of (R_num_c, G_num_c, B_num_c) are (0, 0, 0), the corresponding L*a*b* values become R_num_c, G_num_c and B_num_c.

Then, the value of the color conversion table is modified. Since unlike the first preferred embodiment, for the correspondence of a color to be guaranteed, only RGB values registered in the color conversion table are targeted, the conversion can be performed by using L*a*b* values registered in the table indicating the correspondence of the referred color as they are. Specifically, the data of the selected number are modified to the referred L*a*b* values (step S12). That is, $$L[R\_num\_c][G\_num\_c][B\_num\_c]=0$$

$$a[R\_num\_c][G\_num\_c][B\_num\_c]=0$$

$$b[R\_num\_c][G\_num\_c][B\_num\_c]=0 \quad (11)$$

According to the above processes, the data of the color conversion table can be modified, and a color conversion table to guarantee the correspondence of the referred color can be generated.

As described so far, if the present invention is adopted, when first color data included in the gamut of a first color picture device are converted to second color data included in the gamut of a second color picture device, particularly if the first color data are in a yellow or blue field, the first color data can be converted to the second color data with a reduced deterioration of the saturation.

If the present invention is adopted, when first color data included in the gamut of a first color picture device are converted to second color data included in the gamut of a second color picture device, a plurality of the second color data can also be calculated in such a way that the saturation order of a plurality of the first color data can be maintained.

Furthermore, if the present invention is adopted, the first color data of a first color picture device are converted to the second color data of a second color picture device, even in a field where there is a disagreement or distortion of the equi-hue lines, such as in blue and purple fields, etc., color data can also be accurately converted without changing the hue value, and the first color data of magenta with high saturation of the first color picture device can also be converted to the second color data of magenta with high saturation of the second color picture device, without losing the high saturation. The first color data of red with high saturation of the first color picture device can also be converted to the second color data of red with high saturation of the second color picture device, without losing the saturation. Therefore, when the gamut of input color picture devices, such as a scanner, etc. is different from the gamut of output color picture devices, such as a printer, etc., the present invention also greatly contributes to the performance improvement of color data conversion.

Since the values of a color conversion table can be modified based on the relation of a color to be guaranteed, the accuracy of a specific color can also be guaranteed or for a specific color the conversion result can also be guaranteed.

What is claimed is:

1. A color data conversion method of generating second color data included in a second gamut of a second color picture device from first color data included in a first gamut of a first color picture device, comprising the steps of:

calculating third color data which is included in the second gamut and corresponds to a saturation value of the first color data; and converting the first color data toward the third color data so as to be included in the second gamut and calculating the second color data.

2. The color data conversion method according to claim 1, wherein said step of calculating the third color data, further comprises the step of:

calculating the third color data in such a way that the data may be included in the second gamut, and the greater is the saturation value of the first color data, the greater the saturation value of the third color data may become.

3. The color data conversion method according to claim 1, wherein the step of calculating the third color data, further comprises the steps of:

calculating fourth color data with high saturation of color data included in the first gamut in the same hue as the first color data;

calculating fifth color data with high saturation of color data included in the second gamut in the same hue as the first color data; and calculating the third color data in such a way that the data may be included in the second gamut, the greater is the saturation value of the first color data, the greater the saturation value of the third color data may become, and if the saturation value of the first color data is nearly equal to the saturation value of the fourth color data, the saturation value of the third color data become nearly equal to the saturation value of the fifth color data.

4. The color data conversion method according to claim 1, wherein the step of calculating the third color data, further comprises the steps of:

calculating fifth color data with highest saturation of color data included in the second gamut in the same hue as the first color data;

calculating a first difference value in lightness between a lightness value of the first color data and the lightness value of the fifth color data;

calculating the third color data in such a way that the data may be included in the second gamut, and the saturation value of the third color data can be determined by two factors of a factor in which the greater is the saturation value of the first color data, the greater the saturation value of the third color data may become, and a factor in which the greater is the first difference value in lightness, the smaller the saturation value of the third color data may become.

5. The color data conversion method according to claim 1, wherein the step of calculating the third color data, further comprises the step of:

calculating said third color data on a straight line connecting sixth color data being an achromatic color and said fifth color data.

6. The color data conversion method according to claim 5, wherein said sixth color data is color data representing an achromatic color with a lightness value nearly equal to a lightness value of said fifth color data.

7. The color data conversion method according to claim 5, wherein said sixth color data is color data representing an achromatic color with a lightness value nearly equal to a lightness value of a mean value between a maximum lightness value and a minimum lightness value in said second gamut.

8. The color data conversion method according to claim 1, wherein the step of calculating the second color data, further comprises the step of:

connecting said first color data and said third color data using a second straight line and calculating color data which is positioned at an intersecting point of the second straight line and an outermost boundary of said second gamut as the second color data.

9. The color data conversion method according to claim 1, wherein the step of calculating the second color data, further comprises the step of:

connecting said first color data and said third color data using a second straight line and calculating seventh color data which is positioned at an intersecting point of the second straight line and an outermost boundary of said first gamut as the second color data;

calculating eighth color data which is positioned at an intersecting point of said second straight line and an outermost boundary of said second gamut; and calculating color data which is obtained by dividing a portion on said second straight line surrounded with said third color data and said eighth color data based on a ratio between a distance between said third color data and said seventh color data and a distance between said third color data and said first color data, as the second color data.

10. A color data conversion method of generating a second color data included in a second gamut of a second color picture device from a first color data included in a first gamut of a first color picture device, comprising the steps of:

calculating a shift amount value from a hue angle value, lightness value and saturation value of the first color data; and converting the hue angle value of the first color data based on the shift amount value.

11. The color data conversion method according to claim 10, wherein in said step of calculating the shift amount value, a multi-dimensional table is used to calculate said shift amount value.

12. The color data conversion method according to claim 10, wherein if said first color data is color data representing the blue or purple colors of said first color picture device, said step of calculating the shift amount value calculates a shift amount value for reducing the hue angle value of said first color data.

13. The color data conversion method according to claim 12, wherein
in said step of calculating the shift amount value, color data representing the blue and purple colors of said first color picture device represents a color in a neighborhood of the primary and secondary colors of said first color picture device.

14. The color data conversion method according to claim 13, wherein
in said step of calculating the shift amount value, the hue angle value of color data representing the color in a neighborhood of the primary and secondary colors of said first color picture device is a value between approximately 220 and 320 degrees.

15. The color data conversion method according to claim 12, wherein
said step of calculating the shift amount value calculates in such a way that the absolute value of said shift amount value may become a maximum, if said first color data has almost the same hue angle value as the hue angle value of the color data representing the primary and secondary colors of said first color picture device.

16. The color data conversion method according to claim 15, wherein
in said step of calculating the shift amount value, the hue angle value of the color data representing the blue of the primary and secondary colors of said first color picture device is approximately 300 degrees.

17. The color data conversion method according to claim 12, wherein
said step of calculating the shift amount value calculates in such a way that the absolute value of said shift amount value may become approximately 30 degrees, if said first color data is almost the same as the color data representing the blue of the primary and secondary colors of said first color picture device.

18. The color data conversion method according to claim 12, wherein
said step of calculating the shift amount value calculates in such a way that the absolute value of said shift amount value may increase as the saturation value of said first color data increases.

19. The color data conversion method according to claim 18, wherein
said step of calculating the shift amount value calculates in such a way that the absolute value of said shift amount value may become 0, if the saturation value of said first color data is 0, said absolute value of the shift amount value may proportionally increase, as the saturation value of said first color data increases, and said absolute value of the shift amount value may be saturated, when said saturation value of the first color data becomes 120 degrees.

20. The color data conversion method according to claim 12, wherein
said step of calculating the shift amount value calculates in such a way that, as the lightness value of said first color data falls down below an arbitrary lightness value between the lowest lightness value and the maximum lightness value of said first gamut, said absolute value of the shift amount value may increase.

21. The color data conversion method according to claim 20, wherein
in said step of calculating the shift amount value, if said lightness of the first color data is almost the same as the lowest lightness value of said first gamut, said absolute value of the shift amount value is approximately 1.5 times said absolute value of the shift amount value in the case of said arbitrary lightness value.

22. The color data conversion method according to claim 10, wherein
said step of calculating the shift amount value calculates a shift amount value for converting the hue angle value of said first color data to the hue angle value of color data representing a color in the neighborhood of the primary and secondary colors of said second color picture device, if said first color data represents a color in the neighborhood of the primary and secondary colors of said first color picture device.

23. The color data conversion method according to claim 22, wherein
said step of calculating the shift amount value calculates in such a way that said absolute value of the shift amount value may become a maximum, said first color data represents the primary and secondary colors of said first color picture device.

24. The color data conversion method according to claim 22, wherein
said step of calculating the shift amount value calculates in such a way that, as a difference between the first color data and a color data representing the primary and secondary colors of said first color picture device becomes large, said absolute value of the shift amount value may decrease, if said first color data is a color data representing a color in the neighborhood of said first color picture device.

25. The color data conversion method according to claim 10, wherein
a step of converting the hue angle value of the first color data based on said shift amount value rotates the first color data with the color data of an achromatic color having the same lightness as the first color data as a center, and converts the hue angle value of the first color data.

26. A color conversion system for generating a second value of a color space which is included in a second gamut of a first color picture device and is dependent on the second color picture device, from a first value of a color space which is included in a first gamut of a first color picture device and dependent on the first color picture device, comprising:
means for converting a first value of a color space dependent on the first color picture device to a third value of a color space independent of devices;
means for calculating a shift amount value from a hue angle value, lightness value and saturation value of a third value of the color space;
means for converting the hue angle value of the third value of the color space based on the shift amount value; and
means for converting the third value of the color space of which the hue angle value is converted, to a second value of a color space dependent on the second color picture device.

27. A color conversion table registration data modification method of modifying registration data to be registered in a color conversion table where correspondence between colors before and after conversion to be referred to when colors are converted, is stored, comprising the steps of:

referring to a correspondence of a color to be guaranteed;

selecting a piece of data of which a registration value is modified; and modifying the registration data so as to guarantee a referred correspondence.

28. The color conversion table registration data modification method according to claim 27, wherein in a modification step, color conversion arithmetic expressions are used.

29. The color conversion table registration data modification method according to claim 27, wherein in the modification step, a value of a color referred to in the step of referring is set.

30. The color conversion table registration data modification method according to claim 27, wherein in a selection step, a piece of data nearest to a color referred in a reference step is selected.

31. The color conversion table registration data modification method according to claim 27, wherein in the selection step, a piece of data is selected from data other than data in a reproduced gamut.

* * * * *